US011113158B2

(12) United States Patent
Alluboyina et al.

(10) Patent No.: US 11,113,158 B2
(45) Date of Patent: Sep. 7, 2021

(54) ROLLING BACK KUBERNETES APPLICATIONS

(71) Applicant: Robin Systems, Inc., San Jose, CA (US)

(72) Inventors: Ravi Kumar Alluboyina, Santa Clara, CA (US); Sree Nandan Atur, Newark, CA (US)

(73) Assignee: ROBIN SYSTEMS, INC., San Jose, CA (US)

( * ) Notice: Subject to any disclaimer, the term of this patent is extended or adjusted under 35 U.S.C. 154(b) by 171 days.

(21) Appl. No.: 16/593,059

(22) Filed: Oct. 4, 2019

(65) Prior Publication Data
US 2021/0103499 A1 Apr. 8, 2021

(51) Int. Cl.
*G06F 12/00* (2006.01)
*G06F 13/00* (2006.01)
(Continued)

(52) U.S. Cl.
CPC ........ *G06F 11/1469* (2013.01); *G06F 3/0604* (2013.01); *G06F 3/067* (2013.01); *G06F 3/0652* (2013.01); *G06F 3/0665* (2013.01); *G06F 9/45558* (2013.01); *H04L 67/1097* (2013.01); *G06F 2009/45583* (2013.01); *G06F 2009/45595* (2013.01); *G06F 2201/84* (2013.01)

(58) Field of Classification Search
CPC .............. G06F 11/1469; G06F 3/0665; G06F 11/1446; G06F 11/1448; G06F 11/1458
USPC ......................................................... 711/161
See application file for complete search history.

(56) References Cited

U.S. PATENT DOCUMENTS

| 3,715,573 A | 2/1973 | Vogelsberg |
| 4,310,883 A | 1/1982 | Clifton |

(Continued)

FOREIGN PATENT DOCUMENTS

WO  WO2017008675  1/2017

OTHER PUBLICATIONS

Segment map, Feb. 4, 2019.
(Continued)

*Primary Examiner* — Christopher D Birkhimer
*Assistant Examiner* — Sidney Li
(74) *Attorney, Agent, or Firm* — David R. Stevens; Stevens Law Group

(57) ABSTRACT

A new snapshot of a storage volume is created by instructing computing nodes to suppress write requests. An orchestration layer implements a multi-role application that is provisioned with virtualized storage and computation resources. A snapshot of the application may be created and used to rollback or clone the application. Clones snapshots of storage volumes may be thin clones. An application may use multiple orchestration approaches and objects of the multi-role application may be discovered and added to an application definition. The application definition may be used to create snapshots of the application and perform operations using the snapshots. Rolling back may include deleting objects other than PVCs, followed by rolling back storage volumes mounted to the PVCs, followed by recreating objects according to an application snapshot. PVCs created by a custom resource may be deleted along with the custom resource with the PVCs being recreated before recreating the custom resource.

20 Claims, 42 Drawing Sheets

(51) Int. Cl.
*G06F 13/28* (2006.01)
*G06F 11/14* (2006.01)
*G06F 3/06* (2006.01)
*G06F 9/455* (2018.01)
*H04L 29/08* (2006.01)

(56) References Cited

U.S. PATENT DOCUMENTS

| | | |
|---|---|---|
| 5,602,993 A | 2/1997 | Stromberg |
| 5,680,513 A | 10/1997 | Hyland |
| 5,796,290 A | 8/1998 | Takahashi |
| 6,014,669 A | 1/2000 | Slaughter |
| 6,052,797 A | 4/2000 | Ofek |
| 6,119,214 A | 9/2000 | Dirks |
| 6,157,963 A | 12/2000 | Courtright, II |
| 6,161,191 A | 12/2000 | Slaughter |
| 6,298,478 B1 | 10/2001 | Nally |
| 6,301,707 B1 | 10/2001 | Carroll |
| 6,311,193 B1 | 10/2001 | Sekido |
| 6,851,034 B2 | 2/2005 | Challenger |
| 6,886,160 B1 | 4/2005 | Lee |
| 6,895,485 B1 | 5/2005 | Dekoning |
| 6,957,221 B1 | 10/2005 | Hart |
| 7,096,465 B1 | 8/2006 | Dardinski |
| 7,111,055 B2 | 9/2006 | Falkner |
| 7,171,659 B2 | 1/2007 | Becker |
| 7,246,351 B2 | 7/2007 | Bloch |
| 7,305,671 B2 | 12/2007 | Davidov |
| 7,461,374 B1 | 12/2008 | Balint |
| 7,535,854 B2 | 5/2009 | Luo |
| 7,590,620 B1 | 9/2009 | Pike |
| 7,698,698 B2 | 4/2010 | Skan |
| 7,721,283 B2 | 5/2010 | Kovachka |
| 7,734,859 B2 | 6/2010 | Daniel |
| 7,738,457 B2 | 6/2010 | Nordmark |
| 7,779,091 B2 | 8/2010 | Wilkinson |
| 7,797,693 B1 | 9/2010 | Gustafson |
| 7,984,485 B1 | 7/2011 | Rao |
| 8,037,471 B2 | 10/2011 | Keller |
| 8,046,450 B1 | 10/2011 | Schloss |
| 8,060,522 B2 | 11/2011 | Birdwell |
| 8,121,874 B1 | 2/2012 | Guheen |
| 8,171,141 B1 | 5/2012 | Offer |
| 8,219,821 B2 | 7/2012 | Zimmels |
| 8,250,033 B1 | 8/2012 | Souter |
| 8,261,295 B1 | 9/2012 | Risbood |
| 8,326,883 B2 | 12/2012 | Rni |
| 8,392,498 B2 | 3/2013 | Berg |
| 8,429,346 B1 | 4/2013 | Chen |
| 8,464,241 B2 | 6/2013 | Hayton |
| 8,505,003 B2 | 8/2013 | Bowen |
| 8,527,544 B1 | 9/2013 | Colgrove |
| 8,601,467 B2 | 12/2013 | Hofhansl |
| 8,620,973 B1 | 12/2013 | Veeraswamy |
| 8,666,933 B2 | 3/2014 | Rni |
| 8,745,003 B1 | 6/2014 | Patterson |
| 8,775,751 B1 | 7/2014 | Pendharkar |
| 8,782,632 B1 | 7/2014 | Chigurapati |
| 8,788,634 B2 | 7/2014 | Krig |
| 8,832,324 B1 | 9/2014 | Hodges |
| 8,886,806 B2 | 11/2014 | Tung |
| 8,909,885 B2 | 12/2014 | Corbett |
| 8,954,383 B1 | 2/2015 | Vempati |
| 8,954,568 B2 | 2/2015 | Krishnan |
| 8,966,198 B1 | 2/2015 | Harris |
| 9,134,992 B2 | 9/2015 | Wong |
| 9,146,769 B1 | 9/2015 | Shankar |
| 9,148,465 B2 | 9/2015 | Gambardella |
| 9,152,337 B2 | 10/2015 | Kono |
| 9,167,028 B1 | 10/2015 | Bansal |
| 9,280,591 B1 | 3/2016 | Kharatishvili |
| 9,330,155 B1 | 5/2016 | Bono |
| 9,336,060 B2 | 5/2016 | Nori |
| 9,342,444 B2 | 5/2016 | Minckler |
| 9,367,301 B1 | 6/2016 | Serrano |
| 9,390,128 B1 | 7/2016 | Seetala |
| 9,436,693 B1 | 9/2016 | Lockhart |
| 9,514,160 B2 | 12/2016 | Song |
| 9,521,198 B1 | 12/2016 | Agarwala |
| 9,569,274 B2 | 2/2017 | Tarta |
| 9,569,480 B2 | 2/2017 | Provencher |
| 9,600,193 B2 | 3/2017 | Ahrens |
| 9,613,119 B1 | 4/2017 | Aron |
| 9,619,389 B1 | 4/2017 | Roug |
| 9,635,132 B1 | 4/2017 | Lin |
| 9,667,470 B2 | 5/2017 | Prathipati |
| 9,747,096 B2 | 8/2017 | Searlee |
| 9,870,366 B1 | 1/2018 | Duan |
| 9,880,933 B1 | 1/2018 | Gupta |
| 9,892,265 B1 | 2/2018 | Tripathy |
| 9,929,916 B1 | 3/2018 | Subramanian |
| 9,998,955 B1 | 6/2018 | MacCarthaigh |
| 10,019,459 B1 | 7/2018 | Agarwala |
| 10,042,628 B2 | 8/2018 | Thompson |
| 10,061,520 B1 | 8/2018 | Zhao |
| 10,191,778 B1 | 1/2019 | Yang |
| 10,241,774 B2 | 3/2019 | Spivak |
| 10,282,229 B2 | 5/2019 | Wagner |
| 10,353,634 B1 | 7/2019 | Greenwood |
| 10,430,434 B2 | 10/2019 | Sun |
| 10,657,119 B1 | 5/2020 | Acheson |
| 10,956,246 B1 | 3/2021 | Bagde |
| 2002/0141390 A1 | 10/2002 | Fangman |
| 2004/0010716 A1 | 1/2004 | Childress |
| 2004/0153703 A1 | 8/2004 | Vigue |
| 2004/0221125 A1 | 11/2004 | Ananthanarayanan |
| 2005/0065986 A1 | 3/2005 | Bixby |
| 2005/0216895 A1 | 9/2005 | Tran |
| 2005/0256948 A1 | 11/2005 | Hu |
| 2006/0025908 A1 | 2/2006 | Rachlin |
| 2006/0053357 A1 | 3/2006 | Rajski |
| 2006/0085674 A1 | 4/2006 | Ananthamurthy |
| 2006/0259686 A1 | 11/2006 | Sonobe |
| 2007/0006015 A1 | 1/2007 | Rao |
| 2007/0016786 A1 | 1/2007 | Waltermann |
| 2007/0067583 A1 | 3/2007 | Zohar |
| 2007/0165625 A1 | 7/2007 | Eisner |
| 2007/0260842 A1 | 11/2007 | Faibish |
| 2007/0277056 A1 | 11/2007 | Varadarajan |
| 2007/0288791 A1 | 12/2007 | Allen |
| 2008/0010421 A1 | 1/2008 | Chen |
| 2008/0068899 A1 | 3/2008 | Ogihara |
| 2008/0189468 A1 | 8/2008 | Schmidt |
| 2008/0235544 A1 | 9/2008 | Lai |
| 2008/0256141 A1* | 10/2008 | Wayda .......... G06F 3/0608 |
| 2008/0263400 A1 | 10/2008 | Waters |
| 2008/0270592 A1 | 10/2008 | Choudhary |
| 2009/0144497 A1 | 6/2009 | Withers |
| 2009/0172335 A1 | 7/2009 | Kulkarni |
| 2009/0240809 A1 | 9/2009 | La Frese |
| 2009/0254701 A1 | 10/2009 | Kurokawa |
| 2009/0307249 A1 | 12/2009 | Koifman |
| 2010/0100251 A1 | 4/2010 | Chao |
| 2010/0161941 A1 | 6/2010 | Vyshetsky |
| 2010/0162233 A1 | 6/2010 | Ku |
| 2010/0211815 A1 | 8/2010 | Mankovskii |
| 2010/0274984 A1 | 10/2010 | Inomata |
| 2010/0299309 A1 | 11/2010 | Maki |
| 2010/0306495 A1 | 12/2010 | Kumano |
| 2010/0332730 A1 | 12/2010 | Royer |
| 2011/0083126 A1 | 4/2011 | Bhakta |
| 2011/0119664 A1 | 5/2011 | Kimura |
| 2011/0188506 A1 | 8/2011 | Arribas |
| 2011/0208928 A1 | 8/2011 | Chandra |
| 2011/0246420 A1 | 10/2011 | Wang |
| 2011/0276951 A1 | 11/2011 | Jain |
| 2012/0005557 A1 | 1/2012 | Mardiks |
| 2012/0066449 A1 | 3/2012 | Colgrove |
| 2012/0102369 A1 | 4/2012 | Hiltunen |
| 2012/0216052 A1 | 8/2012 | Dunn |
| 2012/0226667 A1 | 9/2012 | Volvovski |
| 2012/0240012 A1 | 9/2012 | Weathers |
| 2012/0259819 A1 | 10/2012 | Patwardhan |
| 2012/0265976 A1 | 10/2012 | Spiers |

(56) References Cited

U.S. PATENT DOCUMENTS

| | | |
|---|---|---|
| 2012/0303348 A1 | 11/2012 | Lu |
| 2012/0311671 A1 | 12/2012 | Wood |
| 2012/0331113 A1 | 12/2012 | Jain |
| 2013/0054552 A1 | 2/2013 | Hawkins |
| 2013/0054932 A1 | 2/2013 | Acharya |
| 2013/0080723 A1 | 3/2013 | Sawa |
| 2013/0254521 A1 | 9/2013 | Bealkowski |
| 2013/0282662 A1 | 10/2013 | Kumarasamy |
| 2013/0332688 A1 | 12/2013 | Corbett |
| 2013/0339659 A1 | 12/2013 | Bybell |
| 2013/0346709 A1 | 12/2013 | Wang |
| 2014/0006465 A1 | 1/2014 | Davis |
| 2014/0047263 A1 | 2/2014 | Coatney |
| 2014/0047341 A1 | 2/2014 | Breternitz |
| 2014/0047342 A1 | 2/2014 | Breternitz |
| 2014/0058871 A1 | 2/2014 | Marr |
| 2014/0059527 A1 | 2/2014 | Gagliardi |
| 2014/0059528 A1 | 2/2014 | Gagliardi |
| 2014/0108483 A1 | 4/2014 | Tarta |
| 2014/0130040 A1 | 5/2014 | Lemanski |
| 2014/0195847 A1 | 7/2014 | Webman |
| 2014/0245319 A1 | 8/2014 | Fellows |
| 2014/0281449 A1 | 9/2014 | Christopher |
| 2014/0282596 A1 | 9/2014 | Bourbonnais |
| 2015/0046644 A1 | 2/2015 | Karp |
| 2015/0067031 A1 | 3/2015 | Acharya |
| 2015/0074358 A1 | 3/2015 | Flinsbaugh |
| 2015/0112951 A1 | 4/2015 | Narayanamurthy |
| 2015/0134857 A1 | 5/2015 | Hahn |
| 2015/0149605 A1 | 5/2015 | Iglesia |
| 2015/0186217 A1 | 7/2015 | Eslami |
| 2015/0278333 A1 | 10/2015 | Hirose |
| 2015/0317212 A1 | 11/2015 | Lee |
| 2015/0326481 A1 | 11/2015 | Rector |
| 2015/0379287 A1 | 12/2015 | Mathur |
| 2016/0011816 A1 | 1/2016 | Aizman |
| 2016/0026667 A1 | 1/2016 | Mukherjee |
| 2016/0042005 A1 | 2/2016 | Liu et al. |
| 2016/0124775 A1 | 5/2016 | Ashtiani |
| 2016/0197995 A1 | 7/2016 | Lu |
| 2016/0239412 A1 | 8/2016 | Wada |
| 2016/0259597 A1 | 9/2016 | Worley |
| 2016/0283261 A1 | 9/2016 | Nakatsu |
| 2016/0357456 A1 | 12/2016 | Iwasaki |
| 2016/0357548 A1 | 12/2016 | Stanton |
| 2016/0373327 A1 | 12/2016 | Degioanni |
| 2017/0060710 A1 | 3/2017 | Ramani |
| 2017/0060975 A1 | 3/2017 | Akyureklier |
| 2017/0139645 A1 | 5/2017 | Byun |
| 2017/0149843 A1 | 5/2017 | Amulothu |
| 2017/0168903 A1 | 6/2017 | Dornemann |
| 2017/0192889 A1 | 7/2017 | Sato |
| 2017/0214550 A1 | 7/2017 | Kumar |
| 2017/0235649 A1 | 8/2017 | Shah |
| 2017/0242617 A1 | 8/2017 | Walsh |
| 2017/0242719 A1 | 8/2017 | Tsirkin |
| 2017/0244557 A1 | 8/2017 | Riel |
| 2017/0244787 A1 | 8/2017 | Rangasamy |
| 2017/0322954 A1 | 11/2017 | Horowitz |
| 2017/0337492 A1 | 11/2017 | Chen |
| 2017/0371551 A1 | 12/2017 | Sachdev |
| 2018/0006896 A1 | 1/2018 | Macnamara |
| 2018/0024889 A1 | 1/2018 | Verma |
| 2018/0046553 A1 | 2/2018 | Okamoto |
| 2018/0082053 A1 | 3/2018 | Brown |
| 2018/0107419 A1 | 4/2018 | Sachdev |
| 2018/0113625 A1 | 4/2018 | Sancheti |
| 2018/0113770 A1 | 4/2018 | Hasanov |
| 2018/0136931 A1 | 5/2018 | Hendrich |
| 2018/0137306 A1 | 5/2018 | Brady |
| 2018/0150306 A1 | 5/2018 | Govindaraju |
| 2018/0159745 A1 | 6/2018 | Byers |
| 2018/0165170 A1 | 6/2018 | Hegdal |
| 2018/0218000 A1 | 8/2018 | Setty |
| 2018/0225216 A1 | 8/2018 | Filippo |
| 2018/0246670 A1 | 8/2018 | Baptist |
| 2018/0246745 A1 | 8/2018 | Aronovich |
| 2018/0247064 A1 | 8/2018 | Aronovich |
| 2018/0276215 A1 | 9/2018 | Chiba |
| 2018/0285164 A1 | 10/2018 | Hu |
| 2018/0285223 A1 | 10/2018 | McBride |
| 2018/0285353 A1 | 10/2018 | Ramohalli |
| 2018/0287883 A1 | 10/2018 | Joshi |
| 2018/0302335 A1 | 10/2018 | Gao |
| 2018/0329981 A1 | 11/2018 | Gupte |
| 2018/0364917 A1 | 12/2018 | Ki |
| 2018/0375728 A1 | 12/2018 | Gangil |
| 2019/0065061 A1 | 2/2019 | Kim |
| 2019/0065323 A1* | 2/2019 | Dhamdhere ........ G06F 11/3452 |
| 2019/0073132 A1 | 3/2019 | Zhou |
| 2019/0073372 A1 | 3/2019 | Venkatesan |
| 2019/0079928 A1 | 3/2019 | Kumar |
| 2019/0089651 A1 | 3/2019 | Ri |
| 2019/0102226 A1 | 4/2019 | Caldato |
| 2019/0109756 A1 | 4/2019 | Abulebdeh |
| 2019/0116690 A1 | 4/2019 | Chen |
| 2019/0148932 A1 | 5/2019 | Benesch |
| 2019/0156023 A1 | 5/2019 | Gerebe |
| 2019/0163460 A1 | 5/2019 | Kludy |
| 2019/0188094 A1 | 6/2019 | Ramamoorthi |
| 2019/0190803 A1 | 6/2019 | Joshi |
| 2019/0199601 A1 | 6/2019 | Lynar |
| 2019/0213085 A1 | 7/2019 | Alluboyina |
| 2019/0215313 A1 | 7/2019 | Doshi |
| 2019/0220266 A1 | 7/2019 | Doshi |
| 2019/0220315 A1 | 7/2019 | Vallala |
| 2019/0235895 A1 | 8/2019 | Ovesea |
| 2019/0250849 A1 | 8/2019 | Compton |
| 2019/0272205 A1 | 9/2019 | Jiang |
| 2019/0278624 A1 | 9/2019 | Bade |
| 2019/0324666 A1 | 10/2019 | Kusters |
| 2019/0334727 A1 | 10/2019 | Kaufman |
| 2019/0369273 A1 | 12/2019 | Liu |
| 2020/0019414 A1 | 1/2020 | Rd |
| 2020/0034193 A1 | 1/2020 | Jayaram |
| 2020/0034254 A1 | 1/2020 | Natanzon |
| 2020/0083909 A1 | 3/2020 | Kusters |
| 2020/0150977 A1 | 5/2020 | Wang |
| 2020/0257519 A1 | 8/2020 | Shen |
| 2020/0356537 A1 | 11/2020 | Sun |
| 2021/0042151 A1 | 2/2021 | Muller |
| 2021/0067607 A1 | 3/2021 | Gardner |

OTHER PUBLICATIONS

Implementing time critical functionalities with a distributed adaptive container architecture, Stankovski, Nov. 2016.

Awada et al, "Improviing Resource Efficiency of Container-instance Clusters on Clouds", IEEE, pp. 929-934 (Year 2017).

Segment map, Google, Feb. 4, 2019.

Fast and Secure Append-Only storage with Infinite Capacity, ZHENG, Aug. 27, 2003.

User Mode and Kernel Mode, Microsoft, Apr. 19, 2017.

Precise memory leak detection for java software using container profiling, XU, Jul. 2013.

Mogi et al., "Dynamic Parity Stripe Reorganizations for RAID5 Disk Arrays," 1994, IEEE, pp. 17-26.

Syed et al., "The Container Manager Pattern", ACM, pp. 1-9 (Year 2017).

Rehmann et al., "Performance of Containerized Database Management Systems", ACM, pp. 1-6 (Year 2018).

Awada et al.," Improving Resource Efficiency of Container-instance Clusters on Clouds", IEEE, pp. 929-934 (Year 2017).

Stankovski et al., "Implementing Time- Critical Functionalities with a Distributed Adaptive Container Architecture", ACM, pp. 1-5 (Year 2016).

Dhakate et al., "Distributed Cloud Monitoring Using Docker as Next Generation Container Virtualization Technology" IEEE, pp. 1-5 (Year 2015).

Crameri et al., "Staged Deployment in Mirage, an Integrated Software Upgrade Testing and Distribution System", ACM, pp. 221-236 (Year: 2007).

(56) References Cited

OTHER PUBLICATIONS

Cosmo et al., "Packages Upgrades in FOSS Distributions: Details and Challenges", AC 2008).
Burg et al., "Atomic Upgrading of Distributed Systems", ACM, pp. 1-5 (Year: 2008).
Souer et al., "Component Based Architecture forWeb Content Management: Runtime Deployable Web Manager Component Bundles", IEEE, pp. 366-369 (Year: 2008).
Weingartner et al., "A distributed autonomic management framework for cloud computing orchestration." In 2016 IEEE World Congress on Services (Year: 2016).

* cited by examiner

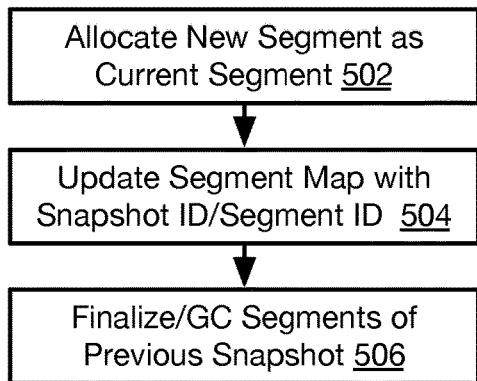
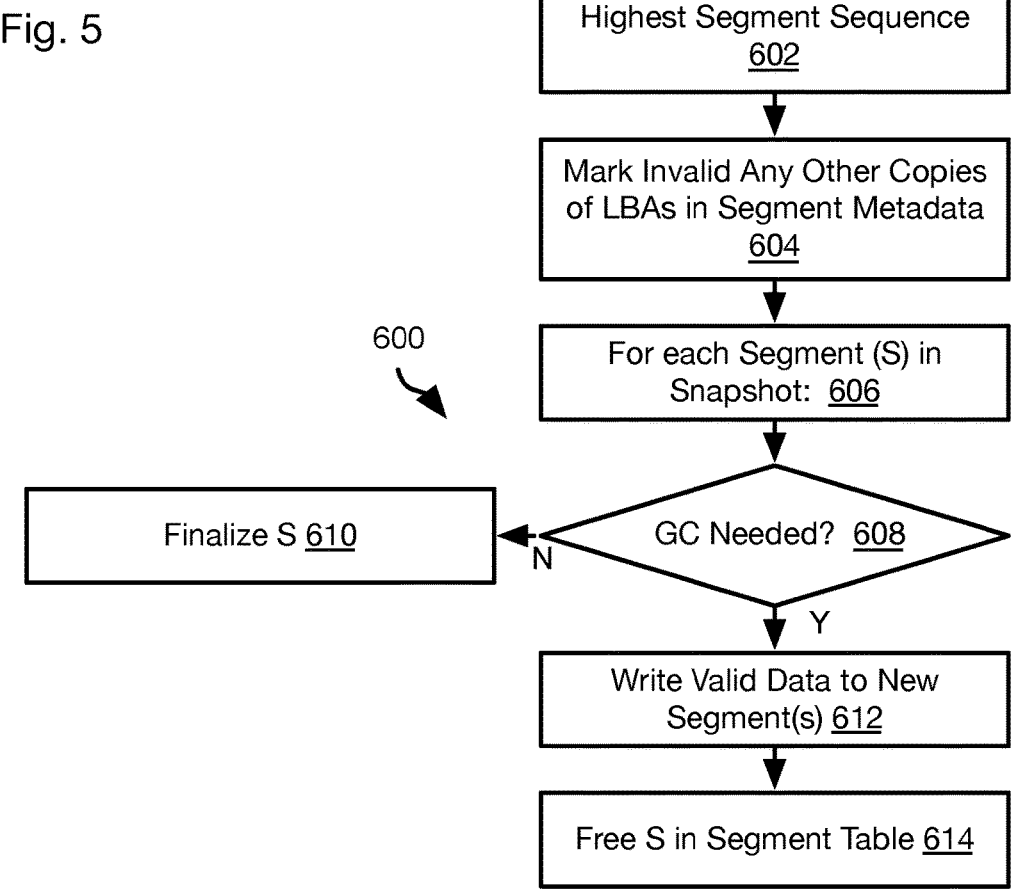
Fig. 5
Fig. 6

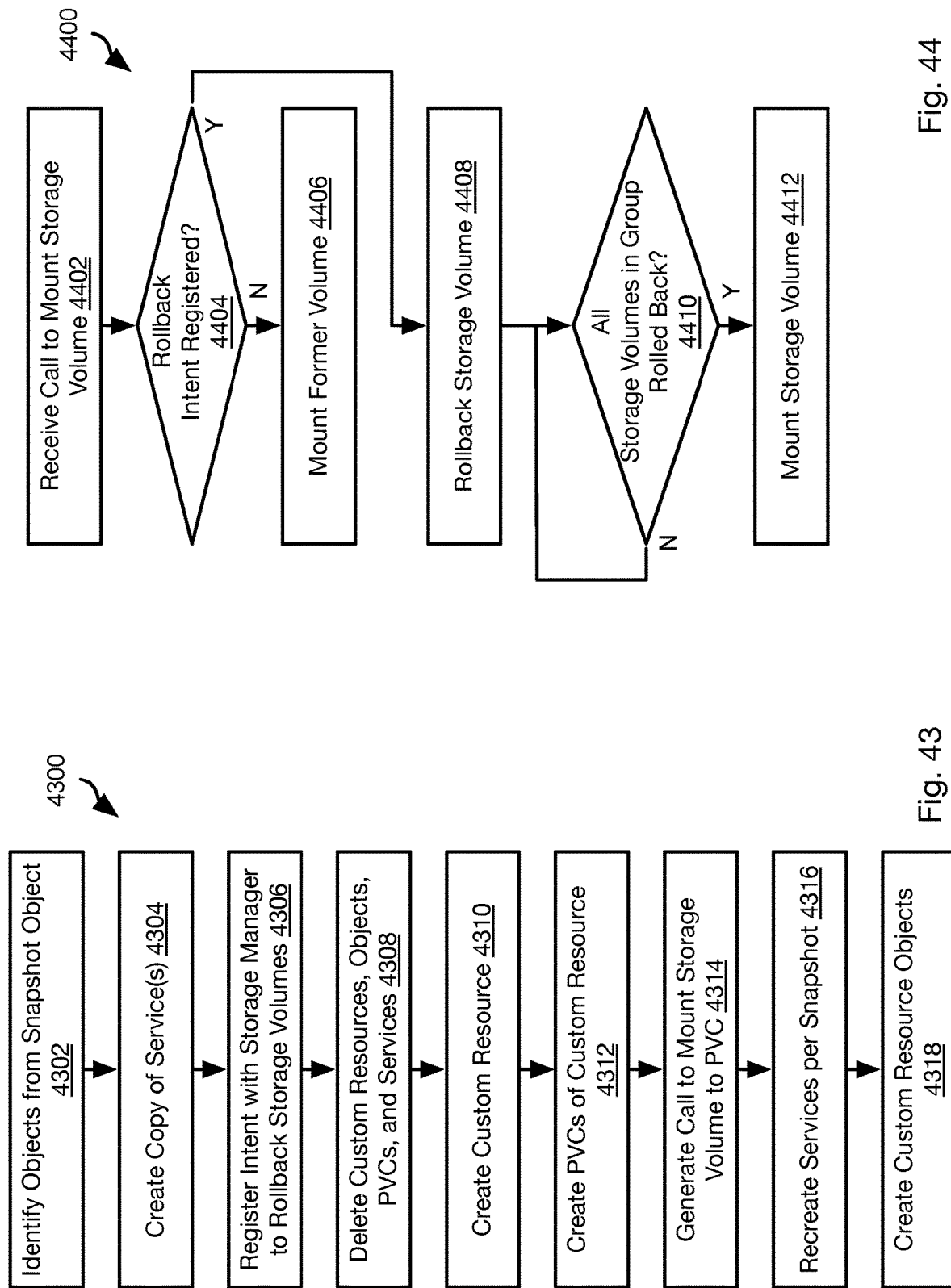

ROLLING BACK KUBERNETES APPLICATIONS

RELATED APPLICATIONS

This application is related to U.S. application Ser. No. 16/593,098 filed Oct. 4, 2019, which is incorporated herein by reference for all purposes.

BACKGROUND

Field of the Invention

This invention relates to orchestration of a multi-role application.

Background of the Invention

A multi-role application may include many objects providing different roles of the application. These objects may be application implementing services, storage volumes, databases, web servers, and the like. One environment that facilitates deployment of such applications is KUBERNETES, which was originally developed by GOOGLE.

It would be an advancement in the art to facilitate the deployment and management of multi-role applications, including those orchestrated using KUBERNETES.

BRIEF DESCRIPTION OF THE DRAWINGS

In order that the advantages of the invention will be readily understood, a more particular description of the invention briefly described above will be rendered by reference to specific embodiments illustrated in the appended drawings. Understanding that these drawings depict only typical embodiments of the invention and are not therefore to be considered limiting of its scope, the invention will be described and explained with additional specificity and detail through use of the accompanying drawings, in which:

FIG. 5 is a process flow diagram of a method for processing a snapshot instruction by a storage node in accordance with an embodiment of the present invention;

FIG. 6 is a process flow diagram of a method for performing garbage collection on segments in accordance with an embodiment of the present invention;

FIG. 43 is a process flow diagram of a method for rolling back an application including objects implemented using a custom resource in accordance with an embodiment of the present invention;

FIG. 44 is a process flow diagram of a method for rolling back storage volumes as part of the method of FIG. 43 in accordance with an embodiment of the present invention.

DETAILED DESCRIPTION

Figure 1:
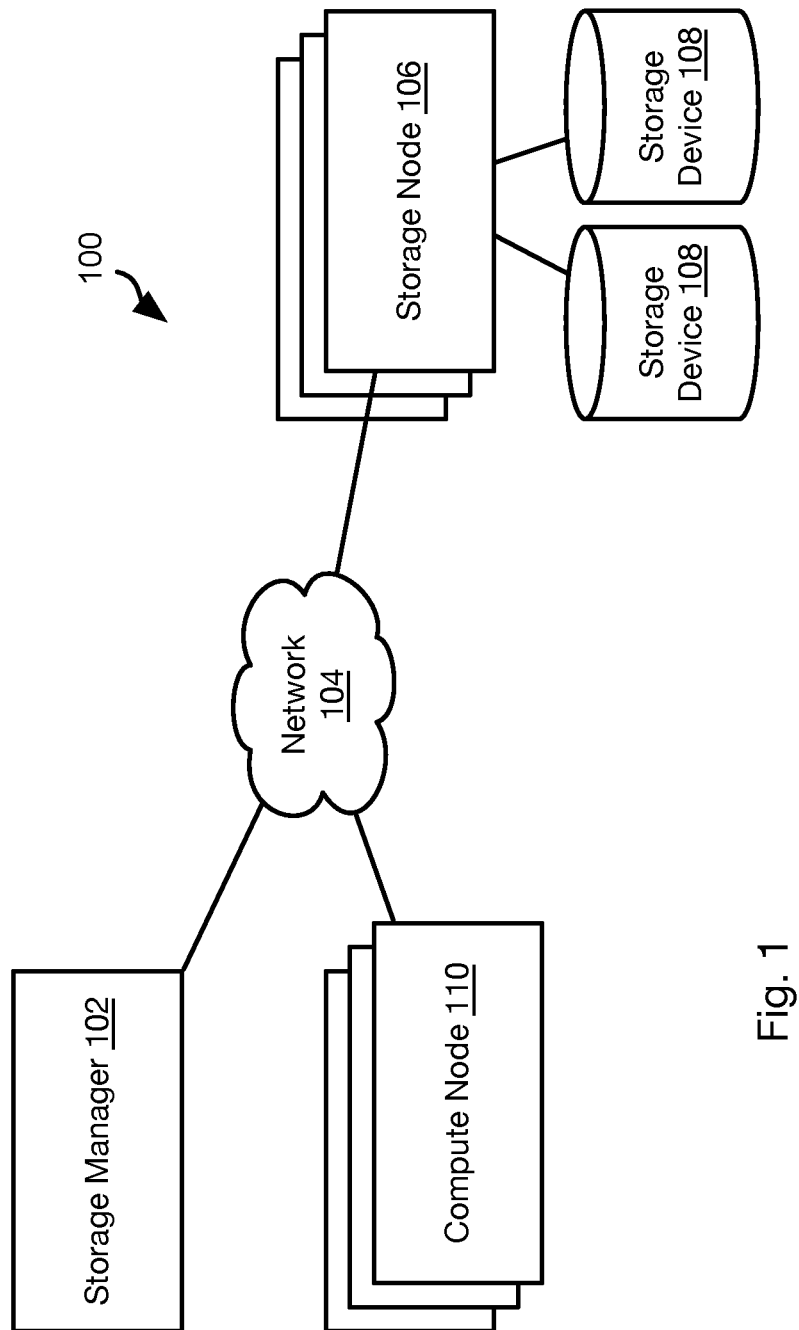
FIG. 1 is a schematic block diagram of a network environment for implementing methods in accordance with an embodiment of the present invention.

Referring to FIG. 1, the methods disclosed herein may be performed using the illustrated network environment 100. The network environment 100 includes a storage manager 102 that coordinates the creation of snapshots of storage volumes and maintains records of where snapshots are stored within the network environment 100. In particular, the storage manager 102 may be connected by way of a network 104 to one or more storage nodes 106, each storage node having one or more storage devices 108, e.g. hard disk drives, flash memory, or other persistent or transitory memory. The network 104 may be a local area network (LAN), wide area network (WAN), or any other type of network including wired, fireless, fiber optic, or any other type of network connections.

One or more compute nodes 110 are also coupled to the network 104 and host user applications that generate read and write requests with respect to storage volumes managed by the storage manager 102 and stored within the memory devices 108 of the storage nodes 108.

The methods disclosed herein ascribe certain functions to the storage manager 102, storage nodes 106, and compute node 110. The methods disclosed herein are particularly useful for large scale deployment including large amounts of data distributed over many storage nodes 106 and accessed by many compute nodes 110. However, the methods disclosed herein may also be implemented using a single computer implementing the functions ascribed herein to some or all of the storage manager 102, storage nodes 106, and compute node 110.

Figure 2:
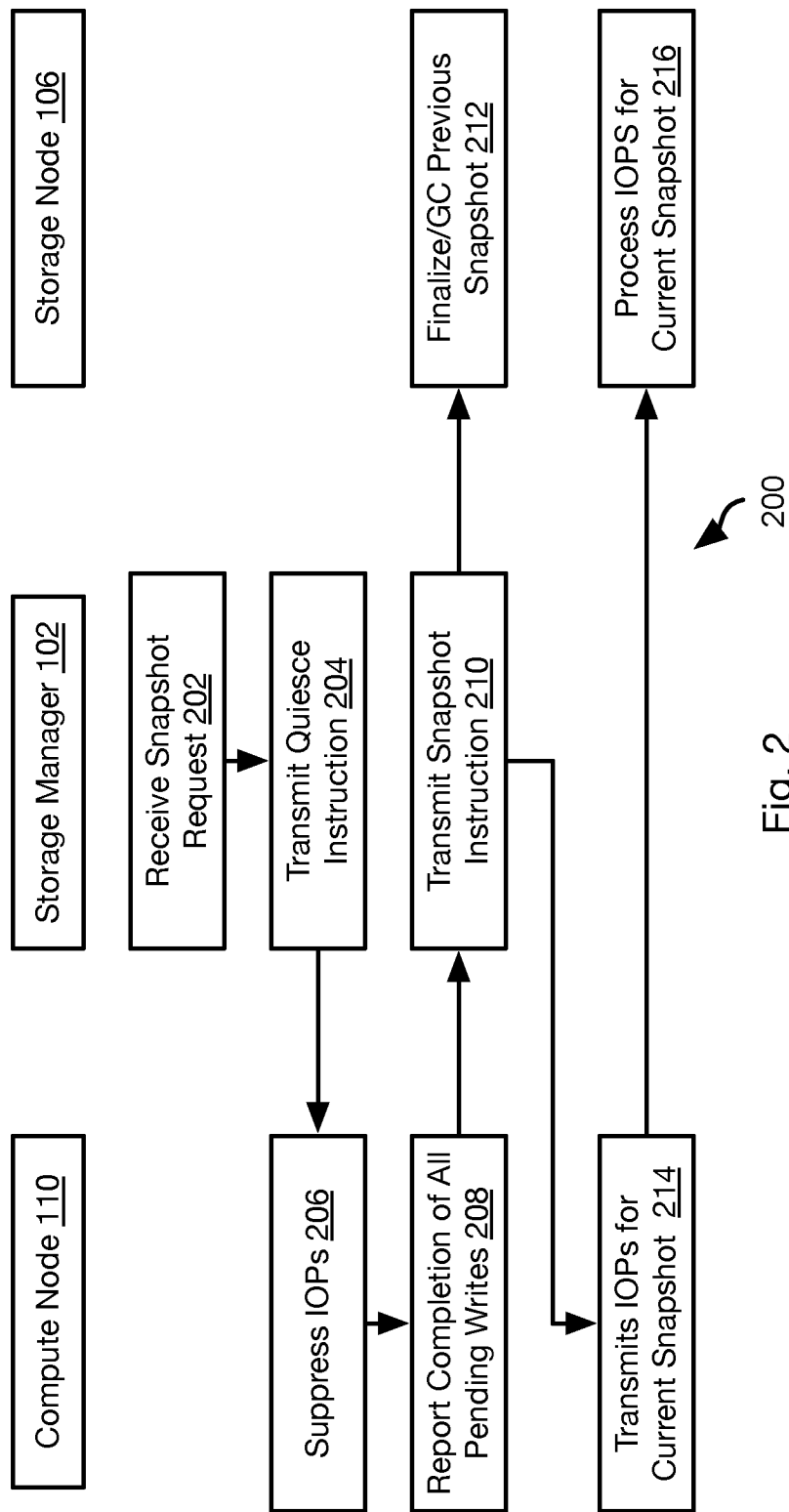
FIG. 2 is a process flow diagram of a method for coordinating snapshot creation with compute nodes and storage nodes in accordance with an embodiment of the present invention.

Referring to FIG. 2, the illustrated method 200 may be performed in order to invoke the creation of a new snapshot. Other than a current snapshot, which is still subject to change, a snapshot captures the state of a storage volume at a moment in time and is not altered in response to subsequent writes to the storage volume.

The method 200 includes receiving, by the storage manager 102 a request to create a new snapshot for a storage volume. A storage volume as referred to herein may be a virtual storage volume that may divided into individual slices. For example, storage volumes as described herein may be 1 TB and be divided into 1 GB slices. In general, a slice and its snapshot are stored on a single storage node 106, whereas a storage volume may have the slices thereof stored by multiple storage nodes 106.

The request received at step 202 may be received from a human operator or generated automatically, such as according to backup scheduler executing on the storage manager 102 or some other computing device. The subsequent steps of the method 200 may be executed in response to receiving 202 the request The method 200 may include transmitting 204 a quiesce instruction to all compute nodes 110 that are associated with the storage volume. For example, all compute nodes 110 that have pending write requests to the storage volume. In some embodiments, the storage manager 102 may store a mapping of compute nodes 110 to a particular storage volume used by the compute nodes 110. Accordingly, step 204 may include sending 204 the quiesce instruction to all of these compute nodes. Alternatively, the instruction may be transmitted 204 to all compute nodes 110 and include an identifier of the storage volume. The compute nodes 110 may then suppress any write instructions referencing that storage volume.

The quiesce instruction instructs the compute nodes 110 that receive it to suppress 206 transmitting write requests to the storage nodes 106 for the storage volume referenced by the quiesce instruction. The quiesce instruction may further cause the compute nodes 110 that receive it to report 208 to the storage manager 102 when no write requests are pending for that storage volume, i.e. all write requests issued to one or more storage nodes 106 and referencing slices of that storage volume have been acknowledged by the one or more storage nodes 106.

In response to receiving the report of step 208 from one or more compute nodes, e.g. all compute nodes that are mapped to the storage node that is the subject of the snapshot request of step 202, the storage manager 102 transmits 210 an instruction to the storage nodes 106 associated with the storage volume to create a new snapshot of that storage volume. Step 210 may further include transmitting 210 an instruction to the compute nodes 110 associated with the storage volume to commence issuing write commands to the storage nodes 106 associated with the storage volume. In some embodiments, the instruction of step 110 may include an identifier of the new snapshot. Accordingly, subsequent input/output operations (IOPs) transmitted 214 from the compute nodes may reference that snapshot identifier. Likewise, the storage node 106 may associate the snapshot identifier with data subsequently written to the storage volume, as described in greater detail below.

In response to receiving 210 the instruction to create a new snapshot, each storage node 106 finalizes 212 segments associated with the current snapshot, which may include performing garbage collection, as described in greater detail below. In addition, subsequent IOPs received by the storage node may also be processed 216 using the new snapshot as the current snapshot, as is also described in greater detail below.

Figure 3:
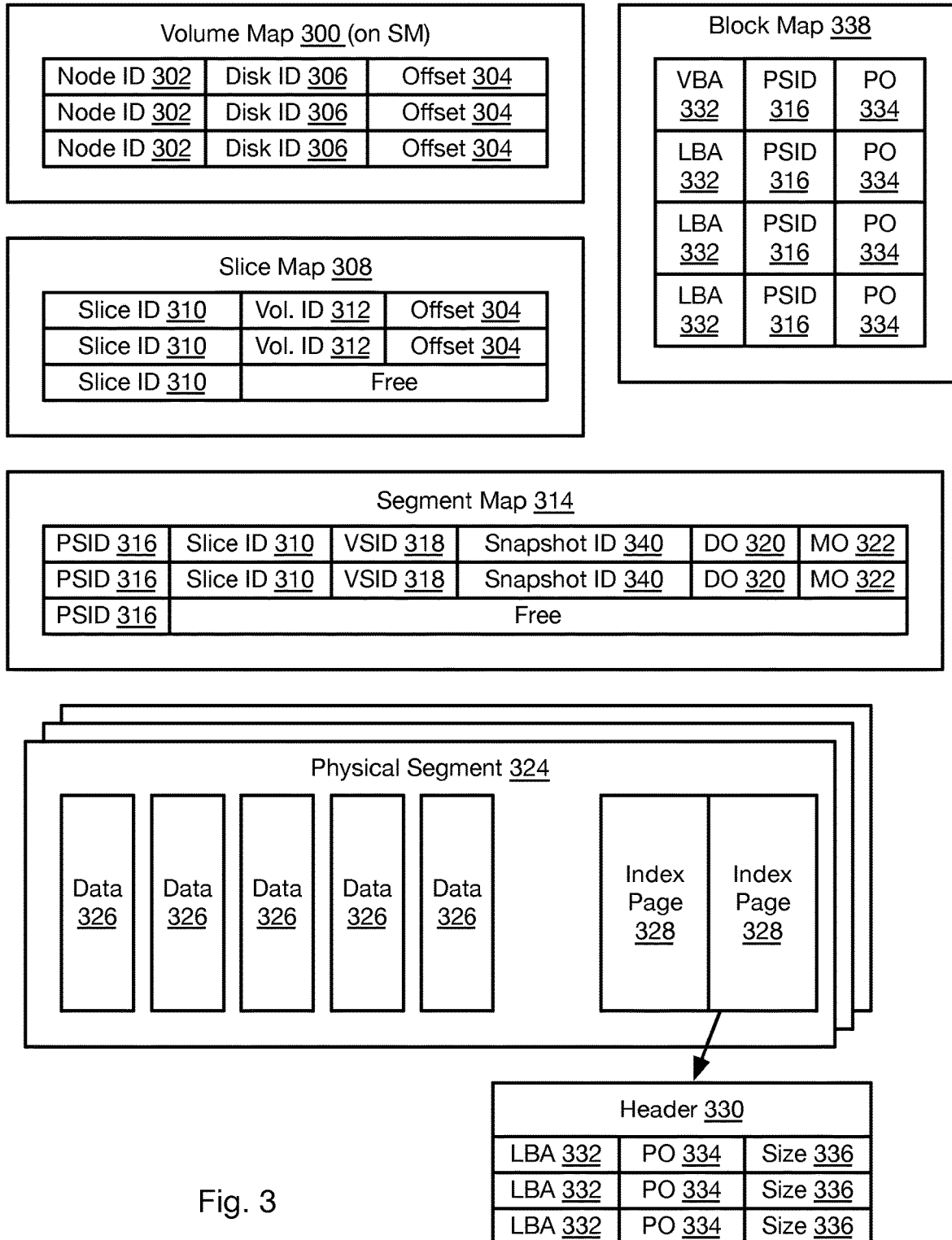
FIG. 3 is a schematic diagram illustrating the storage of data within a storage node in accordance with an embodiment of the present invention.

Referring to FIG. 3, the method by which slices are allocated, reassigned, written to, and read from may be understood with respect to the illustrated data storage scheme. The data of the storage scheme may be stored in transitory or persistent memory of the storage node 106, such as in the storage devices 108.

For each logical volume, the storage manager 102 may store and maintain a volume map 300. For each slice in the logical volume, the volume map may include an entry including a node identifier 302 identifying the storage node 106 to which the slice is assigned and an offset 304 within the logical volume at which the slice begins. In some embodiments, slices are assigned both to a storage node 106 and a specific storage device hosted by the storage node 106. Accordingly, the entry may further include a disk identifier of the storage node 106 referencing the specific storage device to which the slice is assigned.

The remaining data structures of FIG. 3 are stored on each storage node 106. The storage node 106 may store a slice map 308. The slice map 308 may include entries including a local slice identifier 310 that uniquely identifies each slice of the storage node 106, e.g. each slice of each storage device hosted by the storage node 106. The entry may further include a volume identifier 312 that identifies the logical volume to which the local slice identifier 310 is assigned. The entry may further include the offset 304 within the logical volume of the slice of the logical volume assigned to the storage node 106.

In some embodiments, an entry in the slice map 308 is created for a slice of the logical volume only after a write request is received that references the offset 304 for that slice. This further supports the implementation of overprovisioning such that slices may be assigned to a storage node 106 in excess of its actual capacity since the slice is only tied up in the slice map 308 when it is actually used.

The storage node 106 may further store and maintain a segment map 314. The segment map 314 includes entries either including or corresponding to a particular physical segment identifier (PSID) 316. For example, the segment map 314 may be in an area of memory such that each address in that area corresponds to one PSID 316 such that the entry does not actually need to include the PSID 316. The entries of the segment map 314 may further include a slice identifier 310 that identifies a local slice of the storage node 106 to which the PSID 316 has been assigned. The entry may further include a virtual segment identifier (VSID) 318. As described in greater detail below, each time a segment is assigned to logical volume and a slice of a logical volume, it may be assigned a VSID 318 such that the VSIDs 318 increase in value monotonically in order of assignment. In this manner, the most recent PSID 316 assigned to a logical volume and slice of a logical volume may easily be determined by the magnitude of the VSIDs 318 mapped to the PSIDs 316. In some embodiments, VSIDs 318 are assigned in a monotonically increasing series for all segments assigned to volume ID 312. In other embodiments, each offset 304 and its corresponding slice ID 310 is assigned VSIDs separately, such that each slice ID 310 has its own corresponding series of monotonically increasing VSIDs 318 assigned to segments allocated to that slice ID 310.

The entries of the segment map 314 may further include a data offset 320 for the PSID 316 of that entry. As described in greater detail below, when data is written to a segment it may be written at a first open position from a first end of the segment. Accordingly, the data offset 320 may indicate the location of this first open position in the segment. The data offset 320 for a segment may therefore be updated each time data is written to the segment to indicate where the new first open position is.

The entries of the segment map 314 may further include a metadata offset 322. As described in detail below, for each write request written to a segment, a metadata entry may be stored in that segment at a first open position from a second end of the segment opposite the first end. Accordingly, the metadata offset 322 in an entry of the segment map 314 may indicate a location of this first open position of the segment corresponding to the entry.

Each PSID 316 corresponds to a physical segment 324 on a device hosted by the storage node 106. As shown, data payloads 326 from various write requests are written to the physical segment 324 starting from a first end (left) of the physical segment. The physical segment may further store index pages 328 such that index pages are written starting from a second end (right) of the physical segment 324.

Each index page 328 may include a header 330. The header 330 may be coded data that enables identification of a start of an index page 328. The entries of the index page 328 each correspond to one of the data payloads 326 and are written in the same order as the data payloads 326. Each entry may include a logical block address (LBA) 332. The LBA 332 indicates an offset within the logical volume to which the data payload corresponds. The LBA 332 may indicate an offset within a slice of the logical volume. For example, inasmuch as the PSID 316 is mapped to a slice ID 310 that is mapped to an offset 304 within a particular volume ID 312, maps 308 and 314, and an LBA 332 within the slice may be mapped to the corresponding offset 304 to obtain a fully resolved address within the logical volume.

In some embodiments, the entries of the index page 328 may further include a physical offset 334 of the data payload 326 corresponding to that entry. Alternatively or additionally, the entries of the index page 328 may include a size 336 of the data payload 326 corresponding to the entry. In this manner, the offset to the start of a data payload 326 for an entry may be obtained by adding up the sizes 336 of previously written entries in the index pages 328.

The metadata offset 322 may point to the last index page 328 (furthest from right in illustrated example) and may further point to the first open entry in the last index page 328. In this manner, for each write request, the metadata entry for that request may be written to the first open position in the last index page 328. If all of the index pages 328 are full, a new index page 328 may be created and stored at the first open position from the second end and the metadata for the write request may be added at the first open position in that index page 328.

The storage node 106 may further store and maintain a block map 338. A block map 338 may be maintained for each logical volume and/or for each slice offset of each logical volume, e.g. for each local slice ID 310 which is mapped to a slice offset and logical volume by slice map 308. The entries of the block map 338 map include entries corresponding to each LBA 332 within the logical volume or slice of the logical volume. The entries may include the LBA 332 itself or may be stored at a location within the block map corresponding to an LBA 332.

The entry for each LBA 332 may include the PSID 316 identifying the physical segment 324 to which a write request referencing that LBA was last written. In some embodiments, the entry for each LBA 332 may further indicate the physical offset 334 within that physical segment 324 to which the data for that LBA was written. Alternatively, the physical offset 324 may be obtained from the index pages 328 of that physical segment. As data is written to an LBA 332, the entry for that LBA 332 may be overwritten to indicate the physical segment 324 and physical offset 334 within that segment 324 to which the most recent data was written.

In embodiments implementing multiple snapshots for a volume and slice of a volume, the segment map 314 may additionally include a snapshot ID 340 identifying the snapshot to which the PSID 316 has been assigned. In particular, each time a segment is allocated to a volume and slice of a volume, the current snapshot identifier for that volume and slice of a volume will be included as the snapshot ID 340 for that PSID 316.

In response to an instruction to create a new snapshot for a volume and slice of a volume, the storage node 106 will store the new current snapshot identifier, e.g. increment the previously stored current snapshot ID 340, and subsequently allocated segments will include the current snapshot ID 340. PSIDs 316 that are not filled and are allocated to the previous snapshot ID 340 may no longer be written to. Instead, they may be finalized or subject to garbage collection (see FIGS. 5 and 6).

Figure 4:
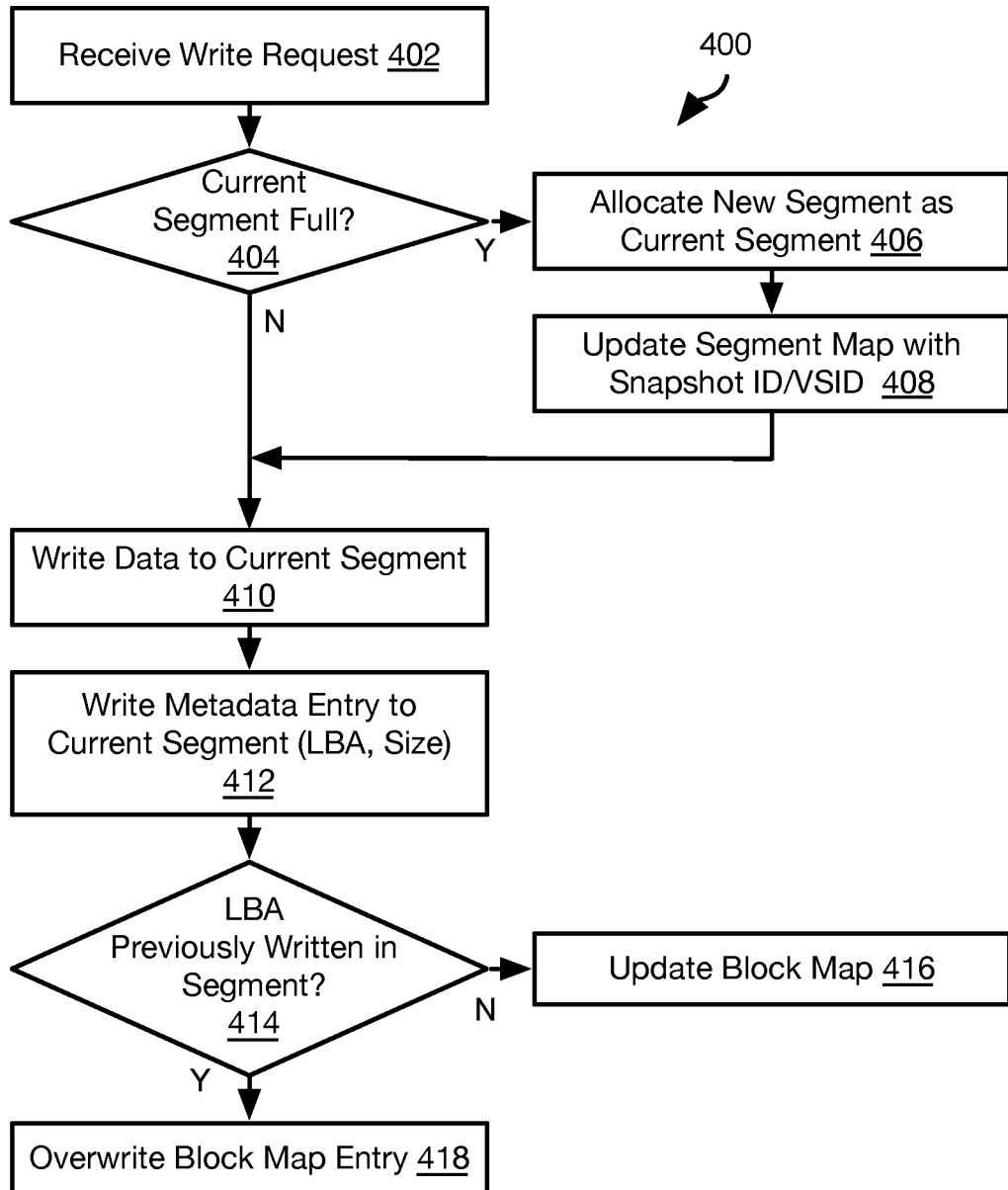
FIG. 4 is a process flow diagram of a method for processing write requests in a storage node in accordance with an embodiment of the present invention.

FIG. 4 illustrates a method 400 for executing write instructions by a storage node 106, such as write instructions received from an application executing on a compute node 110.

The method 400 includes receiving 402 a write request. The write request may include payload data, payload data size, and an LBA as well as fields such as a slice identifier, a volume identifier, and a snapshot identifier. Where a slice identifier is included, the LBA may be an offset within the slice, otherwise the LBA may be an address within the storage volume.

The method 400 may include evaluating 404 whether a PSID 316 is allocated to the snapshot referenced in the write request and whether the physical segment 324 corresponding to the PSID 316 ("the current segment") has space for the payload data. In some embodiments, as write requests are performed with respect to a PSID 316, the amount of data written as data 326 and index pages 328 may be tracked, such as by way of the data offset 320 and metadata offset 322 pointers. Accordingly, if the amount of previously-written data 326 and the number of allocated index pages 328 plus the size of the payload data and its corresponding metadata entry exceeds the capacity of the current segment it may be determined to be full at step 404.

If the current segment is determined 404 to be full, the method 400 may include allocating 406 a new PSID 316 as the current PSID 316 and its corresponding physical segment 324 as the current segment for the snapshot referenced in the write request. In some embodiments, the status of PSIDs 316 of the physical storage devices 108 may be flagged in the segment map 314 as allocated or free as a result of allocation and garbage collection, which is discussed below. Accordingly, a free PSID 316 may be identified in the segment map 314 and flagged as allocated.

The segment map 314 may also be updated 408 to include a slice ID 310 and snapshot ID 340 mapping the current PSID 316 to the snapshot ID, volume ID 312, and offset 304 included in the write request. Upon allocation, the current PSID 316 may also be mapped to a VSID (virtual segment identifier) 318 that will be a number higher than previously VSIDs 318 such that the VSIDs increase monotonically, subject, of course, to the size limit of the field used to store the VSID 318. However, the size of the field may be sufficiently large that it is not limiting in most situations.

The method 400 may include writing 410 the payload data to the current segment. As described above, this may include writing 410 payload data 326 to the free location closest to the first end of the current segment.

The method 400 may further include writing 412 a metadata entry to the current segment. This may include writing the metadata entry (LBA, size) to the first free location closest to the second end of the current segment. Alternatively, this may include writing the metadata entry to the first free location in an index page 328 that has room for it or creating a new index page 328 located adjacent a previous index page 328. Steps 410, 412 may include updating one or more pointers or table that indicates an amount of space available in the physical segment, such as a pointer 320 to the first free address closest to the first end and a pointer 322 to the first free address closest to the second end, which may be the first free address before the last index page 328 and/or the first free address in the last index page. In particular, these pointers may be maintained as the data offset 320 and metadata offset in the segment map 314 for the current PSID 316.

The method 400 may further include updating 416 the block map 338 for the current snapshot. In particular, for each LBA 332 referenced in the write request, an entry in the block map 338 for that LBA 332 may be updated to reference the current PSID 316. A write request may write to a range of LBAs 332. Accordingly, the entry for each LBA 332 in that range may be updated to refer to the current PSID 316.

Updating the block map 338 may include evaluating 414 whether an entry for a given LBA 332 referenced in the write request already exists in the block map 338. If so, then that entry is overwritten 418 to refer to the current PSID 316. If not, an entry is updated 416 in the block map 318 that maps the LBA 332 to the current PSID 316. In this manner, the block map 338 only references LBAs 332 that are actually written to, which may be less than all of the LBAs 332 of a storage volume or slice. In other embodiments, the block map 338 is of fixed size and includes and entry for each LBA 332 regardless of whether it has been written to previously. The block map 338 may also be updated to include the physical offset 334 within the current segment to which the data 326 from the write request was written.

In some embodiments, the storage node 106 may execute multiple write requests in parallel for the same LBA 332. Accordingly, it is possible that a later write can complete first and update the block map 338 whereas a previous write request to the same LBA 332 completes later. The data of the previous write request is therefore stale and the block map 338 should not be updated.

Suppressing of updating the block map 338 may be achieved by using the VSIDs 318 and physical offset 334. When executing a write request for an LBA, the VSID 318 mapped to the segment 324 and the physical offset 334 to which the data is to be, or was, written may be compared to the VSID 318 and offset 334 corresponding to the entry in the block map 338 for the LBA 332. If the VSID 318 mapped in the segment map 314 to the PSID 316 in the entry of the block map 338 corresponding to the LBA 332, then the block map 338 will not be updated. Likewise, if the VSID 318 corresponding to the PSID 316 in the block map 338 is the same as the VSID 318 for the write request and the physical offset 334 in the block map 338 is higher than the offset 334 to which the data of the write request is to be or was written, the block map 338 will not be updated for the write request.

As a result of steps 414-418, the block map 338 only lists the PSID 316 where the valid data for a given LBA 332 is stored. Accordingly, only the index pages 328 of the physical segment 324 mapped to the PSID 316 listed in the block map 338 need be searched to find the data for a given LBA 332. In instances where the physical offset 334 is stored in the block map 338, no searching is required.

FIG. 5 illustrates a method 500 executed by a storage node 106 in response to the new snapshot instruction of step 210 for a storage volume. The method 500 may be executed in response to an explicit instruction to create a new snapshot or in response to a write request that includes a new snapshot ID 340. The method 500 may also be executed with respect to a current snapshot that is still being addressed by new write requests. For example, the method 500 may be executed periodically or be triggered based on usage.

The method 500 may include allocating 502 a new PSID 316 and its corresponding physical segment 324 as the current PSID 316 and current segment for the storage volume, e.g., by including a slice ID 310 corresponding to a volume ID 312 and offset 304 included in the new snapshot instruction or the write request referencing the new snapshot ID 340. Allocating 502 a new segment may include updating 504 an entry in the segment map 314 that maps the current PSID 316 to the snapshot ID 340 and a slice ID 310 corresponding to a volume ID 312 and offset 304 included in the new snapshot instruction.

As noted above, when a PSID 316 is allocated, the VSID 318 for that PSID 316 may be a number higher than all VSIDs 318 previously assigned to that volume ID 312, and possibly to that slice ID 310 (where slices have separate series of VSIDs 318). The snapshot ID 340 of the new snapshot may be included in the new snapshot instruction or the storage node 106 may simply assign a new snapshot ID that is the previous snapshot ID 340 plus one.

The method 500 may further include finalizing 506 and performing garbage collection with respect to PSIDs 316 mapped to one or more previous snapshots IDs 340 for the volume ID 312 in the segment map 314, e.g., PSIDs 316 assigned to the snapshot ID 340 that was the current snapshot immediately before the new snapshot instruction was received.

FIG. 6 illustrates a method 600 for finalizing and performing garbage collection with respect to segment IDs 340 for a snapshot ("the subject snapshot"), which may include the current snapshot or a previous snapshot. The method 600 may include marking 602 as valid latest-written data for an LBA 332 in the PSID 316 having the highest VSID 318 in the segment map 314 and to which data was written for that LBA 332. Marking 602 data as valid may include making an entry in a separate table that lists the location of valid data or entries for metadata in a given physical segment 324 or setting a flag in the metadata entries stored in the index pages 328 of a physical segment 324, e.g., a flag that indicates that the data referenced by that metadata is invalid or valid.

Note that the block map 338 records the PSID 316 for the latest version of the data written to a given LBA 332. Accordingly, any references to that LBA 332 in the physical segment 324 of a PSID 316 mapped to a lower-numbered VSID 318 may be marked 604 as invalid. For the physical segment 324 of the PSID 316 in the block map 338 for a given LBA 332, the last metadata entry for that LBA 332 may be found and marked as valid, i.e. the last entry referencing the LBA 332 in the index page 328 that is the last index page 328 including a reference to the LBA 332. Any other references to the LBA 332 in the physical segment 324 may be marked 604 as invalid. Note that the physical offset 334 for the LBA 332 may be included in the block map 334, so all metadata entries not corresponding to that physical offset 334 may be marked as invalid.

The method 600 may then include processing 606 each segment ID S of the PSIDs 316 mapped to the subject snapshot according to steps 608-620. In some embodiments, the processing of step 606 may exclude a current PSID 316, i.e. the last PSID 302 assigned to the subject snapshot. As described below, garbage collection may include writing valid data from a segment to a new segment. Accordingly, step 606 may commence with the PSID 316 having the lowest-valued VSID 318 for the subject snapshot. As any segments 324 are filled according to the garbage collection process, they may also be evaluated to be finalized or subject to garbage collection as described below.

The method 600 may include evaluating 608 whether garbage collection is needed for the segment ID S. This may include comparing the amount of valid data in the physical segment 324 for the segment ID S to a threshold. For example, if only 40% of the data stored in the physical segment 324 for the segment ID S has been marked valid, then garbage collection may be determined to be necessary. Other thresholds may be used, such as value between 30% and 80%. In other embodiments, the amount of valid data is compared to the size of the physical segment 324, e.g., the segment ID S is determined to need garbage collection if the amount of valid data is less than X % of the size of the physical segment 324, where X is a value between 30 and 80, such as 40.

If garbage collection is determined 608 not to be needed, the method 600 may include finalizing 610 the segment ID S. Finalizing may include flagging the segment ID S in the segment map 314 as full and no longer available to be written to. This flag may be stored in another table that lists finalized PSIDs 316.

If garbage collection is determined 608 to be needed, then the method 600 may include writing 612 the valid data to a new segment. For example, if the valid data may be written to a current PSID 316, i.e. the most-recently allocated PSID 316 for the subject snapshot, until its corresponding physical segment 324 full. If there is no room in the physical segment 324 for the current PSID 316, step 612 may include assigning a new PSID 316 as the current PSID 316 for the subject snapshot. The valid data, or remaining valid data, may then be written to the physical segment 324 corresponding to the current PSID 316 for the subject snapshot.

Note that writing 612 the valid data to the new segment maybe processed in the same manner as for any other write request (see FIG. 4) except that the snapshot ID used will be the snapshot ID 340 of the subject snapshot, which may not be the current snapshot ID. In particular, the manner in which the new PSID 316 is allocated to the subject snapshot may be performed in the same manner described above with respect to steps 406-48 of FIG. 4. Likewise, the manner in which the valid data is written to the current segment may be performed in the same manner as for steps 410-412 of FIG. 4. In some embodiments, writing of valid data to a new segment as part of garbage collection may also include updating the block map with the new location of the data for an LBA 332, such as according to steps 414-418 of FIG. 4. When the physical segment 324 of the current PSID 316 is found to be full, it may itself be subject to the process 600 by which it is finalized or subject to garbage collection.

After the valid data is written to a new segment, the method 600 may further include freeing 614 the PSID S in the segment map 314, e.g., marking the entry in segment map 314 corresponding to PSID S as free.

The process of garbage collection may be simplified for PSIDs 316 that are associated with the subject snapshot in the segment map 314 but are not listed in the block map 338 with respect to any LBA 332. The physical segments 324 of such PSIDs 316 do not store any valid data. Entries for such PSIDs 316 in the segment map 314 may therefore simply be deleted and marked as free in the segment map 314

Figure 7:
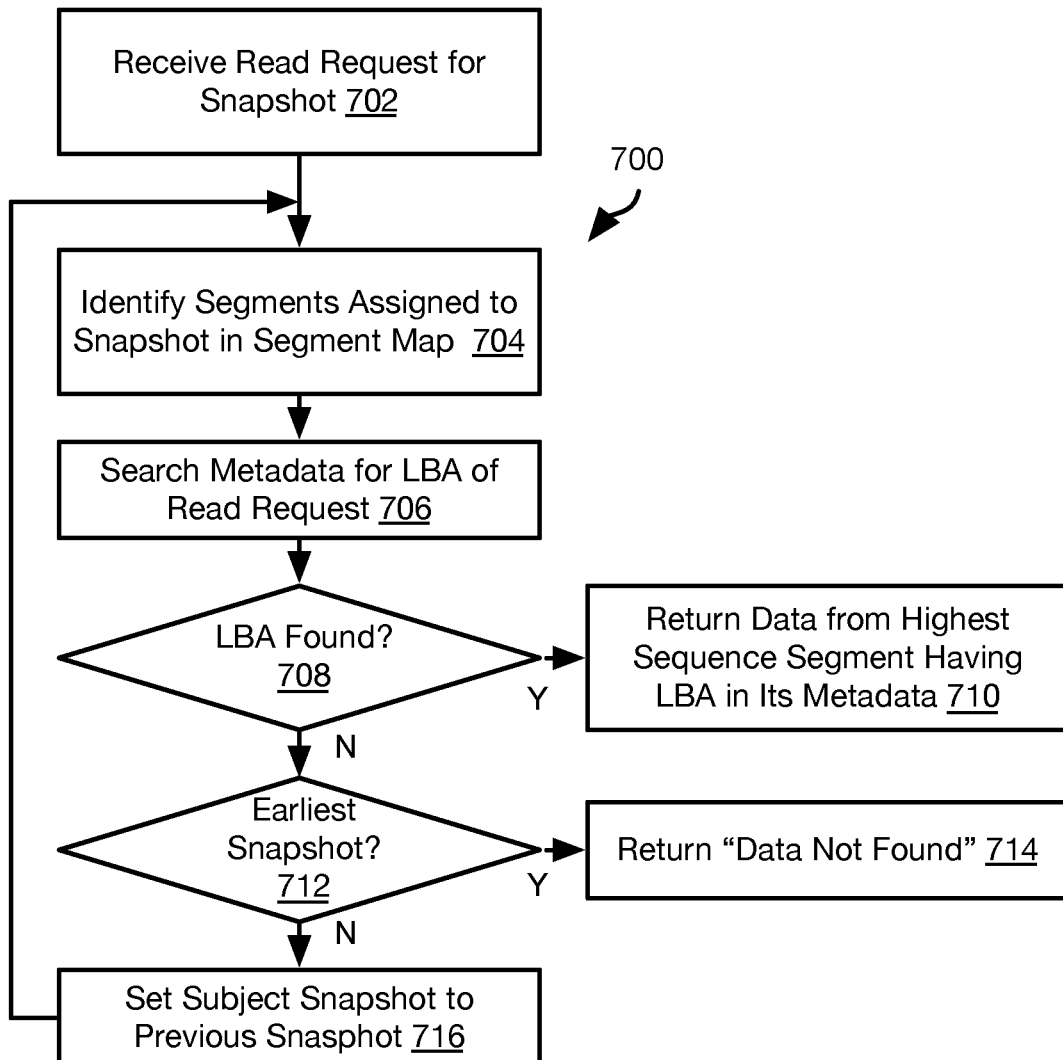
FIG. 7 is a process flow diagram of a method for reading data from a snapshot in accordance with an embodiment of the present invention.

FIG. 7 illustrates a method 700 that may be executed by a storage node 106 in response to a read request. The read request may be received from an application executing on a compute node 110. The read request may include such information as a snapshot ID, volume ID (and/or slice ID), LBA, and size (e.g. number of 4 KB blocks to read).

The following steps of the method 700 may be initially executed using the snapshot ID 340 included in the read request as "the subject snapshot," i.e., the snapshot that is currently being processed to search for requested data. The method 700 includes receiving 702 the read request by the storage node 106 and identifying 704 one or more PSIDs 316 in the segment map 314 assigned to the subject snapshot and searching 706 the metadata entries for these PSIDs 316 for references to the LBA 332 included in the read request.

The searching of step 706 may be performed in order of decreasing VSID 318, i.e. such that the metadata entries for the last allocated PSID 316 is searched first. In this manner, if reference to the LBA 332 is found, the metadata of any previously-allocated PSIDs 316 does not need to be searched.

Searching 706 the metadata for a PSID 316 may include searching one or more index pages 328 of the physical segment 324 corresponding to the PSID 316. As noted above, one or more index pages 328 are stored at the second end of the physical segment 324 and entries are added to the index pages 328 in the order they are received. Accordingly, the last-written metadata including the LBA 332 in the last index page 328 (furthest from the second end of the physical segment 324) in which the LBA 332 is found will correspond to the valid data for that LBA 332. To locate the data 326 corresponding to the last-written metadata for the LBA 332 in the physical segment 324, the sizes 336 for all previously-written metadata entries may be summed to find a start address in the physical segment 324 for the data 326. Alternatively, if the physical offset 334 is included, then the data 326 corresponding to the metadata may be located without summing the sizes 336.

If reference to the LBA 332 is found 708 in the physical segment 324 for any of the PSIDs 316 allocated to the subject snapshot, the data 326 corresponding to the last-written metadata entry including that LBA 332 in the physical segment 324 mapped to the PSID 316 having the highest VSID 318 of all PSIDs 316 in which the LBA is found will be returned 710 to the application that issued the read request.

If the LBA 332 is not found in the metadata entries for any of the PSIDs 316 mapped to subject snapshot, the method 700 may include evaluating 712 whether the subject snapshot is the earliest snapshot for the storage volume of the read request on the storage node 106. If so, then the data requested is not available to be read and the method 700 may include returning 714 a "data not found" message or otherwise indicating to the requesting application that the data is not available.

If an earlier snapshot than the subject snapshot is present for the storage volume on the storage node 106, e.g., there exists at least one PSID 316 mapped to a snapshot ID 340 that is lower than the snapshot ID 340 of the subject snapshot ID, then the immediately preceding snapshot ID 340 will be set 716 to be the subject snapshot and processing will continue at step 704, i.e. the PSIDs 316 mapped to the subject snapshot will be searched for the LBA 332 in the read request as described above.

The method 700 is particularly suited for reading data from snapshots other than the current snapshot that is currently being written to. In the case of a read request from the current snapshot, the block map 338 may map each LBA 332 to the PSID 316 in which the valid data for that LBA 332 is written. Accordingly, for such embodiments, step 704 may include retrieving the PSID 332 for the LBA 332 in the write request from the block map 338 and only searching 706 the metadata corresponding to that PSID 316. Where the block map 338 stores a physical offset 334, then the data is retrieved from that physical offset within the physical segment 314 of the PSID 336 mapped to the LBA 332 of the read request.

In some embodiments, the block map 332 may be generated for a snapshot other than the current snapshot in order to facilitate executing read requests, such as where a large number of read requests are anticipated in order to reduce latency. This may include searching the index pages 328 of the segments 324 allocated to the subject snapshot and its preceding snapshots to identify, for each LBA 332 to which data has been written, the PSID 316 having the highest VSID 318 of the PSIDs 316 having physical segments 324 storing data written to the each LBA 332. This PSID 316 may then be written to the block map 318 for the each LBA 332. Likewise, the physical offset 334 of the last-written data for that LBA 332 within the physical segment 324 for that PSID 316 may be identified as described above (e.g., as described above with respect to steps 704-716).

Figure 8:
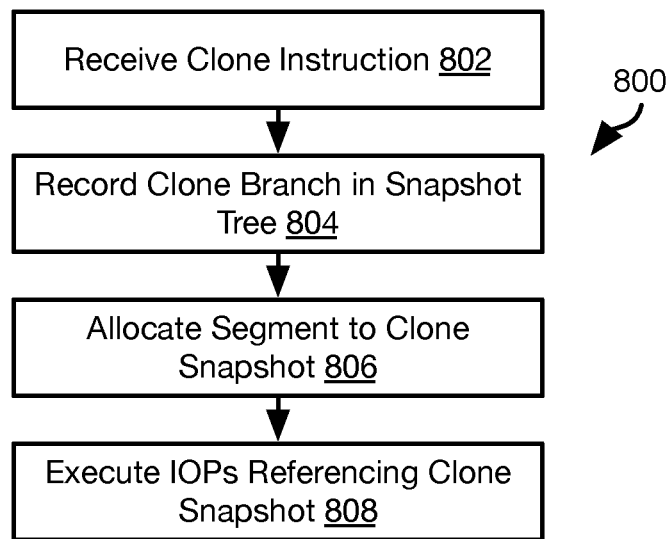
FIG. 8 is a process flow diagram of a method for cloning a snapshot in accordance with an embodiment of the present invention.

Referring to FIG. 8, in some instances it may be beneficial to clone a storage volume. This may include capturing a current state of a principal copy of a storage volume and making changes to it without affecting the principal copy of the storage volume. For purposes of this disclosure a "principal copy" or "principal snapshot" of a storage volume refers to an actual production copy that is part of a series of snapshots that is considered by the user to be the current, official, or most up-to-date copy of the storage volume. In contrast, a clone snapshot is a snapshot created for experimentation or evaluation but changes to it are not intended by the user to become part of the production copy of the storage volume. Stated differently, only one snapshot may be a principal snapshot with respect to an immediately preceding snapshot, independent of the purpose of the snapshot. Any other snapshots that are immediate descendants of the immediately preceding snapshot are clone snapshots.

The illustrated method 800 may be executed by the storage manager 102 and one or more storage nodes 106 in order to implement this functionality. The method 800 may include receiving 802 a clone instruction and executing the remaining steps of the method 800 in response to the clone instruction. The clone instruction may be received by the storage manager 102 from a user or be generated according to a script or other program executing on the storage manager 102 or a remote computing device in communication with the storage manager 102.

Figure 9:
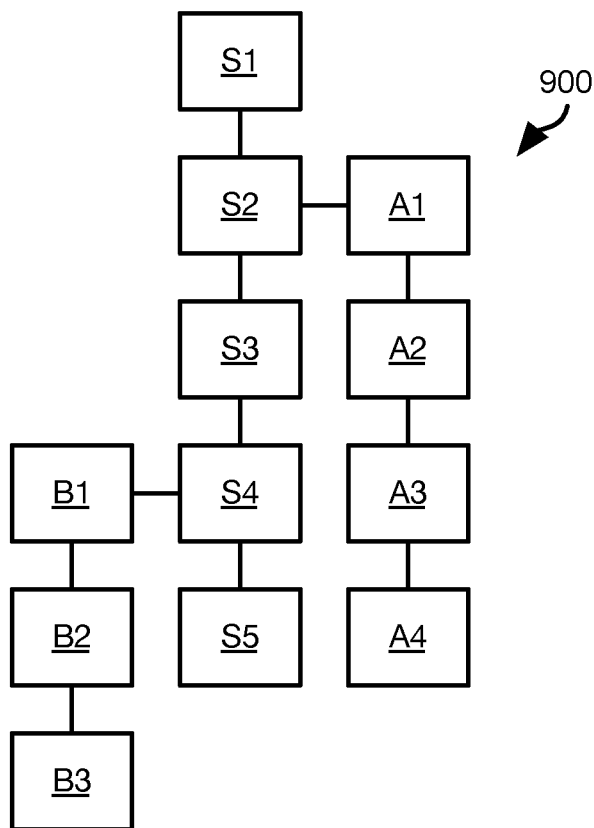
FIG. 9 illustrates a snapshot hierarchy created in accordance with an embodiment of the present invention.

The method 800 may include recording 804 a clone branch in a snapshot tree. For example, referring to FIG. 9, in some embodiments, for each snapshot that is created for a storage volume, the storage manager 102 may create a node S1-S5 in a snapshot hierarchy 900. In response to a clone instruction, the storage manager 102 may create a clone snapshot and branch to a node A1 representing the clone snapshot. In the illustrated example, a clone instruction was received with respect to the snapshot of node S2. This resulted in the creation of clone snapshot represented by node A1 that branches from node S2. Note node S3 and its descendants are also connected to node S2 in the hierarchy.

In some embodiments, the clone instruction may specify which snapshot the clone snapshot is of In other embodiments, the clone instruction may be inferred to be a snapshot of a current snapshot. In such embodiments, a new principal snapshot may be created and become the current snapshot. The previous snapshot will then be finalized and be subject to garbage collection as described above. The clone will then branch from the previous snapshot. In the illustrated example, if node S2 represented the current snapshot, then a new snapshot represented by node S3 would be created. The snapshot of node S2 would then be finalized and subject to garbage collection and clone snapshot represented by A1 would be created and node A1 would be added to the hierarchy as a descendent of node S2.

In some embodiments, the clone node A1, and possibly its descendants A2 to A4 (representing subsequent snapshots of the clone snapshot), may be distinguished from the nodes S1 to S5 representing principal snapshots, such as by means of a flag, a classification of the connection between the node A1 and node S2 that is its immediate ancestor, or by storing data defining node A1 in a separate data structure.

Following creation of a clone snapshot, other principal snapshots of the storage volume may be created and added to represented in the hierarchy by one or more nodes S2 to S5. A clone may be created of any of these snapshots and represented by additional clone nodes. In the illustrated example, node B1 represents a clone snapshot of the snapshot represented by node S4. Subsequent snapshots of the clone snapshot are represented by nodes B1 to B3.

Referring again to FIG. 8, the creation of a clone snapshot on the storage node 106 may be performed in the identical manner as for any other snapshot, such as according to the methods of FIGS. 2 through 6. In particular, one or more segments 806 may be allocated to the clone snapshot on storage nodes 106 storing slices of the cloned storage volume and mapped to the clone snapshot. IOPs referencing the clone snapshot may be executed 808, such as according to the method 400 of FIG. 4.

In some instances, it may be desirable to store a clone snapshot on a different storage node 106 than the principal snapshots. Accordingly, the method 800 may include allocating 806 segments to the clone snapshot on the different storage node 106. This may be invoked by sending a new snapshot instruction referencing the clone snapshot (i.e., an identifier of the clone snapshot) to the different storage node 106 and instructing one or more compute nodes 110 to route IOPs for the clone snapshot to the different storage node 106.

The storage manager 102 may store in each node of the hierarchy, data identifying one or more storage nodes 106 that store data for the snapshot represented by that node of the hierarchy. For example, each node may store or have associated therewith one or more identifiers of storage nodes 106 that store a particular snapshot ID for a particular volume ID. The node may further map one or more slice IDs (e.g., slice offsets) of a storage volume to one storage nodes 106 storing data for that slice ID and the snapshots for that slice ID.

Figure 10:
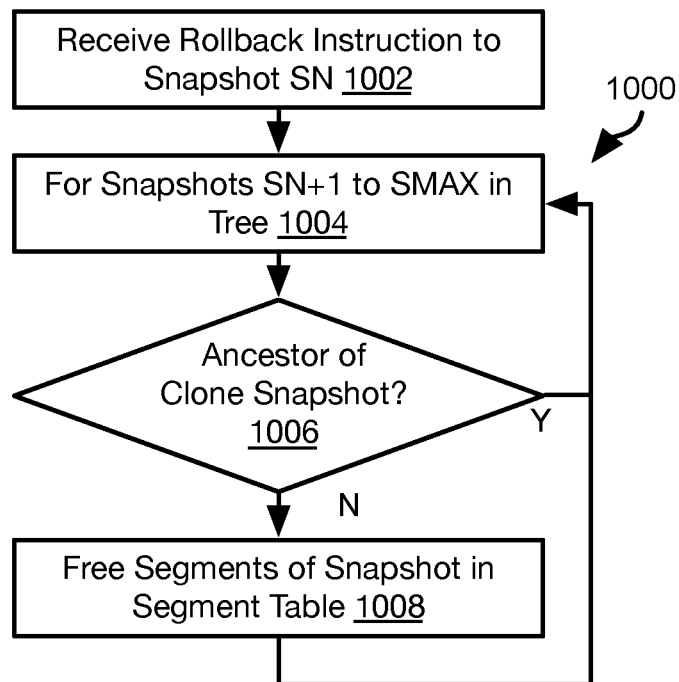
FIG. 10 is a process flow diagram of a method for rolling back to a prior snapshot in accordance with an embodiment of the present invention.

Referring to FIG. 10, one of the benefits of snapshots is the ability to capture the state of a storage volume such that it can be restored at a later time. FIG. 10 illustrates a method 1000 for rolling back a storage volume to a previous snapshot, particularly for a storage volume having one or more clone snapshots.

The method 1000 includes receiving 1002, by the storage manager 102, an instruction to rollback a storage volume to a particular snapshot SN. The method 1000 may then include processing 1004 each snapshot that is a represented by a descendent node of the node representing snapshot SN in the snapshot hierarchy, i.e. snapshots SN+1 to SMAX, where SMAX is the last principal snapshot that is a descendent of snapshot SN (each "descendent snapshot"). For each descendent snapshot, processing 1004 may include evaluating 1006 whether the each descendent is an ancestor of a node representing a clone snapshot. If not, then the storage manager 102 may instruct all storage nodes 106 storing segments mapped to the descendent snapshot to free 1008 these segments, i.e. delete entries from the segment map referencing the descendent snapshot and marking corresponding PSIDs 316 as free in the segment map 314.

If the descendent snapshot is found 1006 to be an ancestor of a clone snapshot, then step 1008 is not performed and the snapshot and any segments allocated to it are retained.

Figure 11:
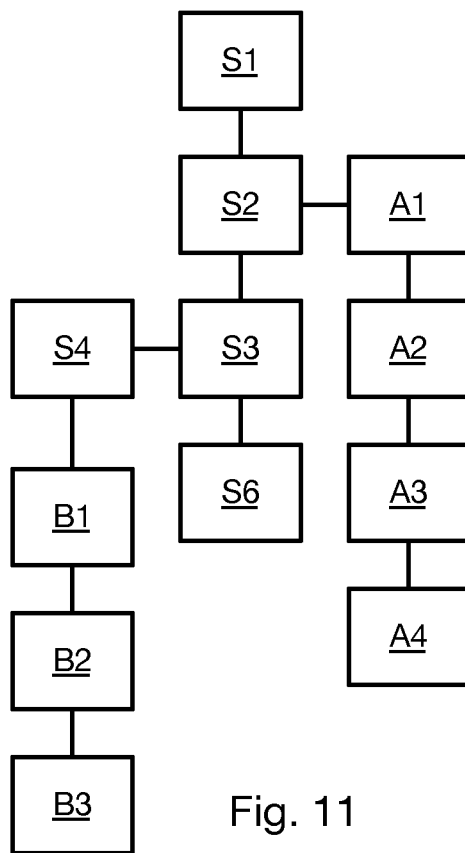
FIG. 11 illustrates the snapshot hierarchy of FIG. 9 as modified according to the method of FIG. 10 in accordance with an embodiment of the present invention.

FIG. 11 illustrates the snapshot hierarchy following execution of the method 1000 with respect to the snapshot represented by node S3. As is apparent, snapshot S5 has been removed from the hierarchy and any segments corresponding to these snapshots will have been freed on one or more storage nodes 106.

However, since node S4 is an ancestor of clone node B1, it is not removed and segments corresponding to it are not freed on one or more storage nodes in response to the roll back instruction. Inasmuch as each snapshot contains only data written to the storage volume after it was created, previous snapshots may be required to recreate the storage volume. Accordingly, the snapshots of nodes S3 to S1 are needed to create the snapshot of the storage volume corresponding to node B1.

Subsequent principal snapshots of the storage volume will be added as descendants of the node to which the storage volume was rolled back. In the illustrated example, a new principal snapshot is represented by node S6 that is an immediate descendent of node S3. Node S4 is only present due to clone node B1 and therefore may itself be classified as a clone node in the hierarchy in response to the rollback instruction of step 1002.

Note that FIG. 11 is a simple representation of a hierarchy. There could be any number of clone snapshots, clones of clone snapshots and descendent snapshots of any of these snapshots represented by nodes of a hierarchy. Accordingly, to roll back to a particular snapshot of a clone, the method 1000 is the same, except that descendants of the clone snapshot are treated the same as principal snapshots and clones of any of these descendants are treated the same as a clone snapshot.

Figure 12:
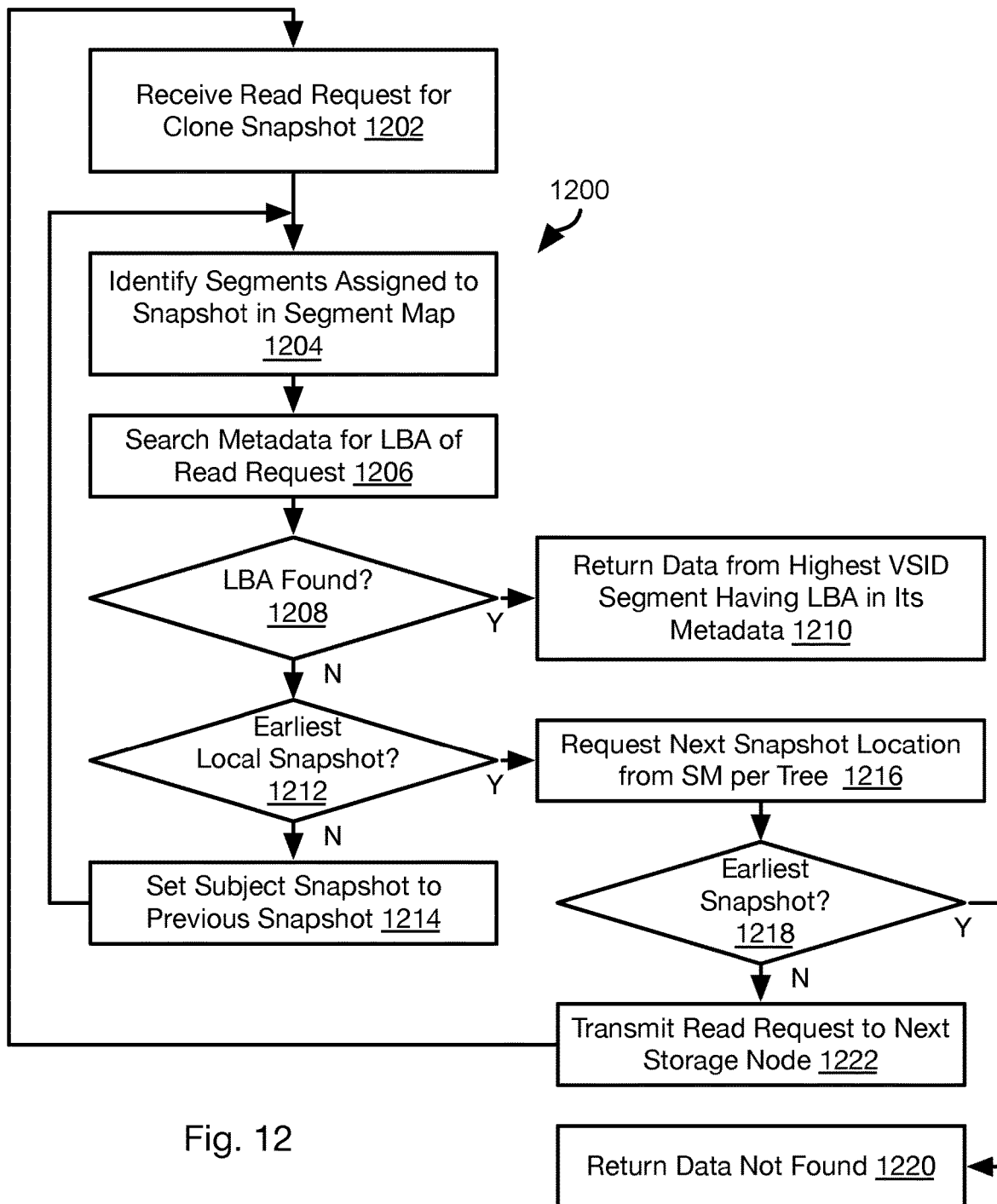
FIG. 12 is a process flow diagram of a method for reading from a clone snapshot in accordance with an embodiment of the present invention.

Referring to FIG. 12, the illustrated method 1200 may be used to execute a read request with respect to a storage volume that is represented by a hierarchy generated as described above with respect to FIGS. 8 through 11. The illustrated method 1200 may also be executed with respect to a storage volume that includes only principal snapshots that are distributed across multiple storage nodes, i.e., all the segments corresponding to snapshots of the same slice of the storage volume are not located on the same storage node 106. In that case, the hierarchy stored on the storage manager 102 stores the location of the segments for each snapshot and therefore enables them to be located.

The method 1200 may be executed by a storage node 106 ("the current storage node") with information retrieved from the storage manager 102 as noted below. The method 1200 may include receiving 1202 a read request, which may include such information as a snapshot ID, volume ID (and/or slice ID), LBA, and size (e.g. number of 4 KB blocks to read).

Note that the read request may be issued by an application executing on a compute node 110. The compute node 110 may determine which storage node 106 to transmit the read request using information from the storage manager 102. For example, the compute node 110 may transmit a request to obtain an identifier for the storage node 102 storing data for a particular slice and snapshot of a storage volume. The storage manager may then obtain an identifier and/or address for the storage node 106 storing that snapshot and slice of the storage volume from the hierarchical representation of the storage volume and return it to the requesting compute node 110. For example, the storage manager 102 may retrieve this information from the node in the hierarchy representing the snapshot included in the read request.

In response to the read request, the current storage node performs the algorithm illustrated by subsequent steps of the method 1200. In particular, the method 1200 may include identifying 1204 segments assigned to the snapshot ID of the read request in the segment ("the subject snapshot").

The method 1200 may include searching 1206 the metadata of the segments identified in step 1204 for the LBA of the read request. If the LBA is found, the data from the highest numbered segment having the LBA in its metadata is returned, i.e. the data that corresponds to the last-written metadata entry including the LBA.

If the LBA is not found in any of the segments mapped to subject snapshot, then the method 1200 may include evaluating 1212 whether the subject snapshot is the earliest snapshot on the current storage node. If not, then steps processing continues at step 1204 with the previous snapshot set 1214 as the subject snapshot.

Steps 1204-1214 may be performed in the same manner as for steps 704-714 of the method 700, including the various modifications and variations described above with respect to the method 700.

In contrast to the method 700, if the LBA is not found in any of the segments corresponding to the subject snapshot for any of the snapshots evaluated, then the method 1200 may include requesting 1216 a location, e.g. storage node identifier, where an earlier snapshot for the volume ID or slice ID is stored. In response to this request, the storage manager 102 determines an identifier of a storage node 106 storing the snapshot corresponding to the immediate ancestor of the earliest snapshot stored on the current storage node in the hierarchy. The storage manager 102 may determine an identifier of the storage node 106 relating to the immediate-ancestor snapshot and that stores data for a slice ID and volume ID of the read request as recorded for the ancestor nearest ancestor node in the hierarchy of the node corresponding to the earliest snapshot stored on the current storage node.

If the current storage node is found 1218 to be the earliest snapshot for the storage volume ID and/or slice ID of the read request, then the data the storage manager 102 may report this fact to the storage node, which will then return 1220 a message indicating that the requested LBA is not available for reading, such as in the same manner as step 714 of the method 700.

If another storage node stores an earlier snapshot for the volume ID and/or slice ID of the read request, then the read request may be transmitted 1222 to this next storage node by either the current storage node or the storage manager 102. The processing may then continue at step 1202 with the next storage node as the current storage node. The read request transmitted at step 1222 may have a snapshot ID set to the latest snapshot ID for the storage volume ID and or slice ID of the original read request.

The method 1200 may be performed repeatedly across multiple storage nodes 106 until the earliest snapshot is encountered or the LBA of the read request is located.

Figure 13:
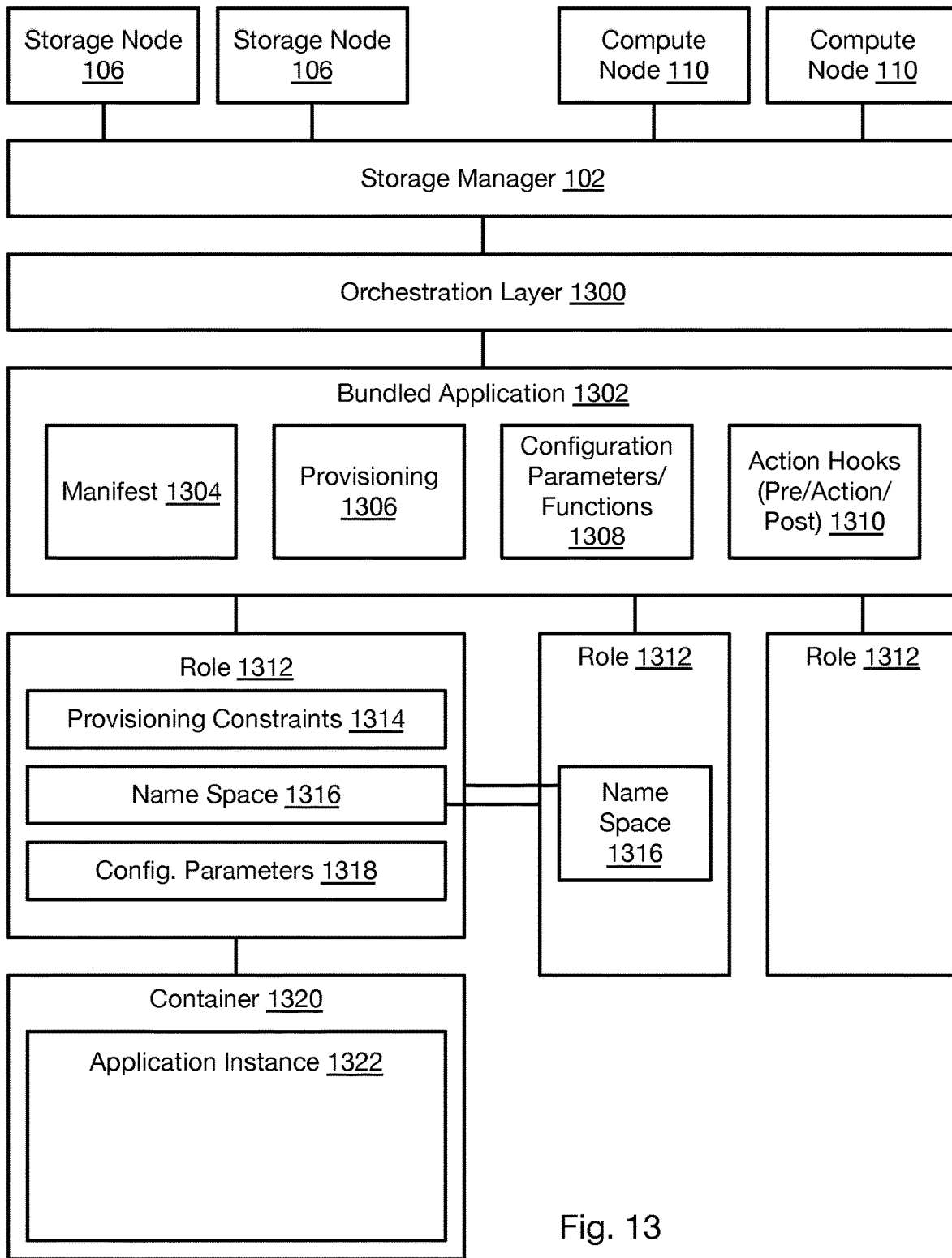
FIG. 13 is a schematic block diagram of components for implementing orchestration of multi-role applications in accordance with an embodiment of the present invention.

Referring to FIG. 13, storage according to the above-described methods and systems may be incorporated into an application-orchestration approach. In the illustrates approach, an orchestration layer 1300 implements a bundled application 1302 including a plurality of roles. In the following description, "bundled application" refers to a bundle of applications as implemented using the orchestration layer. A "role" is an instance of an executable that is managed by the orchestration layer as described herein as part of the bundled application. Accordingly, a "role" may itself be a standalone application, such as a database, webserver, blogging application, or any other application. Examples of roles include the roles used to implement multi-role applications such as CASSANDRA, HADOOP, SPARK, DRUID, SQL database, ORACLE database, MONGODB database, WORDPRESS, and the like. For example, in HADOOP, roles may include one or more of a named node, data node, zookeeper, and AMBARI server.

The orchestration layer 1300 may implement a bundled application 1302 defining roles and relationships between roles as described in greater detail below. The orchestration layer 1300 may execute on a computing device of a distributed computing system (see e.g., FIG. 1), such as on a compute node 110, storage node 106, a computing device executing the functions of the storage manager 102, or some other computing device. Accordingly, actions performed by the orchestration layer may be interpreted as being performed by the computing device executing the orchestration layer 1300.

The bundled application 1302 may include a manifest 1304 that defines the roles of the bundled application 1302, which may include identifiers of roles and possibly a number of instances for each role identified. The manifest 1304 may define dynamic functions define how the number of instances of particular role may grow or shrink depending on usage. The orchestration layer 1300 may then create or remove instances for a role as described below as indicated by usage and one or more functions for that role. The manifest 1304 may define a topology of the bundled application 1302, i.e. the relationship between roles, such as services of a role that are accessed by another role.

The bundled application 1302 may include provisioning 1306. The provisioning 1306 defines the resources of storage nodes 106 and compute nodes 110 required to implement the bundle. The provisioning 1306 may define resources for the bundle as a whole or for individual roles. Resources may include a number of processors (e.g., processing cores), an amount of memory (e.g., RAM (random access memory), an amount of storage (e.g., GB (gigabytes) on a HDD (Hard Disk Drive) or SSD (Solid State Drive)). As described below, these resources may be provisioned in a virtualized manner such that the bundled application 1302 and individual roles 1312 are not informed of the actual location or processing and storage resources and are relieved from any responsibility for managing such resources. In particular, storage resources may be virtualized by the storage manager 102 using the methods described above such that storage volumes are allocated and used without requiring the bundled application 1302 or roles to manage the underlying storage nodes 106 and storage device 108 on which the data of the storage volumes is written.

Provisioning 1306 may include static specification of resources and may also include dynamic provisioning functions that will invoke allocation of resources in response to usage of the bundled application. For example, as a database fills up, additional storage volumes may be allocated. As usage of a bundled application increases, additional processing cores and memory may be allocated to reduce latency.

A bundled application 1302 may further include configuration parameters 1308. Configuration parameters may include variables and settings for each role of the bundle. The configuration parameters are defined by the developer of the role and therefore may include any example of such parameters for any application known in the art. The configuration parameters may be dynamic or static. For example, some parameters may be dependent on resources such as an amount of memory, processing cores, or storage. Accordingly, these parameters may be defined as a function of these resources. The orchestration layer will then update such parameters according to the function in response to changes in provisioning of those resources that are inputs to the function. For example, CASSANDRA defines a variable Max_Heap_Size that is normally set to half the memory limit. Accordingly, as the memory provisioned for a CASSANDRA role increases, the value of Max_Heap_Size may be increased to half the increased memory.

The bundled application 1302 may further include action hooks 1310 for various actions that may be taken with respect to the bundled application and/or particular roles of the bundled applications. Actions may include some or all of stopping, starting, restarting, taking snapshots, cloning, and rolling back to a prior snapshot. For each action, one or more action hooks may be defined. A hook is a programmable routine that is executed by the orchestration layer when the corresponding action is invoked. A hook may specify a script of commands or configuration parameters input to one or more roles in a particular order. Hooks for an action may include a pre-action hook (executed prior to implementing an action), an action hook (executed to actually implement the action), and a post action hook (executed following implementation of the action).

The bundled application 1302 may define a plurality of roles 1312. Each role may include one or more provisioning constraints. As noted above, the bundled application 1302 and roles 1312 are not aware of the underlying storage nodes 106 and compute nodes 110 inasmuch as these are virtualized by the storage manager 102 and orchestration layer 1300. Accordingly, any constraints on allocation of hardware resources may be included in the provisioning constraints 1314. As described in greater detail below, this may include constraints to create separate fault domains in order to implement redundancy and constraints on latency.

The role 1312 may define a namespace 1316. A namespace 1316 may include variables, functions, services, and the like implemented by a role. In particular, interfaces and services exposed by a role may be included in the namespace. The namespace may be referenced through the orchestration layer 1300 by an addressing scheme, e.g. <Bundle ID>.<Role ID>.<Name>. In some embodiments, references to the namespace 1316 of another role may be formatted and processed according to the JINJA template engine or some other syntax. Accordingly, each role 1312 may access the variables, functions, services, etc. in the namespace 1316 of another role 1312 on order to implement a complex application topology. In some instances, credentials for authorizing access to a role 1312 may be shared by accessing the namespace 1316 of that role.

A role 1312 may further include various configuration parameters 1318 defined by the role, i.e. as defined by the developer that created the executable for the role. As noted above, these parameters 1318 may be set by the orchestration layer 1300 according to the static or dynamic configuration parameters 1308. Configuration parameters may also be referenced in the namespace 1316 and be accessible (for reading and/or writing) by other roles 1312.

Each role 1312 may include a container 1320 executing an instance 1322 of the application for that role. The container 1320 may be a virtualization container, such as a virtual machine, that defines a context within which the application instance 1322 executes, facilitating starting, stopping, restarting, and other management of the execution of the application instance 1322. Containers 1320 may include any container technology known in the art such as DOCKER, LXC, LCS, KVM, or the like. In a particular bundled application 1302, there may be containers 1320 of multiple different types in order to take advantage of a particular container's capabilities to execute a particular role 1312. For example, one role 1312 of a bundled application 1302 may execute a DOCKER container 1320 and another role 1312 of the same bundled application 1302 may execute an LCS container 1320.

Note that a bundled application 1302 as configured in the foregoing description may be instantiated and used or may be saved as a template that can be used and modified later.

Figure 14:
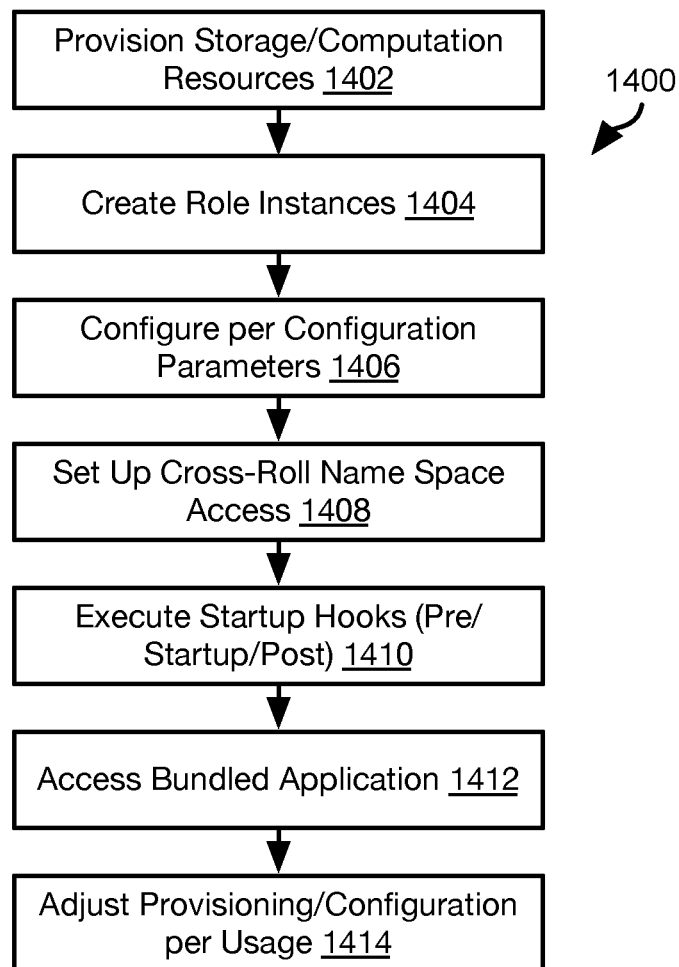
FIG. 14 is a process flow diagram of a method for orchestrating the deployment of a multi-role application in accordance with an embodiment of the present invention.

FIG. 14 illustrates a method 1400 for executing a bundled application 1302 using the orchestration layer 1300. The method 1400 may include provisioning 1402 storage and computation resources according to the provisioning 1306. This may include allocating storage volumes according to the storage requirements, assigning the storage volumes to storage nodes 106, and selecting a compute node 110 or storage node 106 providing the required computational resources (processor cores and memory).

The method 1400 may include creating 1404 role instances for the roles 1312 defined by the bundled application 1302. As described above, this may include creating a container 1320 and instantiating the application instance 1322 of the role 1312 within the container 1320. The order in which instances 1322 are created and started may be defined in the manifest 1304.

The method 1400 may include configuring 1406 each role according to the configuration parameters 1308, including executing any included functions to determine values for dynamic parameters. As noted above, starting a bundled application 1302 may further include setting up 1408 the roles 1312 to reference resources in the namespace 1316 of another role 1312. For example, a webserver may be configured to access a database by referencing configuration parameters and services implemented by the database.

The method 1400 may further include executing 1410 any hooks 1310 defined for the initial startup of the bundled applications. Accordingly, pre-startup, startup, and post startup hooks may be executed. Some or all of the functions of steps 1402-1410 may be defined as part of the pre-startup hook. Other functions may also be performed prior to steps 1402-1408 as defined by a pre-startup hook.

The actual commencement of execution of the instances 1322 of the bundled application 1302 may be performed in an order specified by the startup hook and may include performing any attendant functions of these instances 1322 as specified by the startup hook. Following startup, one or more other actions may be performed as specified by the developer in the post-startup hook. These actions may invoke functions of the instances 1322 themselves or executed by the orchestration layer 1300 outside of the instances 1322, such as with respect to an operating system executing the containers 1320 for the instances 1322.

The bundled application 1302 may then be accessed 1412 in order to perform the programmed functionality of the application instances 1322. As usage occurs, processing resources will be loaded and storage may be filled. The method 1400 may further include adjusting 1414 provisioning according to this usage and may performed adjustment to configuration parameters of the roles 1312 according to this provisioning as defined by the provisioning 1306 and configuration functions 1308.

As noted above, instances of roles may also be created or removed according to usage. Accordingly, where indicate by the manifest 1304, instances 1322 for a role 1312 may be created according to steps 1402-1410 throughout execution of the bundled application 1302 as defined by one or more dynamic functions in the manifest 1304 for that role 1312.

Figure 15:
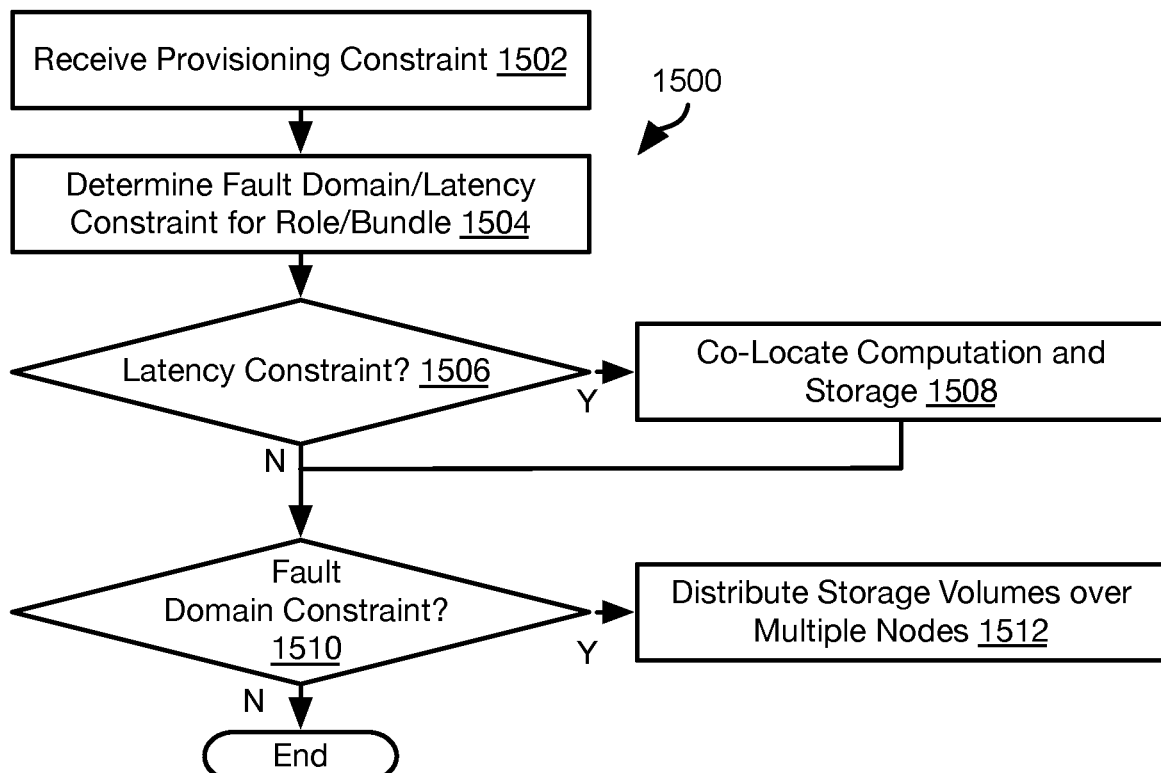
FIG. 15 is a process flow diagram of a method for implementing provisioning constraints in accordance with an embodiment of the present invention.

Referring to FIG. 15, the illustrated method 1500 may be used to implement provisioning constraints 1314 for a role 1312 or constraints for an entire bundled application 1302. The method 1500 may be executed by the orchestration layer 1300, storage manager 102, or a combination of the two.

The method 1500 may include receiving 1502 the provisioning constraint 1314 for one or more roles 1312 of the bundled application 1302 and determining 1504 whether the constraint 1314 specify one or both of a fault domain constraint and a latency constraint.

If a latency constraint is found 1506 to be included for a role 1312, then computational resources and storage resources to be provisioned for the role 1312 may be constrained 1508 to be co-located. In particular, latency may be specified in terms of (a) a minimum network delay, (b) a minimum network throughput, (c) an explicit constraint to place computation and storage resources in the same subnetwork, or (d) an explicit constraint to place computation and storage resources on the same node, i.e. a hybrid compute and storage node 110, 106 that performs the functions of both types of nodes with a single computer.

This constraint may be used by the orchestration layer to assign computing and storage resources to roles 1312 and storage volumes of the bundled application. For example, one or more storage volumes for the role 1312 will be assigned to storage nodes 106 that can either (a) meet the latency requirement with respect to compute nodes 110 allocated to the role 1312 (b) also provide the computational resources required for the role 1312.

The orchestration layer 1300 may include a resource manager in that accounts for all of the compute storage requirements and constraints and creates a resource allocation plan. This plan describes the virtual nodes (containers 1320) that make up the bundled application 1302. Each virtual node has allocations of processor cores, memory and storage volumes. The resource manager determines the compute host (compute node 110 or hybrid node) for each virtual node and a set of devices for each storage volume of the virtual node. The orchestration layer 1300 sends this mapping of the storage volumes to physical devices to the storage manager 102, which implements the storage allocation.

If the constraint for a role 1312 is found 1510 to include a fault domain constraint, then storage volumes for the role 1312 may be distributed 1512 among the storage nodes 106 of the distributed storage system 100 according to this requirement. For example, if storage volume B is a redundant (e.g., replica or backup) copy of storage volume A, the fault domain constraint may indicate this fact. Accordingly, the storage manager 102 may assign storage volume B to a different storage node 106 than storage volume A. Various degrees of constraint may be specified. For example, a fault domain constraint may simply require a different storage device 108 but not require a different storage node 106. A fault domain constraint may require that storage nodes 106 to which storage volumes are assigned by in separate subnetworks, different geographic locations, or have some other degree of separation. Similar fault domain constraints may be specified for roles 1312, which may be constrained to execute on different compute nodes 110 in order to provide redundant services and reduce downtime.

The provisioning constraints 1502 based on fault domains and/or latency may be combined with one or more other constraints. For example, a performance constraint (IOPs/second) for a storage node may be imposed. Accordingly, only those compute nodes meeting the performance requirement and the fault domain and/or latency requirements will be selected for provisioning.

As noted above, provisioning 1306 may define a processing requirement, such as a number of processing cores and an amount of storage for a role. Accordingly, compute nodes 110 may be selected at step 1508 such that both the latency requirement and processing requirement are met.

Figure 16:
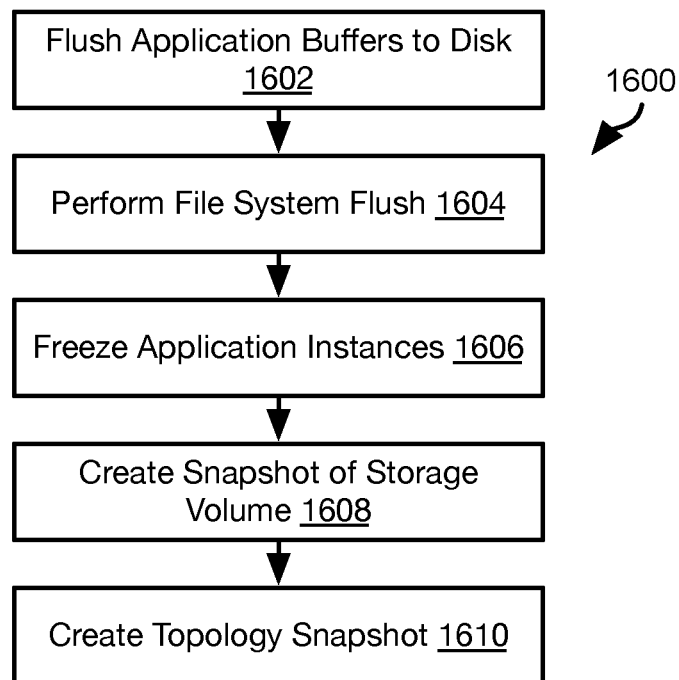
FIG. 16 is a process flow diagram of a method for creating a snapshot of a multi-role application in accordance with an embodiment of the present invention.

Referring to FIG. 16, the illustrated method 1600 may be executed by the orchestration layer 1302 with respect to a bundled application 1302 in order to create a snapshot of the bundled application 1302 that can be later restored (see the method 1700 of FIG. 17).

The method 1600 may include flushing 1602 application buffers to disk. In many instances, performance of an application is accelerated by maintaining data in a cache in memory, such that data in the cache is accessed and updated without requiring writing to a disk in many instances, as known in the art. Accordingly, this buffer may be flushed 1602 to disk by writing all valid data (i.e., not outdated due to a subsequent write) in the cache to the storage device 108 to which that data is addressed, e.g., to which the storage volume referenced by the data is assigned.

In a like manner, a file system flush may be performed 1604. Performing a file system flush may include ensuring that all IOPs pending to be performed by the file system have been executed, i.e. written to disk. As for step 1602, data written to a cache for the file system this is valid may be written to a storage device 108 to which the data is addressed, e.g., to which the storage volume referenced by the data is assigned.

The method 1600 may then include freezing 1606 the application instances 1322 of each role 1312. In particular, inasmuch as each instance 1322 is executing within container 1320, the containers 1320 for the roles 1312 may be instructed to pause execution of each instance 1322. This may include stopping execution and saving a state of execution of each instance 1322 (state variables, register contents, program pointers, function stack, etc.).

The method 1600 may further include creating 1608 a snapshot of storage volumes provisioned for the bundled application. This may include executing the method 200 of FIG. 2 or any of the above-described approaches for implementing a snapshot of a storage volume.

The method 1600 may further include creating 1610 a topology snapshot for the bundled application 1302. The topology of an application may include some or all of the following information as constituted at the time of executing step 1610 a listing of the roles 1312, which may include one or more instances 1322 of the same role 1322, relationships between application instances 1322 of roles 1312 (namespace cross-references, configuration parameters), storage volumes assigned to roles 1312, or other information that describes the topology of the bundled application 1302. Applications may create metadata describing their state of operation. This data may also be saved as part of the topology snapshot.

After the snapshot is created according to the method 1600, the application instances may be resumed, with the application itself not suffering any down time in some embodiments. The bundled application 1302 may then continue to operate. If desired, the application may then be rolled back to the snapshot created according to the method 1600, as described below with respect to FIG. 17.

Figure 17:
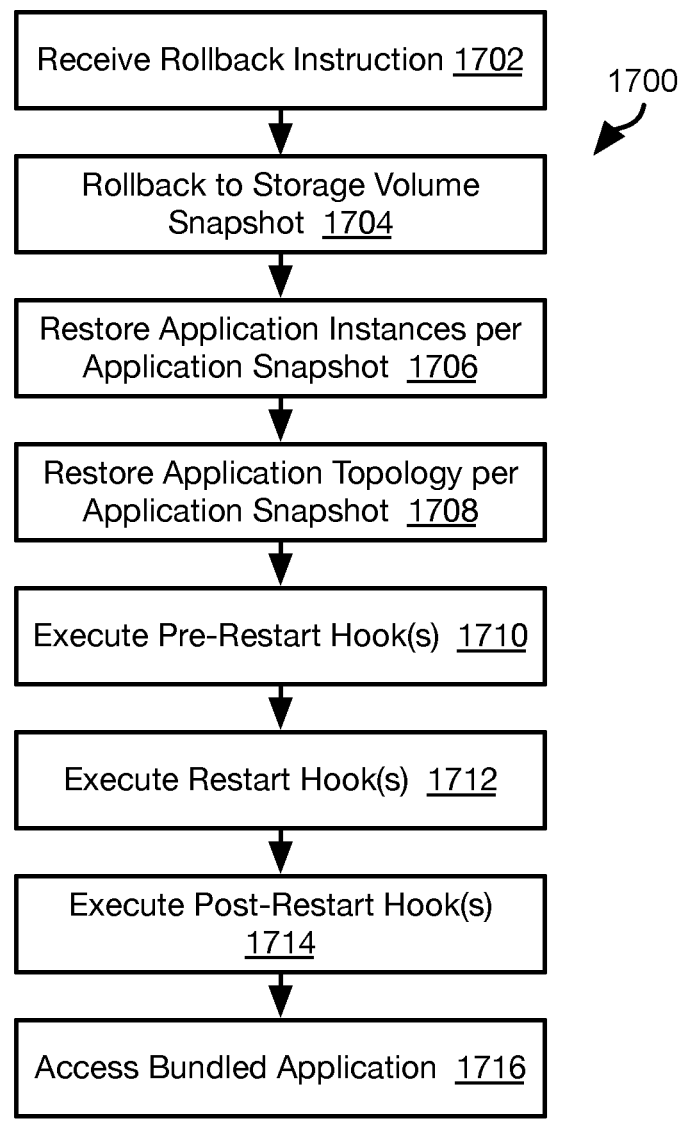
FIG. 17 is a process flow diagram of a method for rolling back a multi-role application in accordance with an embodiment of the present invention.

FIG. 17 illustrates a method 1700 for rolling back a bundled application 1302 to a snapshot, such as a snapshot created according to the method 1600. The method 1700 may be executed by one or both of the orchestration layer 1300 and the storage manager 102.

The method 1700 includes receiving 1702 a rollback instruction, such as from an administrator desiring to return to a stable version of the bundled application 1302. The remaining steps of the method 1300 may be executed in response to the rollback instruction.

The method 1700 may include rolling 1704 back storage volumes assigned to the bundled application 1302 to the snapshots created for the snapshot of the bundled application 1302 (e.g., at step 1608 of the method 1600). This may include executing the method 1000 of FIG. 10 or performing any other approach for rolling back a storage volume to a prior state.

The method 1700 may include restoring 1706 application instances from the application snapshot. As described above with respect to step 1606 of the method 1600, an application instance 1322 may be frozen. Accordingly, data describing a state of execution of the application instance 1322 may be reloaded into a container 1302 for that instance. If needed, the container for that application instance 1322 may be created and the instance 1322 loaded into it prior to loading the state of execution. This is particularly the case where the number of application instances has changed since the application snapshot was created.

The method 1700 may further include restoring 1708 the application topology saved for the bundled application at step 1610. Accordingly, relationships between application instances 1322 of roles 1312 (namespace cross-references, configuration parameters), storage volumes assigned to roles 1312, or other information that describes the topology of the bundled application 1302 may be restored as it was at the time the application snapshot was created.

The method 1700 further include executing 1710, 1712, 1714 a pre-restart hook, restart hook, and post restart hook defined for the bundled application. As described above, each hook may be a routine defined by a developer to be executed for a particular action, restarting in this case. In step 1712, execution of the instances 1322 for the roles 1322 may be restarted, along with any other actions specified by the developer in the restart hook.

The bundled application 1302 as restored at steps 1704-1714 may then be accessed 1716 as defined by the programming of the application instances and the restored application topology.

Note that the snapshot of the bundled application 1302 may be restarted on different storage and compute nodes 106, 110 than those on which the bundled application 1302 was executing when the snapshot was created. Accordingly, the application snapshot may be restarted as a clone of the bundled application 1302 or moved to different hardware when executing the method 1700.

In some instances, the hooks of steps 1710, 1712, 1714 may be different when the application snapshot is being restarted as a clone as desired by a developer. For example, a developer may desire to scale the clone application to increase or decrease a number of databases, number of partitions of a database, or other aspect of the clone application. Accordingly, the hooks of steps 1710, 1712, 1714 may implement routines to implement this increase or decrease.

For example, some applications are able to automatically detect the number of partitions of a database. In such instances, some or all of the hooks 1710, 1712, 1714 may reduce the number of partitions in a database of the clone applications and rely on the application to discover this change. In other instances, some or all of the hooks 1710, 1712, 1714 may be programmed to configure an application to access the database with the reduced number of partitions where the application is unable to configure itself.

Figure 18A:
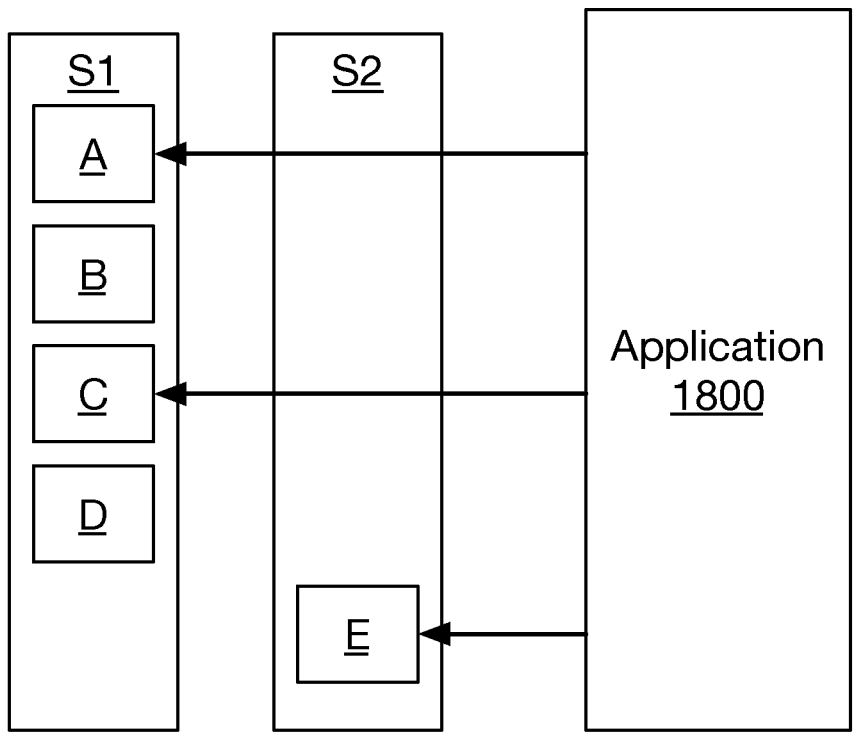
FIG. 18A is a diagram illustrating a thin clone in accordance with an embodiment of the present invention.
Figure 18B:
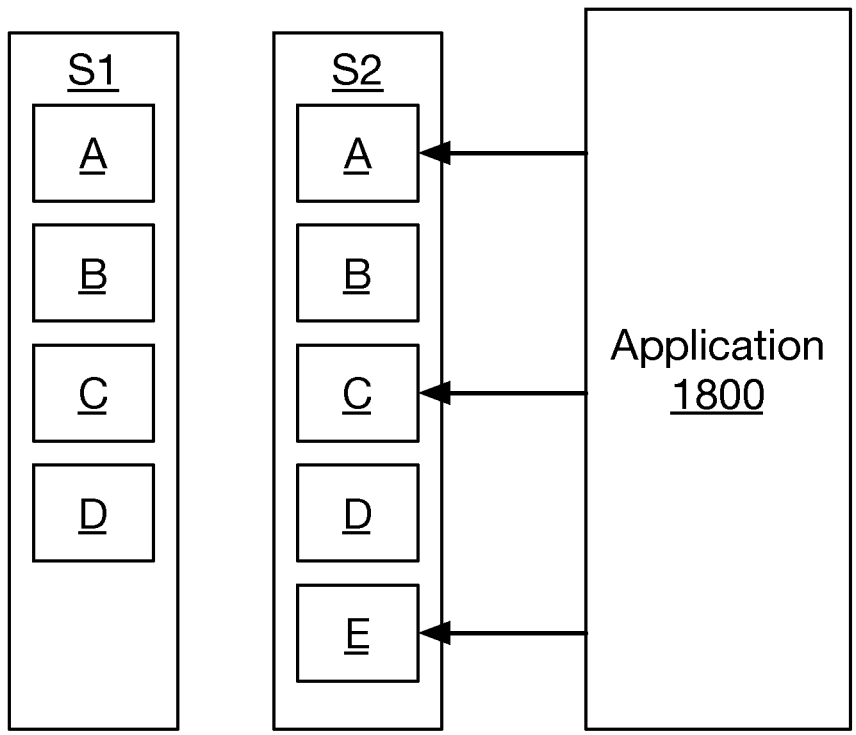
FIG. 18B is a diagram illustrating a thick clone in accordance with an embodiment of the present invention.

Referring to FIGS. 18A and 18B, a storage volume may be cloned in the form of a clone snapshot, such as according to the approach described above with respect to FIGS. 8 through 12.

FIG. 18A illustrates the approach of FIGS. 8 through 12, which is referred to herein as a "thin" clone. In this approach, a segment E allocated to the clone snapshot S2 after creation of the clone snapshot is written only to the clone snapshot. Segments A-D that were written to snapshot S1 prior to creation of clone snapshot S2 are not copied to snapshot S1. As noted above, snapshot S2 may be on a different storage node than snapshot S1. As described above with respect to FIG. 12, reads from an application 1800 for segments A-D will therefore be routed to the storage node storing snapshot S1. Reads for segment E can be processed locally.

This results in increase latency for these reads and increases loading of the storage node 106 storing snapshot S1. In the case where snapshot S1 is a production snapshot and snapshot S2 is only for testing, this loading may be undesirable. However, copying the segments A-D to snapshot S2 will also result in loading of the storage node 106 storing snapshot S1.

FIG. 18B illustrates a "thick" clone wherein the segments A-D are copied to snapshot S2. In this manner, all reads are handled by the storage node 106 storing the snapshot S2 and the production storage node 106 storing S1 is not loaded. However, the process of copying the segments A-D to snapshot S2 will also result in loading of the storage node 106 storing snapshot S1.

Figure 19A:
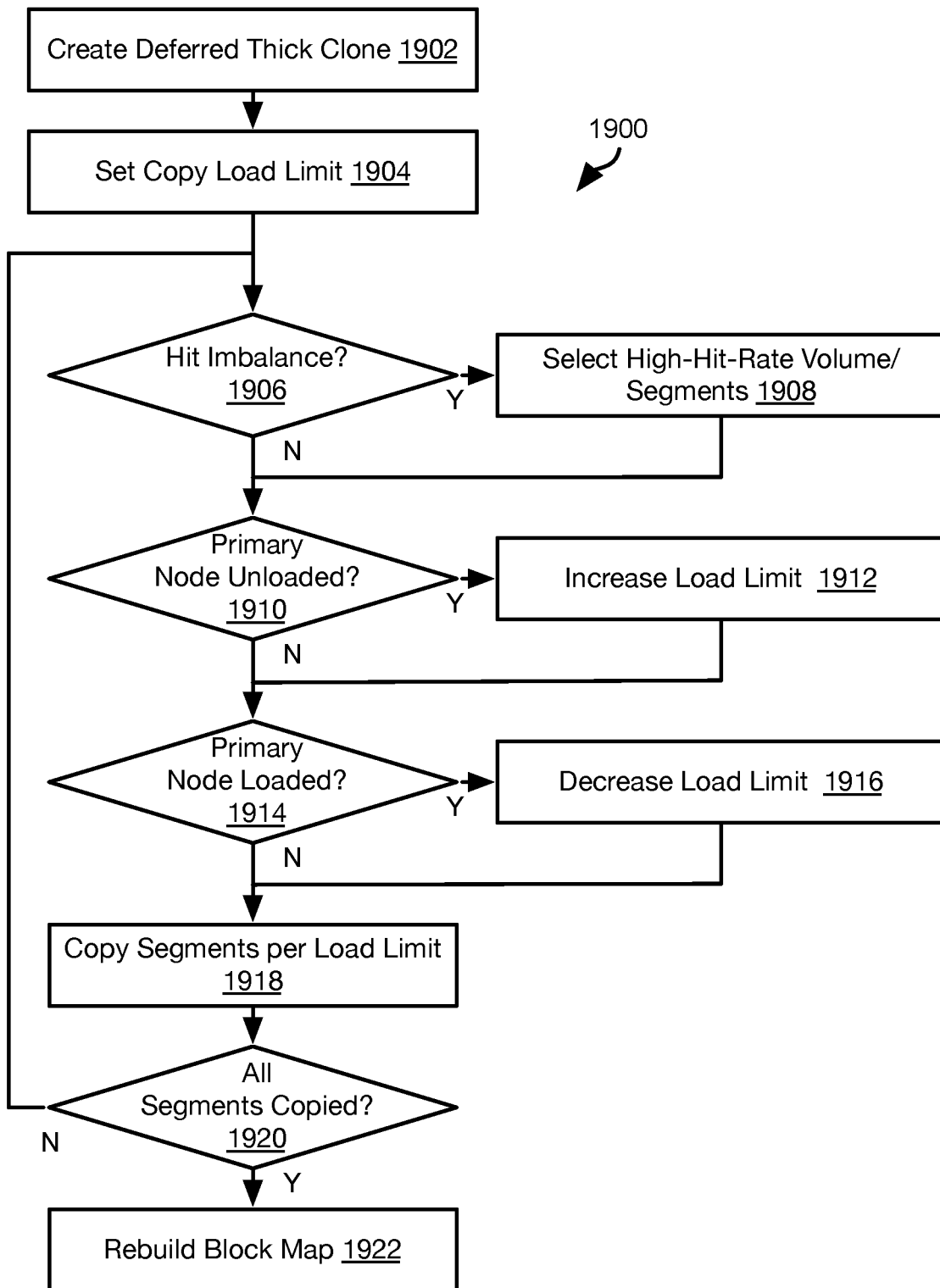
FIGS. 19A to 19E are process flow diagrams of methods for implementing a deferred thick clone in accordance with an embodiment of the present invention.

FIG. 19A illustrates a method 1900a for implementing a "deferred thick clone" snapshot wherein segments of snapshot S1 are gradually copied to snapshot S2 while avoiding impacting performance of the production storage node 106 storing snapshot S1. The method 1900a may be executed by the storage node 106 storing the snapshot S2 ("the clone node") in cooperation with the storage node 106 storing the snapshot S1 ("the primary node"). The segments that are copied may have corresponding VSIDs as described above with respect to FIG. 3. The association of a VSID to a segment may maintained for the copy of the segment on the clone node. As described above, a storage volume may be divided into slices that may reside on different storage nodes 106. Accordingly, the method 1900a may be executed separately for each slice of the storage volume.

The method 1900a may include creating 1902 a deferred thick clone snapshot. This may include creating a thin clone snapshot (FIG. 8, FIG. 18A) S2. Creating 1902 a deferred thick clone snapshot may include allocating physical segments 324 and corresponding PSIDs 316 for each segment to be copied, such as prior to the segments being copied. In some embodiments, a user may instruct that a pre-existing thin clone snapshot is to be converted to a deferred thick clone snapshot according to the method 1900a.

The segment map 314 may be updated to include the slice ID 310 (mapped to offset within cloned storage volume per slice map 308), and VSID 318, and possibly other information shown in FIG. 3, for each segment to be copied. The snapshot ID 340 in the segment map 340 may be set equal to S2, i.e. the snapshot identifier for the clone snapshot. The segment map 314 may be updated either prior to copying or each PSID 316 entry may be updated when the corresponding segment is copied to the physical segment 324 for that PSID 316.

The method 1900a may include setting 1904 a load limit, e.g., a limit on how much copying traffic the clone node may impose on the primary node. The load limit may be specified in terms of a number of bytes per second, a number of segments that may be copied at any one time, or other limits. The load limit may be time dependent. For example, at night or other periods of low usage, the load limit may be raised since production usage of the clone node will not be significantly impaired.

The load limit may also specify a maximum number of read IOPs that may be requested from the primary node in a given time period, e.g., maximum IOPs/second limit.

The method 1900a may include evaluating 1906 whether there is a hit imbalance for any of the segments that remain to be copied from the primary node to the clone node. In particular, if a large number of read requests are being routed to the primary node for a particular segment, then copying of that segment will reduce loading of the primary node and reduce latency for the clone node.

Accordingly, reads routed to the primary node may be tabulated for each segment referenced. Copying of segments may then be ordered according to the number of reads, with a segment having a higher number of reads being copied before a segment with a lower number. Where N segments may be in process of being copied simultaneously, then the N segments with the N highest read counts may be selected 1908 for copying first. Where no read imbalance exists, e.g., there is no significant difference in the number of reads per segment, the segments may be copied in order, e.g. in order of increasing VSIDs. What is significant may be a predetermined value. For example, where the highest read count is less than X percent of the average read count, the imbalance may be deemed insignificant, where X is a value between 1.1 and 2 or some other predetermined value greater than one.

In some instances, heavily used storage volumes and segments of a storage volume may be known by a developer based on the application topology, e.g., log files with heavy write usage and low read usage may be copied last whereas heavily read data may be read first. Accordingly, the ordering of copying of segments may be specified by a developer in order to copy those segments with a high hit rate first.

The method 1900a may include evaluating 1910 whether the primary node 1910 has spare capacity. For example, the primary node 1910 may transmit loading information, e.g. IOPs per second, to the clone node. For example, where this loading falls below a predetermined threshold, e.g. less than Y percent of the total IOP/second capacity of the primary node, then the load limit for copying segments may be increased 1912, where Y is predetermined value less than 100, such as 70. The amount of the load limit may be set to some predetermined function of the unused IOP/second capacity of the primary node, e.g. such that no more than Z percent of the capacity is used, such as Z=90 percent.

In a like manner, if the primary node is determined 1914 to be loaded, the load limit may be decreased, e.g. decreased such that the amount of unused capacity of the primary remains below an acceptable value, e.g., such that the load limit plus production loading of the primary node is less than Z percent.

Note that steps 1910-1916 may be performed at the storage device 108 level. Accordingly, loading of a storage device 108 is evaluated 1910, 1914 and the load limit increased 1912 or decreased 1916 based on the loading in the same manner described above.

Note also that the evaluations of steps 1906, 1910, 1914 may be performed at the container 1320 level. In particular, storage volumes allocated to instances 1322 that are generating higher read traffic relative to other instances 1322 may be copied before storage volumes allocated to the other instances 1322.

Copying of segments according to the load limit may be performed 1918. Steps 1906-1918 may be performed repeatedly until all segments are found 1920 to have been copied.

With reference to FIG. 3, Once all segments are copied the block map 338 may be rebuilt 1922 according to the copied segments. In particular, metadata (e.g., index pages 328) of the copied segments may be evaluated to determine the physical offset 334 of LBAs referenced in the copied segments. The entry for each LBA may then be updated to include the PSID 316 where the copied segments was written and the physical offset 334 for that LBA. As noted above, a block map 338 may be maintained for each slice of a logical storage volume. Accordingly, updating 1922 the block map may be performed for each slice referenced by the copied segments.

As noted above, the block map 338 indicates the location of the latest written data addressed to an LBA. Accordingly, references to an LBA 332 in a copied segment will not cause updating of the entry in the block map 338 for that LBA 332 where a later version of data has been written to that LBA 332.

For example, where a copied segment referencing an LBA 332 has a lower VSID than the VSID 318 mapped to the PSID 316 in the block map for that LBA 332, the entry for that LBA 332 in the block map 338 will not be updated for that copied segment.

The method 1900a may be performed in the context of cloning a bundled application 1302. Accordingly, the rollback method of FIG. 17 may be performed on different hardware then that on which the bundled application 1302 was executing when an application snapshot was created in order to create a clone of the bundled application. In such instances, storage volumes may be cloned as either thin clones, thick clones, or deferred thick clones. The clone application may therefore continue to access storage nodes 106 provisioned for the original bundled application 1302 until a deferred thick clone has completed copying of data from the original bundled application.

Figure 19B:
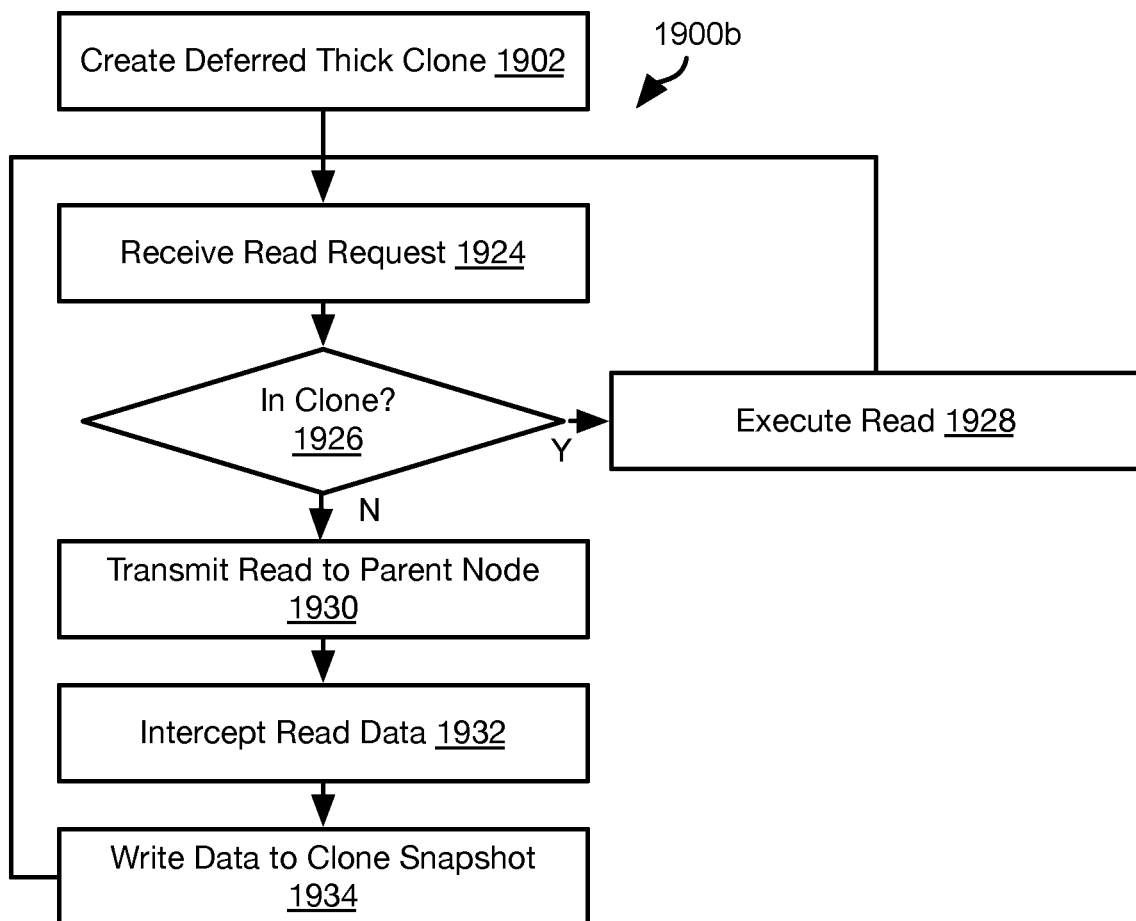

Referring to FIG. 19B, in another approach, a deferred thick clone snapshot may be implemented according to the method 1900b. The method 1900b may include creating 1902 a deferred thick clone snapshot ("the subject snapshot") of a storage volume ("the subject volume"), such as in the same manner as for the method 1900a. The subject snapshot may be on a different storage node 106 ("the clone node") than the storage node 106 ("the parent node") storing the parent snapshot of the subject volume of which the subject snapshot is a deferred thick clone snapshot.

When a read request is received 1924 for the subject snapshot of the subject storage volume, the method 1900b may include evaluating 1926 whether an address (e.g., LBA and slice offset) referenced by the read request has been previously written to after creation of the subject snapshot. If so, then the read request is executed 1928 with respect to the subject snapshot by the clone node (e.g., see FIG. 12).

If not, then the read request is transmitted 1930 to the parent node, which then processes the read request and returns the read data to a source of the read request from step 1924. Steps 1926-1930 may be executed according to the approach described above with respect to FIG. 12. The parent node may further include a component that intercepts 1932 the read data and writes 1934 the read data to the clone node, e.g., issues a write request to the subject snapshot, the write request including the read data and the address (e.g., LBA and slice offset) from the read request. This write request is referred to herein has an internal clone write (ICW) and may be flagged or otherwise be distinguishable from other types of writes, such as writes from user applications.

The read request that is transmitted at step 1930 may include an indication that it is a pass through read request from the subject snapshot. Accordingly, the parent node may determine based on this indication that writing 1934 of the read data is required as an ICW.

Upon receiving the ICW, the clone node writes 1934 the read data to the clone snapshot (e.g., see FIG. 4). Note that there is a possibility that the data may be written to the same LBA and slice offset of the subject snapshot before the ICW is received. In such cases, the ICW is discarded, since the data written to the subject snapshot at the same LBA and slice offset referenced by the ICW is more current.

Figure 19C:
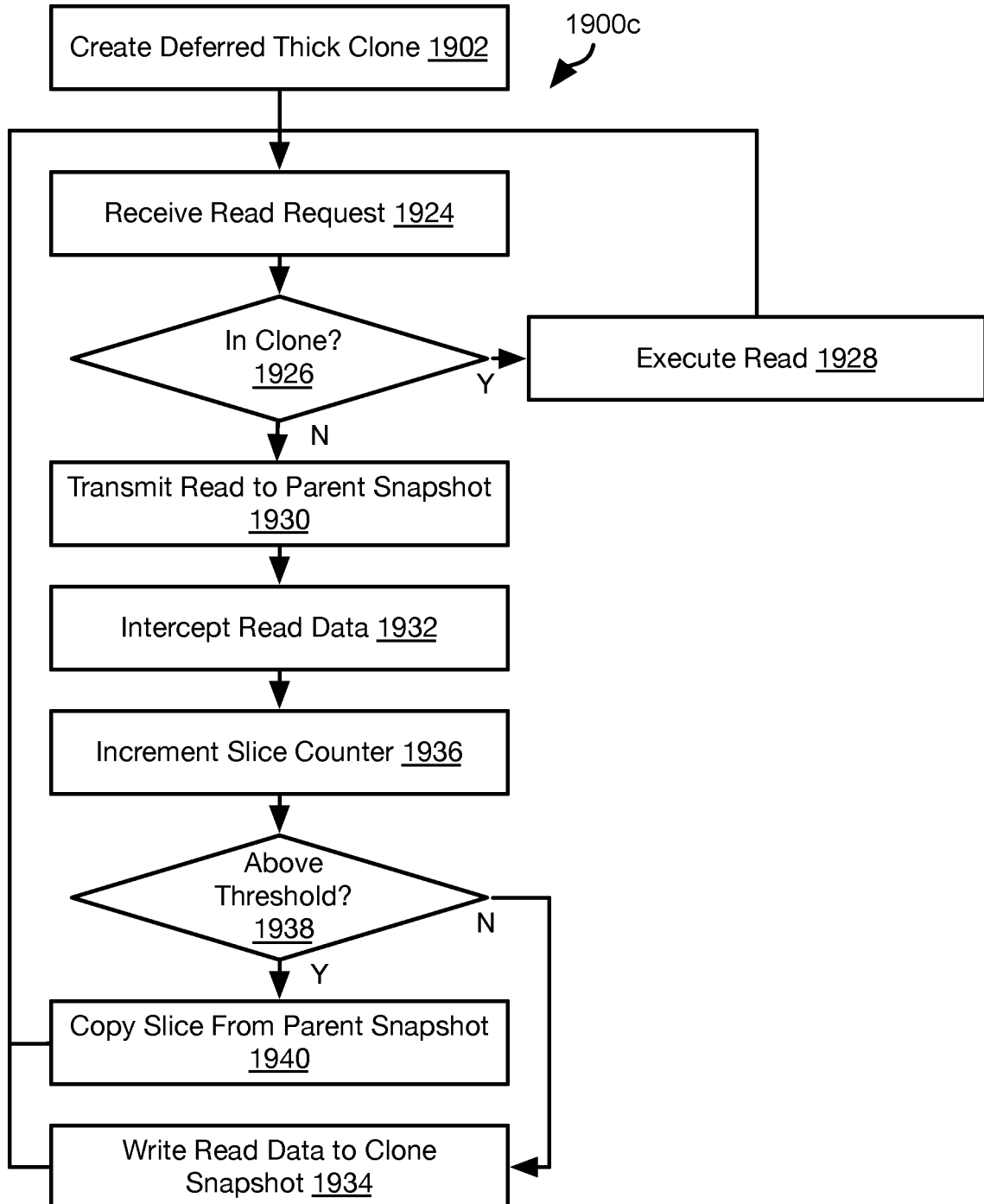

FIG. 19C illustrates an alternative method 1900c for implementing a deferred thick clone. The method 1900c may include performing steps 1902-1930 according to any of the variations for performing these steps described above with respect to the method 1900c.

The method 1900c may further include incrementing 1936, by the clone node, a slice counter for a slice referenced by the read request of step 1924 for each read request that is found 1926 to not reference data written to the subject snapshot after creation of the subject snapshot.

If the counter for a slice is found 1938 to exceed a threshold, then that slice is copied 1940 from the parent snapshot to the clone snapshot, i.e. copied to the clone node. Copying 1940 may include individually copying all of the segments of the slice from the parent node to the clone node.

If the threshold is not met, then one of two approaches may be used. In a first approach, no copying is performed. In a second approach, the read data of the parent snapshot is intercepted 1932 and written 1934 to the clone snapshot in the same manner as for the method 1900b.

Figure 19D:
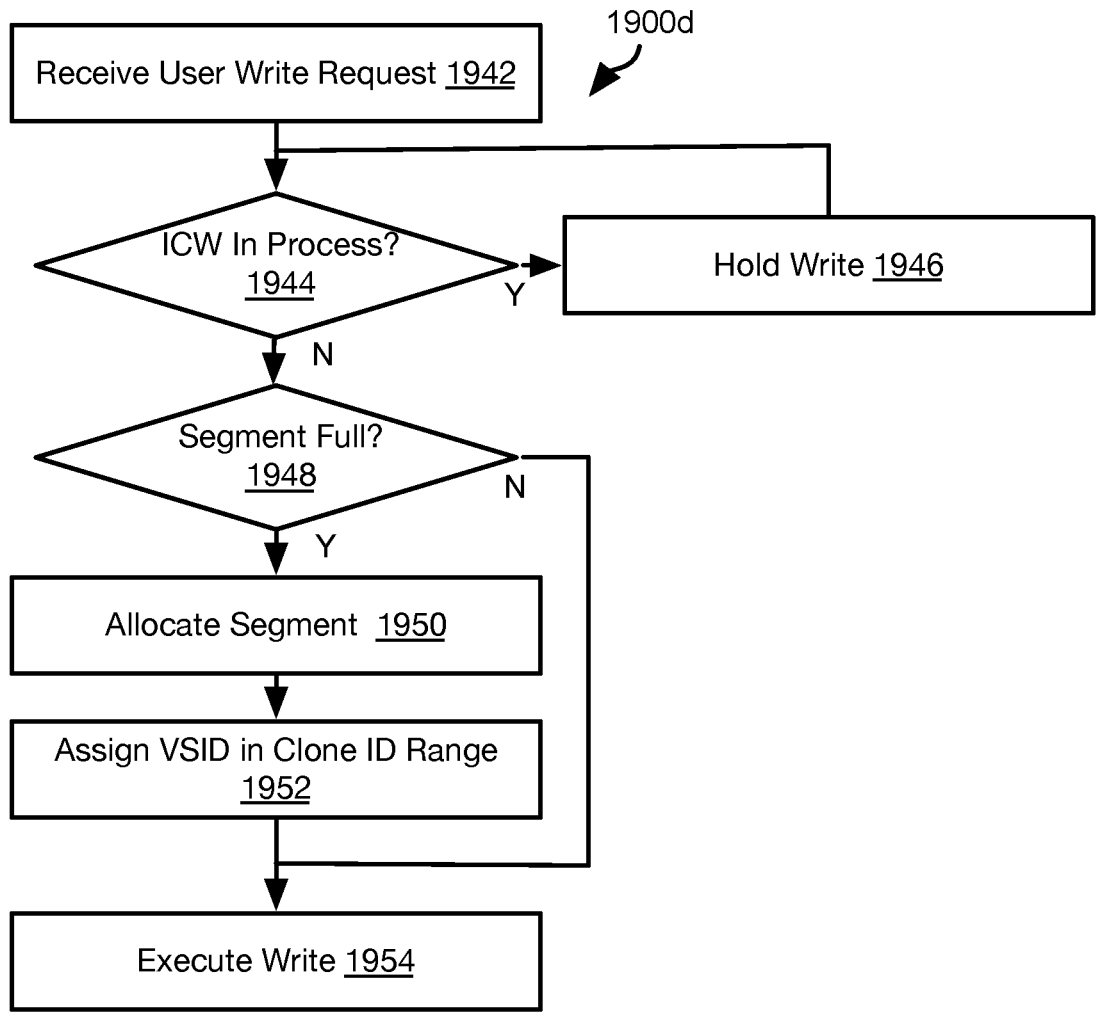
Figure 19E:
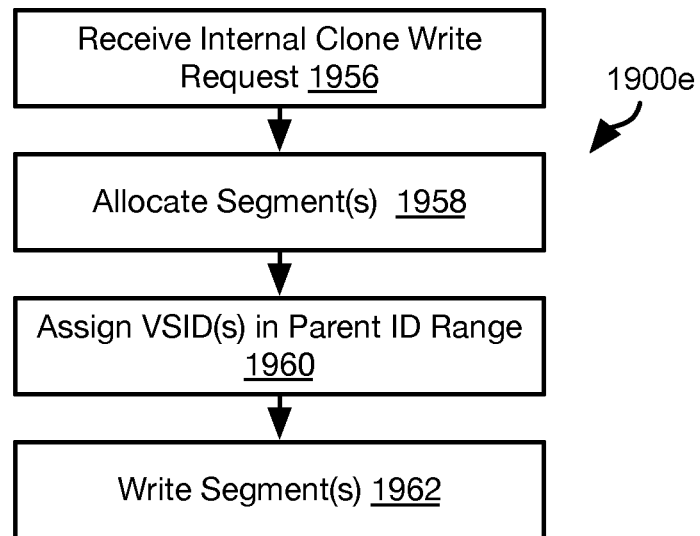

FIGS. 19D and 19E describe approaches for executing write requests for a deferred thick clone implemented according to FIG. 19C. Referring specifically to FIG. 19D, the illustrated method 1900d may include receiving 1942, by the clone node, a user write request to the subject snapshot, i.e. a write request from a user application that is other than a write request performed as part of copying a segment or slice (an internal clone write (ICW)) from the parent snapshot.

The method 1900d may include evaluating 1944 whether an ICW is in process that references the same LBA and slice offset as the write request of step 1942. If so, the write request is held 1946 and is not executed until no conflicting ICW is in process. In this manner, writes are executed in the proper order and the data of the write request of step 1942 is not overwritten by the ICW.

If and when no conflicting ICW is found 1944 to be in process, the write request may be executed. The write request may be executed in the manner described above with respect to FIG. 4 with the changes indicated in FIG. 19D. In particular, if a current segment is found 1948 to be full, a new segment is allocated 1950 and assigned 1952 a VSID in a clone ID range. The write request may then be executed 1954.

By assigning writes to the clone snapshot VSIDs in a unique range of values, it is possible to distinguish between segments that have been written to the subject snapshot and those that were copied to the subject snapshot from the parent snapshot according to method of FIG. 19C.

FIG. 19E illustrates a method 1900e for processing internal clone writes (ICW) of segments from the parent snapshot. The ICW is received 1956 and one or more segments are allocated 1958 to the subject snapshot for storing the data from the ICW. The allocated segments may then each be assigned 1960 a unique VSID from a parent ID range that does not overlap the clone ID range (see FIG. 4). Accordingly, where data referencing the LBA is found in segments with VSIDs in the clone ID range and the parent ID range, the valid data can readily be determined to be in the VSIDs in the clone ID range. In some embodiments, the clone ID range is higher than the parent ID range such that segment with the highest VSID of those segments containing data for an LBA will contain the most current data for that LBA.

In some embodiments, the parent ID range is for a range of values sufficiently large such that no overlap with the dine ID range will occur, e.g. some multiple of the total number of segments in a slice, e.g. a multiple between 1 and 2. Note also that the new VSIDs assigned at step 1960 may preserve the ordering of the VSIDs from the parent snapshot, i.e. where a first segment has a higher VSID than a second segment in the parent snapshot the VSIDs assigned to the first segment at step 1960 will also be higher than the VSID assigned to the second segment at step 1960.

The segments of the parent snapshot received at step 1956 may then be written 1962 to the segments allocated at step 1912. The segment map 314 may be updated to map the copied segments to the PSIDs 316 to which they were written as well as the other information shown in FIG. 3 for an entry in the segment map 314.

The block map 338 for each slice referenced in the ICW may then be updated for each LBA referenced in the one or more segments of the ICW. Where an entry already exists in the block map 338 for an LBA referenced in an ICW, the entry is not overwritten in some embodiments, since this indicates that a user write has occurred after creation of the subject snapshot and should not be overwritten by data from the parent snapshot.

If the block map 338 is lost and must be reconstructed, current data for an LBA may be identified by identifying the most current data in the segments assigned VSIDs in the clone ID range (the last written data to the segment with the highest VSID). If an LBA is not referenced in segments assigned VSIDs in the clone ID range, then the most current data in the segments of the subject snapshot assigned VSIDs in the parent ID range is the current data for that LBA (the last written data to the segment with the highest VSID).

Figure 20:
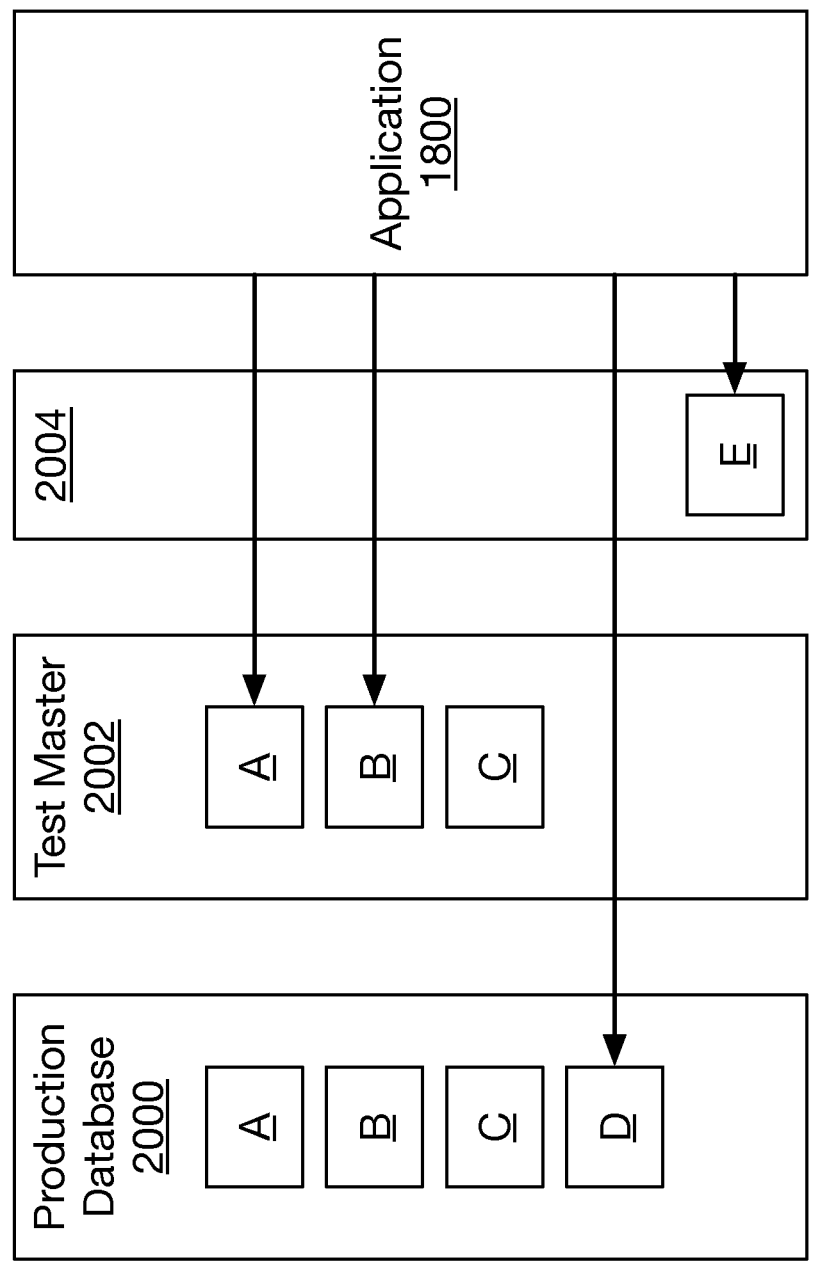
FIG. 20 is a diagram illustrating use of a test master clone in accordance with an embodiment of the present invention.

FIG. 20 illustrates an example application of a deferred thick clone snapshot. A production database 2000 may store segments A-D. The production database may be implemented according to the virtualization approach described with respect to FIGS. 1 through 12 or may be any other type of database, such as SQL (structured query language), MYSQL, ORACLE database, or any other database approach known in the art.

A test master 2002 may be created for the database 2000, where the test master 2002 is a deferred thick clone snapshot according to the method 1900a. Accordingly, the segments A-D are copied to the test master 2002 over time and according to load limits.

In the future, users that wish to test clones of the database 2000 may thereafter make thin clone snapshots 2004 of the test master 2002. In this manner, read requests will be routed to the test master 2002 and not the production database 2000 if the requested data has not been written to the thin clone snapshot 2004. Any number of thin clone snapshots 2004 may be created. In some instances, the test master 2002 may be maintained current, i.e. be updated according to all changes to the production database rather than simply copying data written previous to creation of the test master 2002.

As for FIG. 18B, an application 1800 accessing the thin clone snapshot 2004 may have reads routed to the clone node hosting the test master 2002 or to the node hosting the production database 2000 if the segments corresponding to the reads are located there. Once all segments are copied to the test master 2002, reads from the application 1800 will then be forwarded only to the clone node hosting the test master 2002.

Figure 21:
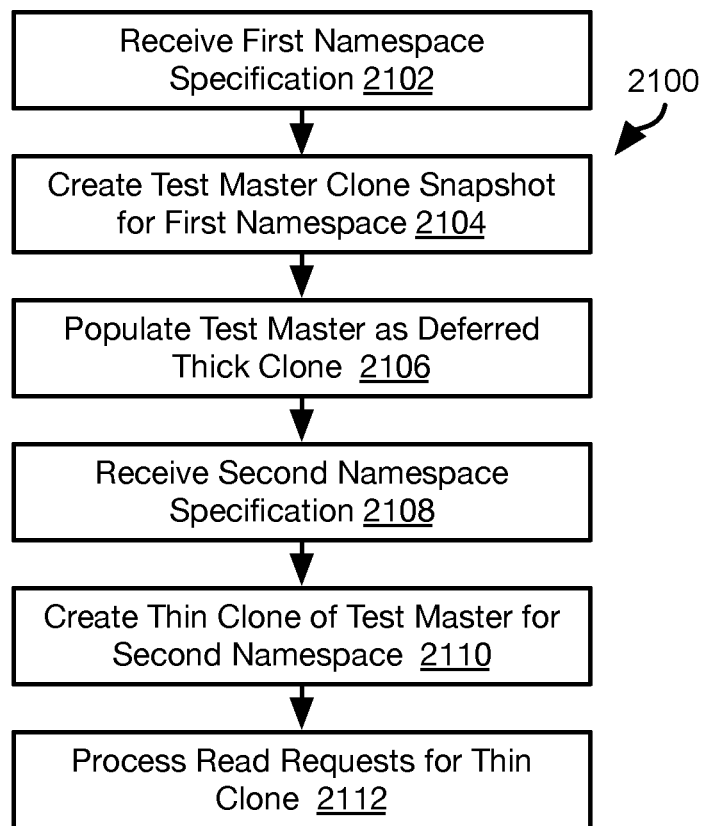
FIG. 21 is a process flow diagram of a method for implementing a test master clone in accordance with an embodiment of the present invention.

FIG. 21 illustrates a method 2100 for using a test master 2002. The method 2100 may be executed by the storage nodes implementing the test master 2002 and clone snapshot 2004.

The method 2100 may include receiving 2102 a first namespace specification for a production database 2000. The namespace of a database may define data labels that may be used to search and request data in the database. As used herein, a namespace may also refer to a "tablespace" or "schema" as used in other database terminology or implementations. The first namespace specification may include a specification of less than all of the namespaces of the production database 2000. For example, a database may define various shards of data. The first namespace specification may therefore reference less than all of the shards of the production database 2000.

The method 2100 may then include creating 2104 a test master 2002 that is a deferred thick clone of the production database 2000 that is limited to the first namespace specification and then populating 2106 the test master 2002 as a deferred thick clone. Creating a deferred thick clone may be performed according to the approach described above with respect to some or all of FIGS. 19A-19E.

In the illustrated embodiment, only data belonging to the first namespace will be cloned. In this manner, a user may select part of a database for testing thereby further reducing the copying load on the production database 2000. In some instances, the first namespace specification will include an entirety of the production database 2000.

The method 2100 may then include receiving 2108 a second namespace specification and creating 2110 a thin clone snapshot 2004 of the test master 2002 for data according to the second namespace specification. As described above, the thin clone will write new data addressed to the thin clone snapshot 2004 to the clone node hosting the snapshot 2004. The second namespace specification may be the same as or different from the first namespace specification. Accordingly, only data in the second namespace will be accessible by reading and writing to the thin clone snapshot 2004.

Read requests for the thin clone snapshot 2004 may then be processed 2112. As described above, read requests for data written prior to creation 2110 of the snapshot 2004 will be routed to the clone node hosting the test master 2002. For segments that have not yet been copied to the test master 2002, read requests addressed to them will be routed to the host of the production database 2000 until those segments are copied to the test master subject to load limits. Read requests for data written to the thin clone snapshot 2004 after its creation will be read from the clone node hosting the snapshot 2004, which may be the same as or different from the clone node hosting the test master 2002.

Note that a thick clone or deferred thick clone of the test master 2002 may be created. This is particularly the case where the test master 2002 needs to be moved to a higher performance device. For example, a clone of the test master 2002 may be created on a higher performance device and an original instance of the test master 2002 may be shut down.

Note that the method 2100 may be executed in the context of cloning a bundled application 1302, which includes cloning its storage volumes (see description of FIG. 17). Accordingly, the method 2100 may be implemented by some or all of the hooks 1710, 1712, 1714 during the process of cloning application instances 1322, the storage volumes, and topology of the bundled application 1302.

Figure 22:
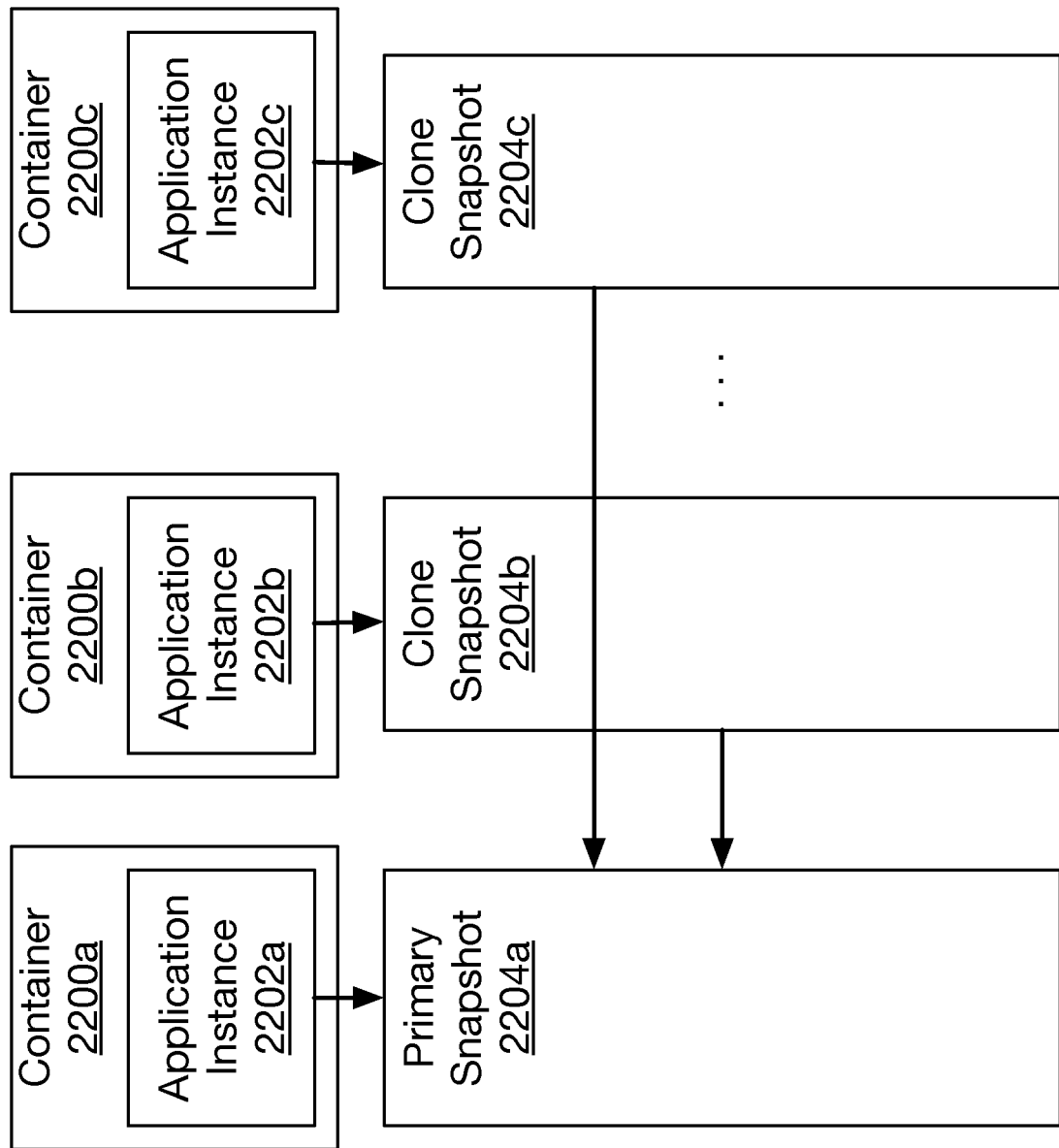
FIG. 22 is a schematic diagram of an approach for implementing multiple instances of a same executable using thin clones in accordance with an embodiment of the present invention.

Referring to FIG. 22, the illustrated configuration may be used in bundled applications including many, e.g. 10 s, 100 s, or 1000 s, instances of the same executable. In such cases, persistent data that is used and updated by each instance may be identical upon instantiation. This may include a root file system for the instance that is initially populated with files.

In the illustrated embodiment, containers 2200a-2200c may execute instances 2202a-2202c of the same executable. The containers 2200a-2200b may be created and managed as part of a bundled application according to any of the embodiments disclosed herein.

Upon provisioning of storage for each instance 2202a-2202c, one instance 2202a may be provisioned with a storage volume that is a primary snapshot 2204a for the storage volume. The primary snapshot 2204a may be populated with an initial image of a root file system for the executable corresponding to the instance 2202a.

The remaining instances 2202b-2202c may be provisioned with clone snapshots 2204b-2204c of the storage volume. The snapshots 2204b-2204c may be thin clone snapshots. In this manner, reads for data in the initial image in a clone snapshot 2204b-2204c that has not been overwritten by an instances 2202b-2202c will be routed to the storage node 106 storing the primary snapshot 2204c, such as in the manner described with respect to the method 1200 of FIG. 12. The initial image therefore does not need to be copied into the storage provisioned for each instance 2202b-2202c. This reduces the network traffic required by this copying, which would be extremely high upon creation of the bundled application including the instances 2220a-2202c. This copying would create a delay in the startup of a bundled application. Use of thin clone snapshots as shown in FIG. 22 therefore speeds up the deployment of a bundled application. The clone snapshots 2204b-2204c may also be deferred thick clones (see discussion of some or all of FIGS. 19A-19E) such that loading of the storage node 106 storing the primary snapshot 2204a will eventually be eliminated.

Figure 23:
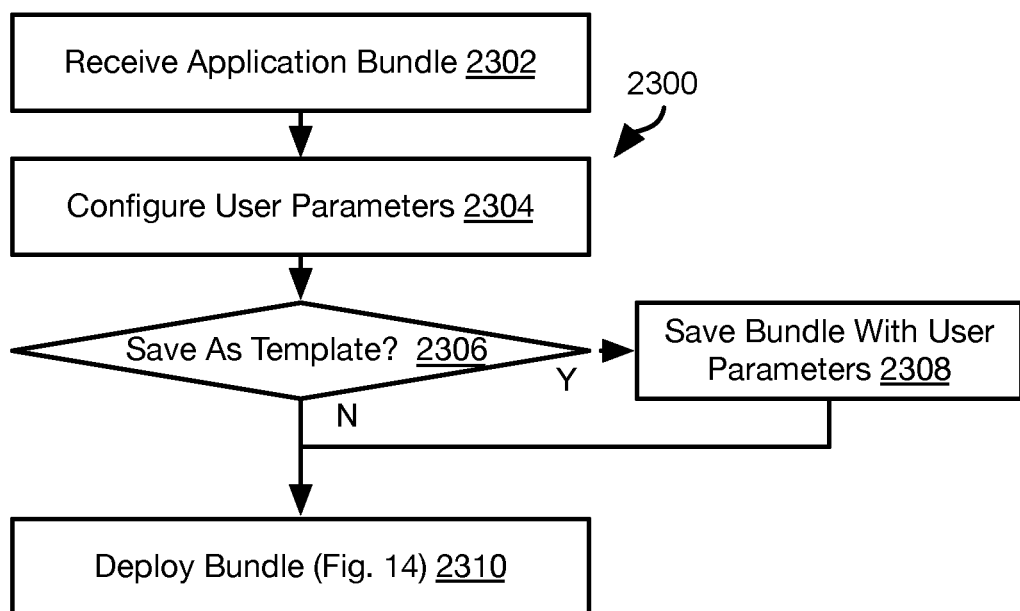
FIG. 23 is a process flow diagram of a method for creating a bundle template in accordance with an embodiment of the present invention.

Referring to FIG. 23, in some embodiments, a bundled application 1302 may be parameterized. For example, roles 1312 may be defined and one or more parameters may define the number of instances of each role 1312 (i.e., the number of containers executing an instance of a role 1312) and the amount of resources (storage, memory, cores) assigned to each instance of each role 1312. Likewise, an application instance 1322 may include various user configurable parameters. Other user configurable parameters may include default passwords, or other user-configurable settings.

Accordingly, the illustrated method 2300 may include receiving 2302 a bundled application and configuring 2304 some or all of these parameters. If a user is found 2306 to instruct saving of the bundled application as a template, then the bundled application is saved 2308. In particular, the bundled application and any parameters configured by a user at step 2304 are saved. In this manner, any number of instances of the bundled application as configured at step 2304 may be deployed at any number of locations without having to repeatedly specify the parameters.

In one use case, a user may create multiple templates, each with a different set of parameters. For example, a bundled application with a certain number of instances of various roles and corresponding resources may be saved as a "small" template. The bundled application with a greater number of instances of the various roles and corresponding resources may be saved as a "large" template. Of course, any number of templates with any number of variation in the number of instances may be saved.

The bundled application as configured at step 2304 may then be deployed 2310, such as according to the approach described above with respect to FIG. 14.

Figure 24:
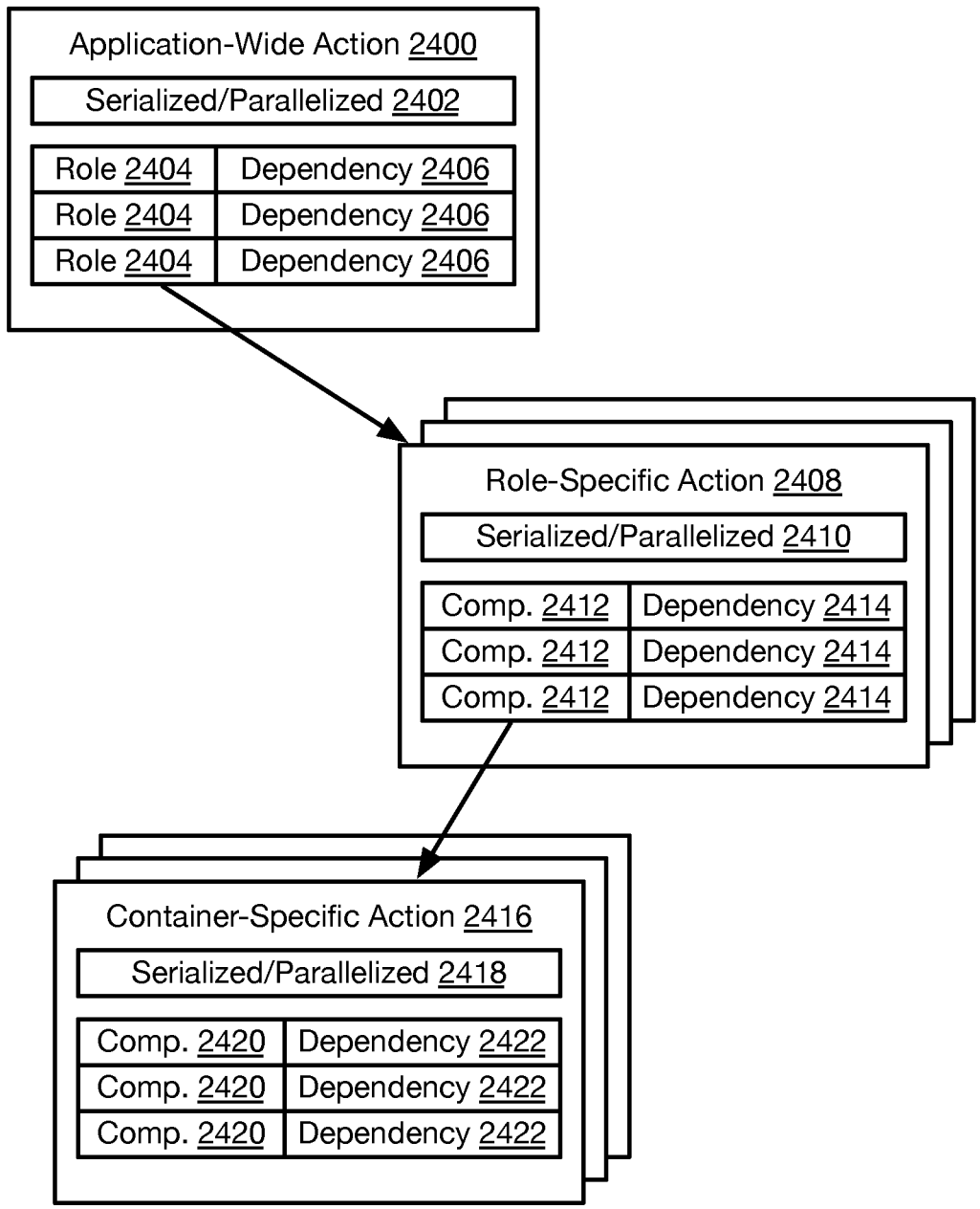
FIG. 24 is a process flow diagram of a method for implementing bundle dependencies in accordance with an embodiment of the present invention.

Referring to FIG. 24, deployment of a bundled application 1302 may include processing the manifest 1304 that defines the instances of each role 1312 and the dependency between roles 1312. Dependency may be specified at various stages of deployment, such as creation of roles, e.g., instantiation of containers 1320 and loading of application instances 1322 into containers 1320, starting of roles 1312, e.g., commencement of execution of containers 1320, or the like. Other actions for which dependency may be specified may include stopping and restarting of roles 1312. The dependency may be specified by a developer of the bundled application 1302.

The manifest 1304 may have various forms as specified by a developer. For example, an order of creation and starting of roles may be specified explicitly, which is referred to herein as a "serialized" ordering. Accordingly, a manifest 1304 may include a listing of roles and an instruction to create them that is preceded by a "serialized" tag indicating that the roles are to be created in series. In a like manner, a listing roles with an instruction to start them could be associated with a "parallelized" tag and therefore be started in that order. Where instructions are tagged as "serialized," each instruction may be permitted to execute only after a preceding instruction has completed execution.

In another form, instructions to take an action with respect to multiple roles may be specified to be "parallelized," such as by associating a tag with a listing of instructions. In this case, the instruction may be processed in parallel. Constraints on parallel execution of instructions may be specified by defining a dependency. For example, for roles RA and RB, a dependency may be specified as RA: depends_on (RB). In this case, an action (create, start, stop, restart, etc.) will not be performed for RA until this action is completed for RB.

A bundled application 1302 may include multiple roles and each role may itself include multiple components or multiple actions that are part of a given application-wide action (create, start, stop, restart, etc.). Creation of a container for a role may likewise include multiple components or multiple actions that are part of implementing a given application-wide action. A bundled application 1302 may likewise define sub-bundles of roles.

The manifest 1304 may therefore define a dependency map that defines a hierarchy wherein each node of the hierarchy specifies performance of an action (create, start, stop, restart) with respect to one or more entities as being serialized, parallelized, and possibly subject to dependency among entities. The type of ordering (serialized or parallelized) for a node may be the same as or different from the type of ordering for a parent node in the hierarchy.

Each entity may then itself be a specific executable instance or a sub node for which the action is to be performed subject to the specified ordering. An entity that is a sub-node may include the specification of an action with respect to multiple other entities as being serialized, parallelized, and possibly imposes dependency. A sub node may therefore include a specification of an order of execution (serialized, parallelized, subject to dependency) of an action for an entire application, a bundle of roles, a specific role, multiple instances of the same role, or components of an individual container.

For example, as shown in FIG. 24, the specification of an application-wide action 2400 (create, start, stop, restart, etc.) may include a parameter 2402 indicating whether the application-wide action 2400 is serialized or parallel. The specification 2400 may further include one or more roles 2404 for which the action will be taken. A role 2404 may define one or more dependencies 2406 with respect to one or more others of the roles 2404. Accordingly, the action will be taken with respect to each role 2404 either (a) in the order specified where the parameters 2402 indicates serialized execution or (b) in parallel subject to dependency constraints 2406.

Taking the action with respect to a role 2404 may include executing a role-specific action 2408. For example, where the action 2400 is creating the bundled application, the role specific action 2408 may be creating the role 2404.

The specification 2408 may include a parameters 2410 indicating that the action 2408 is serialized or parallel, which may be the same as or different from the parameter 2402. The specification 2408 may further include a listing of one or more components 2412. One or more components 2412 may include a dependency 2414 on one or more others of the components 2412. Components may include different executable components of an application instance, different instances of the same application (e.g. where a role includes multiple instances of the same application), containers, or a component of a container.

Where a component 2412 is a container, a container-specific action 2406 may be executed for that component 2412, which may include its own parameter 2412 specifying whether it is serialized or parallel and one or more components 2412 of the container for which the action is to be performed. As for other levels of the hierarchy, dependency 2412 between components of the container may be specified.

Accordingly, execution of a manifest 1304 or a hook 1310 defining an action may include traversing a hierarchy, such as that illustrated in FIG. 24. The application-wide specification 2402 may be executed, which may include executing the role-specific actions 2408 in the order specified or in parallel subject to the dependencies 2414. Executing role-specific actions 2408 may include executing the container-specific actions 2416 for each component 2412 subject to the dependencies 2414 or in series where specified.

Executing the container specific actions 2416 may include executing them for one or more components 2420 of the container in an order (serialized/parallelized) specified by a parameter 2418, possibly subject to one or more dependencies 2422 among components.

Figure 25:
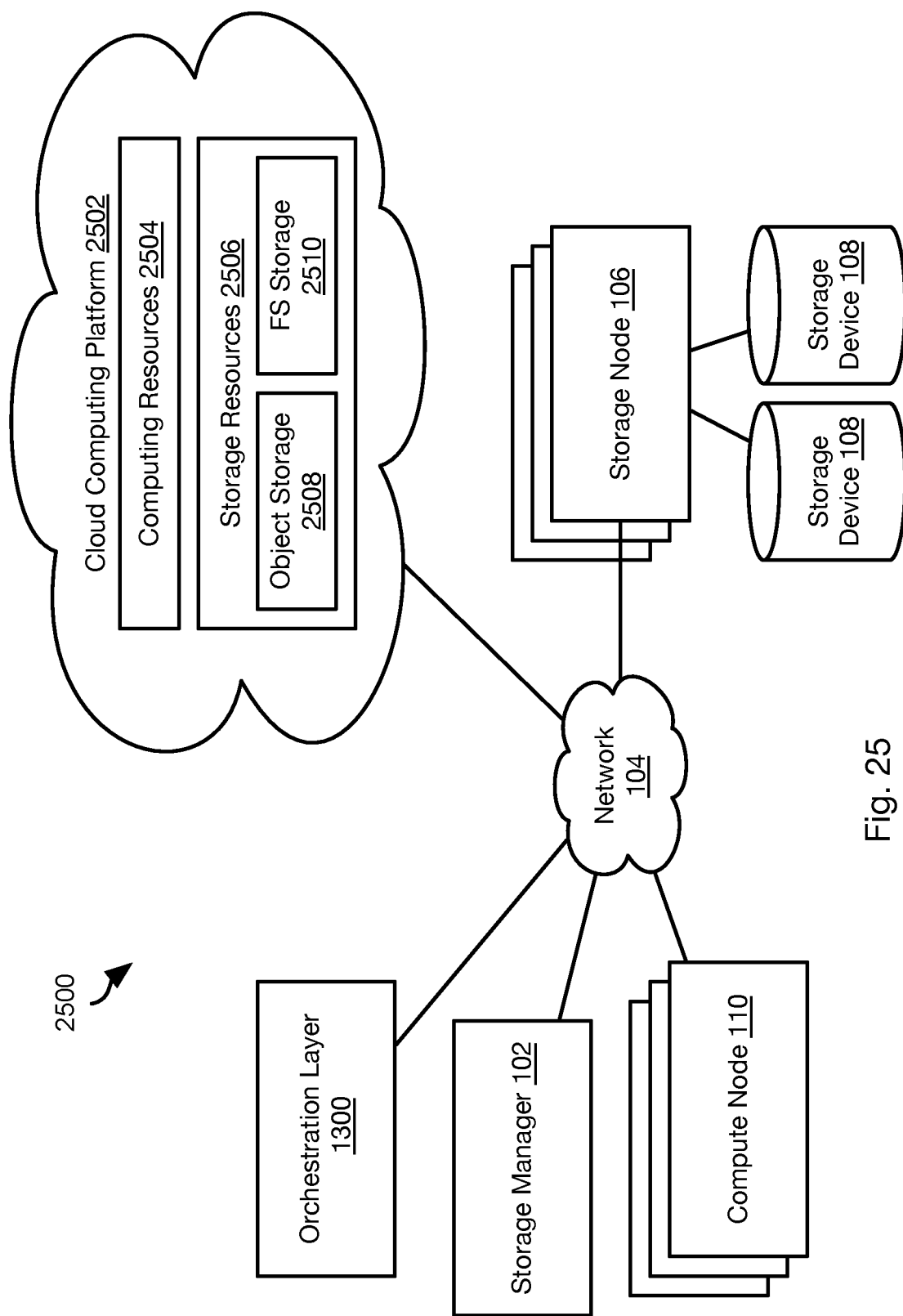
FIG. 25 is a diagram illustrating an operating environment in which methods according to an embodiment of the invention may be practiced.
Figure 26:
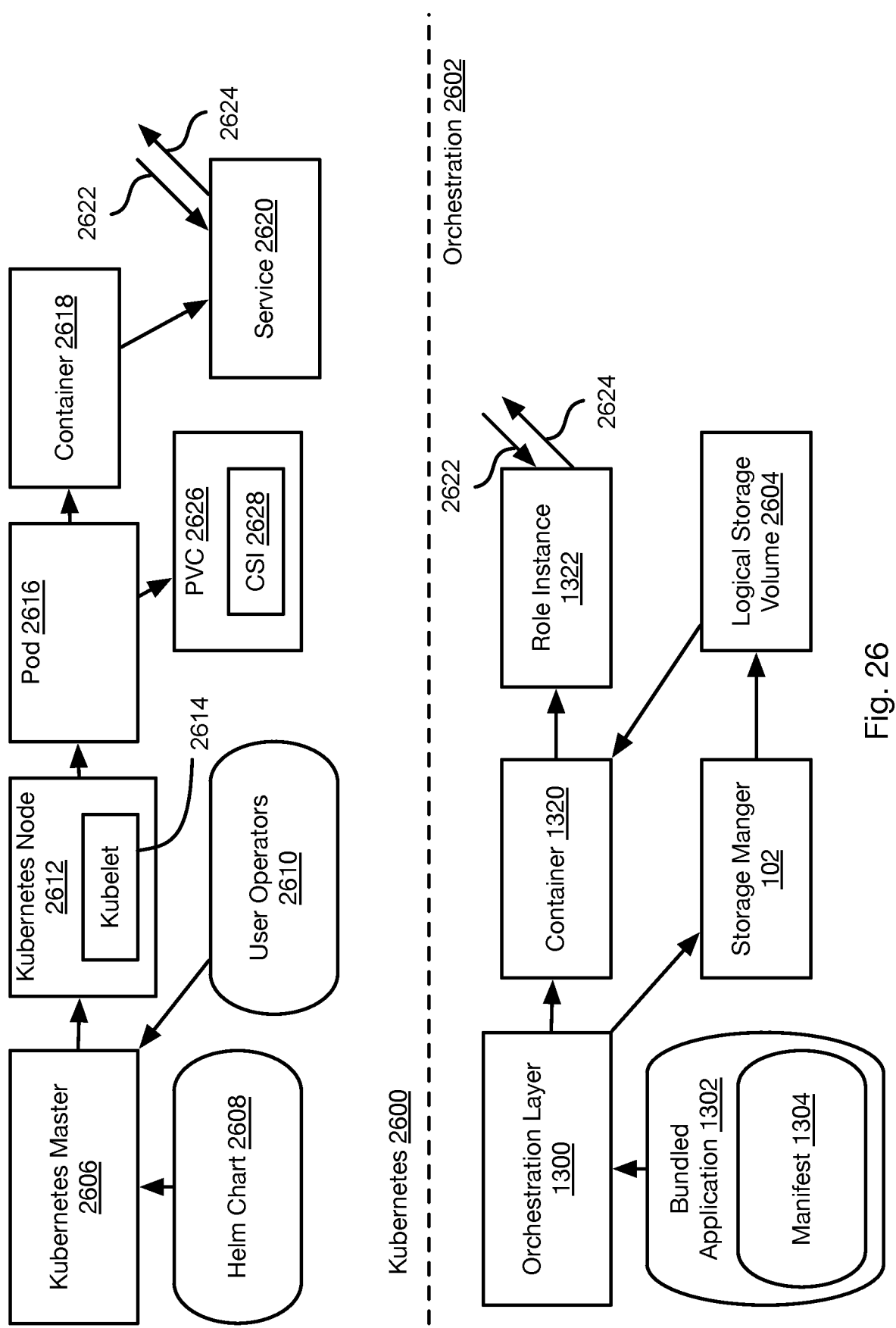
FIG. 26 is a schematic block diagram of components of different orchestration platforms that may be coordinated in accordance with an embodiment of the present invention.

FIG. 25 illustrates a network environment 2500 that is an extension of the network environment 100. In particular, a cloud computing platform 2502 may be coupled to the network 104 and include cloud computing resources 2504 and storage resources 2506. The storage resources 2506 may include various types of storage including object storage 2508 in which data is stored as unstructured data and which is generally less expensive and has higher latency. The storage resources may include file system storage 2510 that is implemented as a virtual disk in which data is stored in a structured format, such as within a hierarchical file system or according to the storage scheme described above with respect to FIGS. 1 through 12.

The cloud computing platform 2502 and corresponding resources 2504, 2506 may be implemented using any cloud computing platform known in the art such as AMAZON WEB SERVICES (AWS), MICROSOFT AZURE, GOOGLE CLOUD, or the like.

The methods disclosed herein may be of particular advantage when used in an environment with multiple orchestration layers or services, i.e. a heterogeneously-orchestrated multi-role application. For example, one orchestration layer may be an orchestration layer 1300 as described above that implements a bundled application 1302 with its corresponding manifest 1304 in order to instantiate various containers 1320, role instances executing within containers 1320. The orchestration layer 1300 may further request allocation of logical storage volumes by a storage manager 102 that implements storage volume 2604 that are mounted to containers 1320, such as according to the methods disclosed herein below.

Another orchestration layer may be a KUBERNETES (hereinafter "Kubernetes") installation 2600. As known in the art, a Kubernetes installation may include a Kubernetes master 2606 that receives instructions in the form of a helm chart 2608, StatefulSet, or operators 2610 received from a user or script. The instructions may instruct the Kubernetes master 2606 to allocate a Kubernetes node 2612, which is a computer or virtual (e.g., cloud) computing resource that is allocated for providing a service. The Kubernetes master 2606 may invoke installation of a Kubelet 2614 on the node 2612, which is an agent that implements instructions from the master 2606 as well as reports the status of components executing on the node 2612. A node 2612 may execute one or more pods 2616, which is a group of one or more containers 2618 with shared resources, such as storage resources, network resources, or the like. The pod 2616 may further define a virtual machine in which all containers 2618 of the pod 2616 execute. The pod 2616 may define a common namespace that is accessible by all of the containers 2618 of the pod 1216.

The container 2618 may implement one or more services 2620, such as a database (MONGO DB, SQL, POSTGRE SQL ORACLE, etc.), webserver, CASSANDRA server, HADOOP component, or any other service known in the art. The service 2620 may be configured to provide 2624 services to another service 2620 of the Kubernetes installation 2600 or role instance 1322 of the orchestration layer 1300 or use 2622 another service 2620 of the Kubernetes installation 2600 or role instance 1322 orchestration layer 1300. The configuration of a service to use or provide a service may be in response to instructions from the Kubernetes master 2606 interpreting instructions from the helm chart 2608, StatefulSet, or user operators 2610. The Kubernetes master 2606 may instruct the Kubelet 2614 to implement these instructions to configure the services 2620.

A pod 2616 may have storage resources associated therewith such as in the form of one or more PVCs (persistent volume claim 2626 that associated with the pod 2616. The PVC 2628 may implement a CSI (container storage interface) 2628 that interfaces with a storage resource, such as a storage device local to the Kubernetes node 2612, a storage volume implemented by the storage manager 102, a cloud storage resource 2506, or other storage implementation.

The illustrated Kubernetes installation 2600 is greatly simplified and an installation 2600 may include many nodes 2612, pods 2616, containers 2618, and services 2620 implementing a multi-role application. Note further that the Kubernetes master 2606 may interface with the Kubelets 2614 to determine loading of each service 2620 and may automatically perform function such instantiating new nodes 2612, pods 2616, containers 2618, and services 2620 in response to loading and may further autonomously replace failed nodes 2612, pods 2616, containers 2618, and services 2620.

Figure 27:
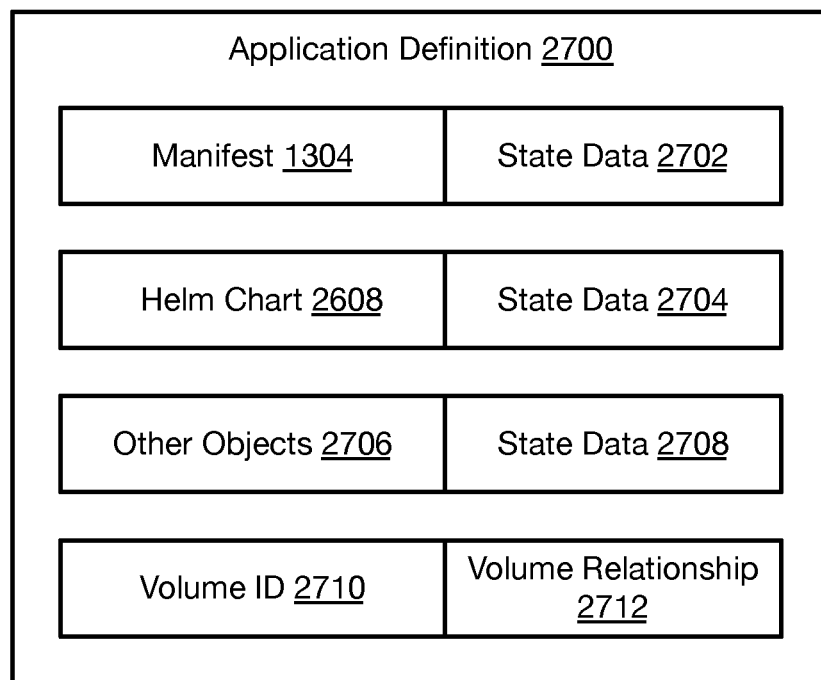
FIG. 27 is diagram illustrating data of an application definition in accordance with an embodiment of the present invention.

Referring to FIG. 27, an application definition 2700 may be defined for a heterogeneously-orchestrated multi-role application. This definition 2700 may include information describing objects (nodes 2612, pods 2616, containers 2618, services 2620, PVCs 2626, containers 1320, role instances 1322, storage volumes 2604) of the multi-role application. Each object may have an identifier that uniquely identifies it within a namespace of the multi-role application. This information may come from programmed resources such as the manifest 1304 of a bundled application 1302 and the helm chart 2608 or StatefulSet of a Kubernetes installation 2600. Each of these may be further augmented with state data 2702, 2704 describing automated changes to the objects of the multi-role application implemented autonomously by the orchestration layer 1300 or Kubernetes master 2606. In particular, the orchestration layer 1300 or Kubernetes master 2606 may create a log of automated instantiation or dis-instantiation of objects such that this log describes a state of the multi-role application in combination with any initial specification of the manifest 1304, helm chart 2608, StatefulSet, or other source of configuration instructions. The state data 2702, 2704 may further record a state of objects created according to the manifest 1304, helm chart 260, StatefulSet, or other source.

The application definition 2700 may further include identifiers of other objects 2706 that are created outside of operation of the manifest 1304, helm chart 2608, or StatefulSet, such as in response to manually entered user instruction to the orchestration layer to create objects or user operators 2610 input to the Kubernetes master 2606 to invoke creation of objects. In other instances, a log of autonomously created objects may not be available and the identity of such objects 2706 may be discovered in other ways, such as using the approach described below with respect to FIG. 29. The application definition 2700 may further include state data 2708 describing the state of such objects.

The application definition 2700 may further include identifiers 2710 of volumes allocated to the multi-role application by the storage manager or other storage resource. The application definition may further include volume relationship information 2712 describing any role of a volume identifier with respect to one or more other volume identifiers, e.g. a snapshot, clone (thin or thick), back up copy, etc. of another volume identifier. The states or configuration data of other objects in the application definition may then reference these volume identifiers to indicate mounting of the storage volume to that object. Alternatively or additionally, the data 2712 may identify objects to which the storage volume is mounted.

Figure 28:
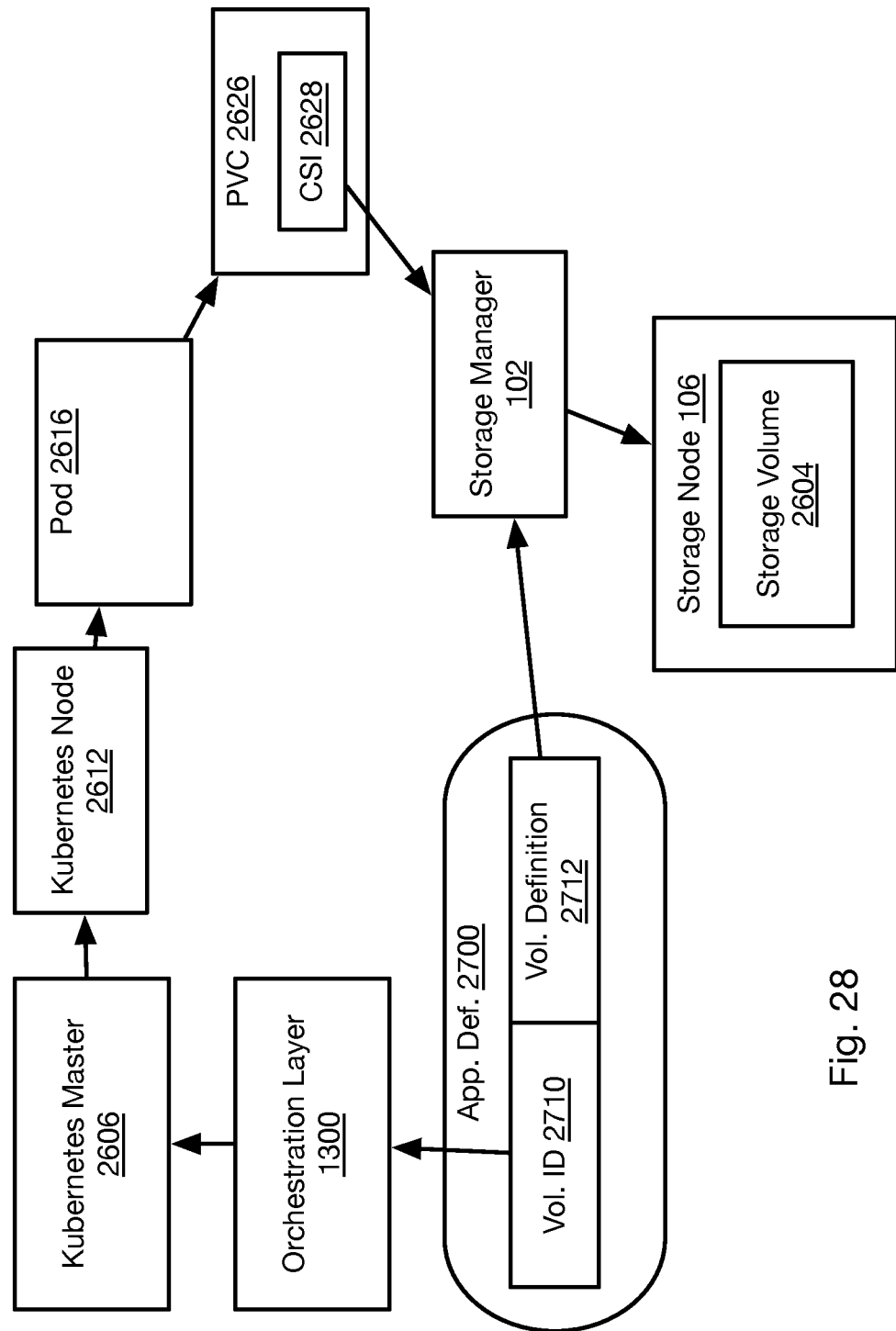
FIG. 28 is a diagram illustrating a system for coordination of storage volume management among different orchestration platforms in accordance with an embodiment of the present invention.

FIG. 28 illustrates an example workflow by which the application definition may be used to coordinate the mounting and creation of storage volumes 2604 with the Kubernetes installation 2600 that lacks the orchestration functions of the orchestration layer 1300.

In particular, a Kubernetes master 2606 may be instructed to create or mount a storage volume corresponding to volume ID 2710 and having a volume definition 2710. The instruction may include the volume identifier 2710 and one or more other parameters from the definition 2710. This instruction may come from the application definition 2700, such as by way of the orchestration layer 1300. The instruction is passed to a PVC 2626 executing a CSI 2628 that is programed to interface with the storage manager 102. Accordingly, the storage manager 102 receives the instruction and parameters and mounts an appropriate storage volume 2604 in order to implement a clone, rollback, restore from back up, migration to a different computing platform, or other operation as described herein. The storage manager may evaluate the volume definition 2712 corresponding to the volume ID 2710 when creating the storage volume 2604 in order to implement the operation.

Accordingly, storage volumes 2604 may be mounted to a service implemented by the Kubernetes installation 2600 in order to implement an operation being performed with respect to both the Kubernetes installation 2600 and the orchestration layer 1300. Examples of how such operations may be performed are described below with respect to FIGS. 30 through 38.

Figure 29:
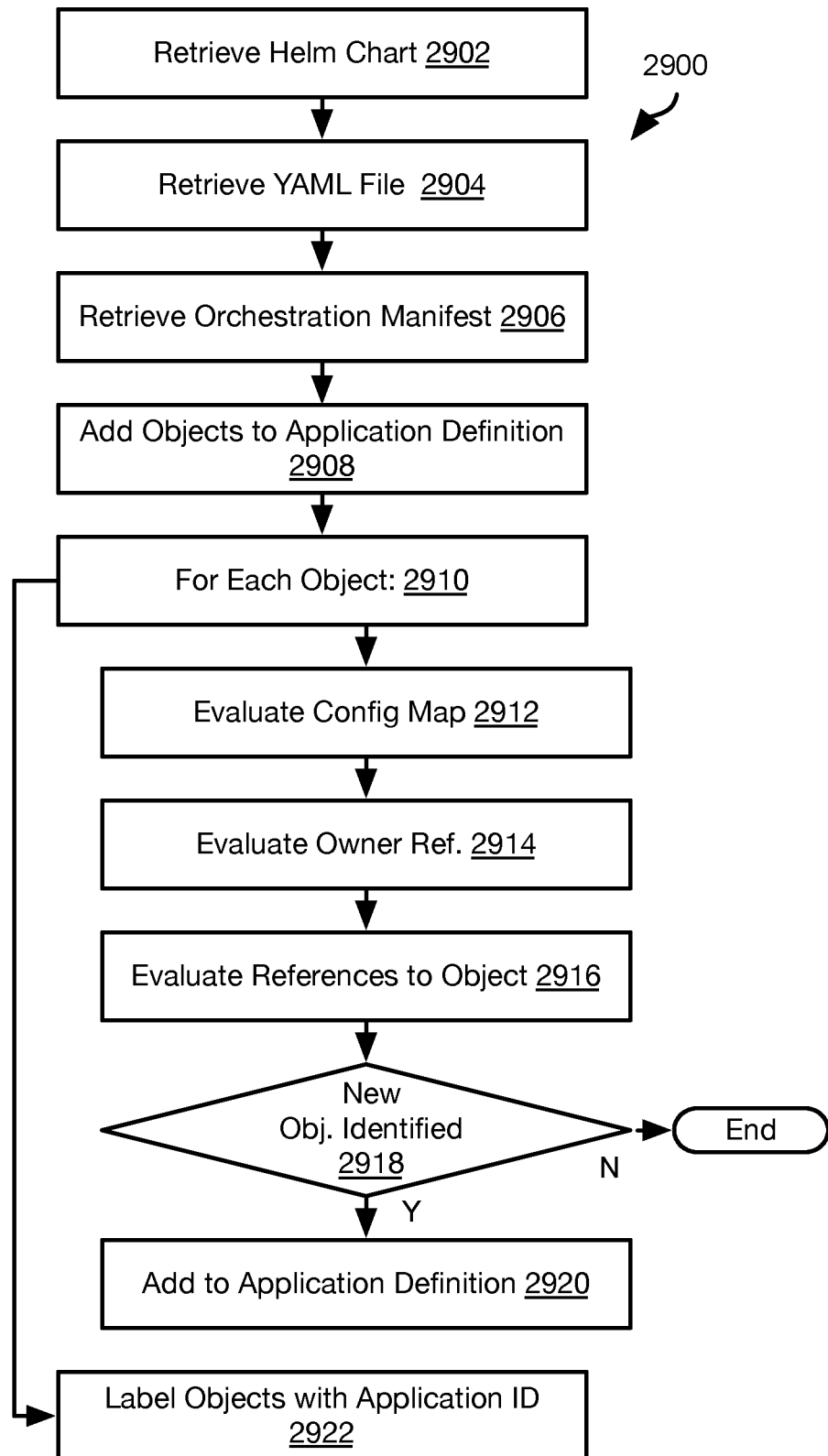
FIG. 29 is a process flow diagram of a method for generating an application definition of a deployed multi-role application.

FIG. 29 illustrates a method 2900 that may be executed by the orchestration layer 1300 or some other entity in order to create an initial application definition 2700 for a heterogeneously-orchestrated multi-role application.

The method 2700 may include retrieving 2902, 2904, 2906 sources of instructions for instructing creation of objects. These may include one or more helm charts 2608, YAML (YAML Ain't Markup Language) script, orchestration manifest 1304, StatefulSet, or scripts according to any orchestration approach known in the art. Other objects defining a Kubernetes installation 2600 may include a StatefulSet and a secret.

References to objects referenced in any of these files may then be added to the application definition 2700. For example, a reference to an object may be in the form of entries including such information as an object identifier, object type (executable or an application orchestration approach (Kubernetes, orchestration layer 1300, etc.), parameters in the file defining the object, relationships between objects indicated by the file, or other information defining the object.

The method 2900 may further include augmenting the information from step 2908 with additional information. In particular, each identified at step 2908 may be evaluated 2910 as "the subject object" to identify additional objects that may be linked to that object, such as by providing a service to the subject object or using a service of the subject object.

For example, this may include evaluating 2912, 2914, 2916 a configuration map of the subject object, an owner reference of the subject object (i.e. an identifier of an owner object of the subject object), and other reference to other objects in files or parameters of the object such as log files, input arguments, environment variables, or other sources of configuration data of the subject object. For each new object found 2918 to be identified at one or more of steps 2912-2916 (i.e., not identified from step 2908), a reference to the new object may be added 2920 to the application definition. This may include an entry including some or all of the information noted above with respect to step 2908. Note that steps 2912-2918 may be performed for each new object identified in order to further augment the application definition 2700.

The method 2900 may further include labeling 2922 each object identified at step 2908 or steps 2912-2916 with an identifier corresponding to the application definition, i.e. an identifier of a particular heterogeneously-orchestrated multi-role application. Labeling may include assigning the identifier to each object by any means such as (a) adding the identifier as a prefix or suffix to an identifier already associated with the object, (b) adding the identifier as an environment variable of the object, (c) or some other form of labeling The method 2900 may be repeated periodically to detect new objects that are added to the multi-role application.

Figure 30:
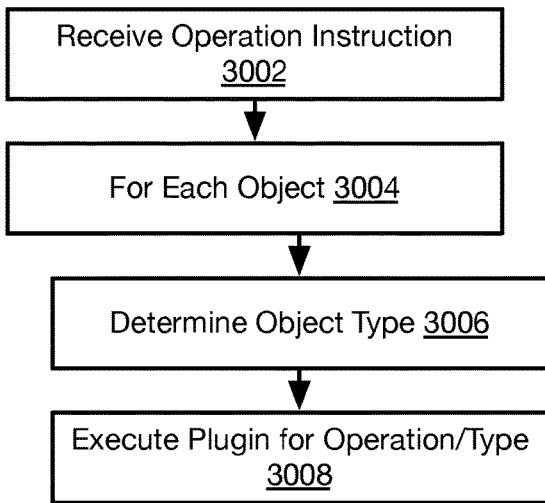
FIG. 30 is a process flow diagram of a method for performing operations on an application definition in accordance with an embodiment of the present invention.

FIG. 30 illustrates a generalized method 3000 for performing an operation with respect to a particular heterogeneously-orchestrated multi-role application for which an application definition 2700 has been created, such as according to the method 2900. The method 3000 may be executed by a computer system in the network environment 100 or 2500, such as a computer system executing the orchestration layer 1300.

The method 3000 may include receiving 3002 an operation instruction, such as in the form of a manually entered command from a human operator, a script instructing the performance of the operation at a prescribed interval or upon a condition being met, or some other manner. Examples of operation instructions may include instructions to create, for the multi-role application represented by the application definition 2700, a snapshot, a clone application, or a backup copy. Another operation type may include instructions to migrate the multi-role application to a different computing platform according to the application definition 2700, such as to a cloud computing platform 2502, a different cloud computing platform 2502, or different premise computing equipment. Other operation types may include instructions to rollback the multi-role application to an earlier snapshot or restore from a backup copy of the multi-role application. Another operation may include an instruction to upgrade some or all of the objects of the multi-role application to new versions.

The method 3000 may then include performing 3004 for each object in the application definition, determining 3006 a type of the object an executing a plugin corresponding to the operation instruction and the object type.

Note that an operation may be confined to specific objects or classes of objects. Accordingly, steps 3006-3008 may be confined to objects that meet a class or other definition received with the operation at step 3002.

Examples of methods that may be executed to perform various operation instructions with respect to an application definition are described below with respect to FIGS. 31 through 38.

Figure 31:
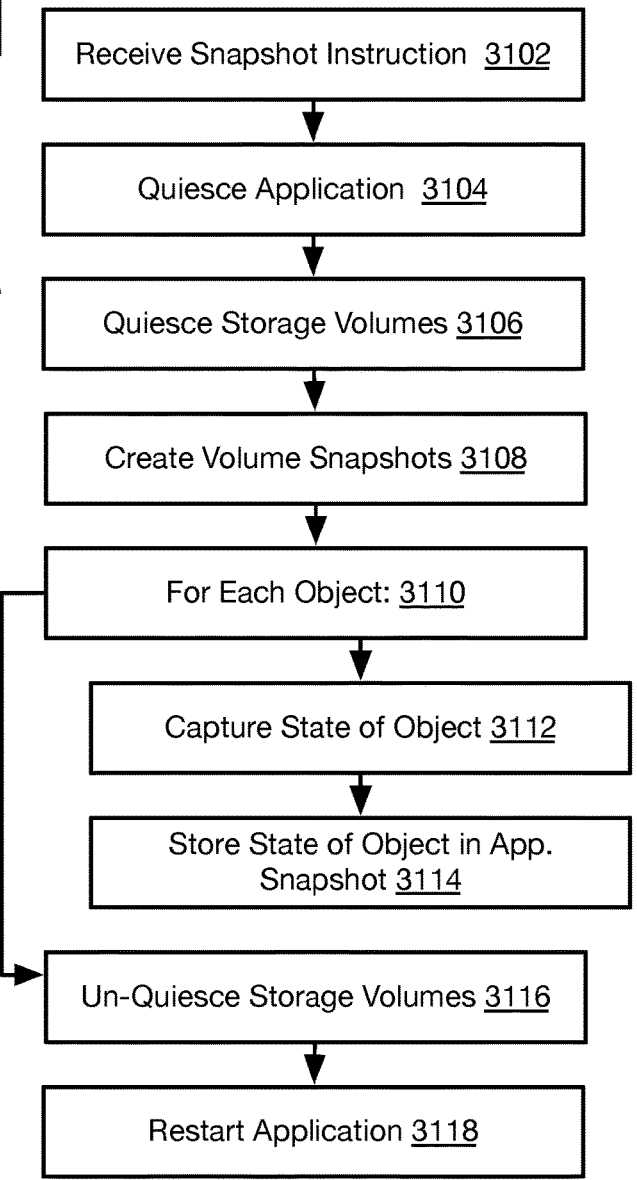
FIG. 31 is a process flow diagram of a method for generating a snapshot according to an application definition in accordance with an embodiment of the present invention.

FIG. 31 illustrates a method 3100 for creating a snapshot of a heterogeneously-orchestrated multi-role application for which an application definition 2700 has been created, such as according to the method 2900. The method 3100 may be executed by a computer system in the network environment 100 or 2500, such as a computer system executing the orchestration layer 1300.

The method 3100 may include receiving 3102 an operation instruction (see step 3002) to create a snapshot according to the application definition 2700. The remaining steps of the method 3100 may be performed subsequent to and in response to receiving 3102 the instruction.

The method 3100 may include quiescing 3104 the objects of the application other than storage volumes, e.g. services or other applications or roles executing within containers 1320, 2618. Quiescing 3104 may include instructing the object to pause execution or enter a wait state. Quiescing 3104 may be accomplished by instructing a container 1320, 2618 to pause execution of one or more objects executing within it.

The method 3100 may include quiescing 3106 storage volumes referenced in the application definition 2700. In some embodiments, step 3106 is constrained to be performed only after step 3104 has completed. Step 3106 may be performed only after any IOPs from the other application objects (the objects quiesced at step 3104) have completed execution.

Following step 3106, the method 3100 may include creating 3108 snapshots of the storage volumes referenced in the application definition. The manner in which this is performed is described below with respect to FIG. 32.

The method 3100 may further include capturing the topology of the multi-role application referenced by the application definition 2700. This may include performing 3110, for each object ("the subject object") referenced in the application definition 2700, capturing 3112 a state of the subject object and storing 3114 the state of the subject object in the application snapshot. The state of the subject object may include a complete state of execution, i.e. a specific instruction at which the subject object was stopped, a state of variables, registers, function call stack, and other parameters such that the subject object may be restarted at its same state. In other embodiments, the state of the subject object may be less granular and include current environment variables and configuration (identifiers of objects implementing services being used by or using a service implemented by the subject object).

Following performing steps 3110-3114 for the objects, the method 3100 may include un-quiescing 3116 (e.g., restarting) the storage volumes, e.g., for each storage volume, restarting a process programmed to process IOPs addressed to the each storage volume.

Following step 3116, the application may be restarted 3118, e.g., objects that are containers, services, or other executables referenced in the application definition may be restarted.

Note that in the method 3100 and other methods disclosed herein each step performed with respect to an object (quiescing, state capture, restarting, copying, migrating) may be accomplished by or along with execution of "hooks," i.e. scripts or executable code that defines actions performed prior to, during, and/or after performing that action for that object. Accordingly, some or all types of objects may have hooks defined for some or all operation instructions, for some or all steps involved in executing an operation instruction, and for some or all relative times (before, during, after) in performance of some or all steps.

Note further that a snapshot may be a partial snapshot such that the steps of the method 3100 are performed only for those objects implicated by the instruction, e.g. specific classes of objects, objects in a particular domain or workgroup, objects in some other subset of objects of the application as defined by a human operator, or objects for a single orchestrator (e.g., orchestration layer 1300 or Kubernetes installation 2600).

Figure 32:
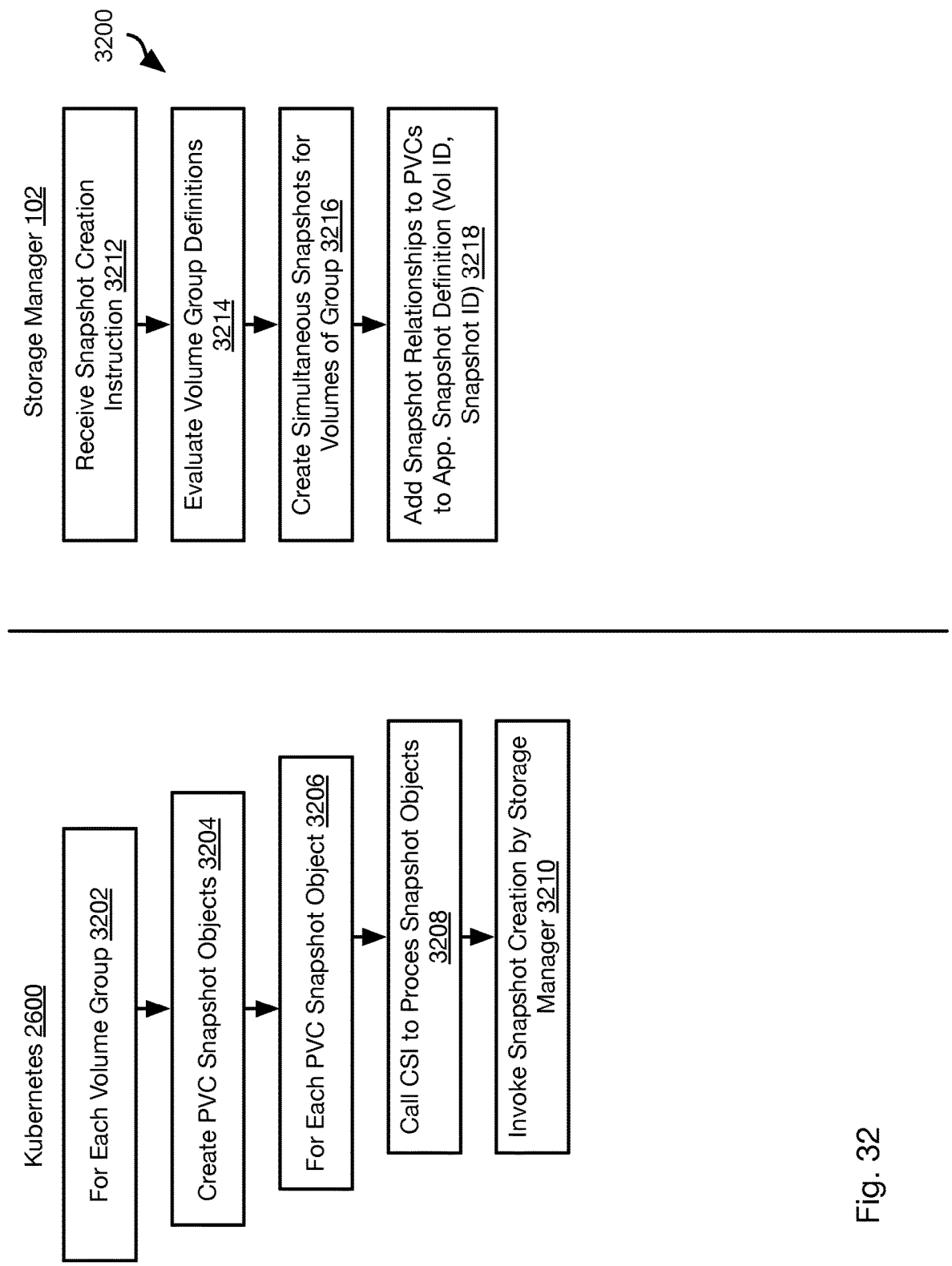
FIG. 32 is a process flow diagram of a method for creating snapshots of storage volumes using an application definition in accordance with an embodiment of the present invention.

FIG. 32 illustrates a method 3200 for creating snapshots of storage volumes of a heterogeneously-orchestrated multi-role application for which an application definition 2700 has been created, such as according to the method 2900. The method 3200 may be executed for storage volumes that are mounted to PVCs 2626 of pods 2616. Storage volumes created and managed by the orchestration layer 1300 and/or storage manager 102 may be processed according to the approach for creating snapshots described above with respect to FIG. 2.

The method 3200 may include performing 3202, for each volume group of the application definition, some or all of steps 3024-3210. A volume group may be a group of storage volumes for which a constraint is defined in the application definition, such as that one storage volume is a replica for another storage volume or that consistency between storage volumes of a group is to be preserved. These relationships may be specified in a manifest 1304 or other data of a bundled application 1302, a helm chart 2608, StatefulSet, a manually entered instruction, or some other source.

The method 3200 may include creating 3204 PVC snapshot objects that instruct the PVC 2626 that receives it to create snapshots of storage volumes mounted to it. Note that in some implementations of Kubernetes, PVCs 2626 are permitted to create snapshots only one at a time, e.g. over time in series such that one snapshot volume is created only after creation of a previous snapshot volume is complete.

For each PVC object, the PVC 2626 that receives it may perform 3206 calling 3208 a CSI 2628 of that PVC 2626 to create the snapshot. In response, the CSI 2628 will invoke 3210 creation of a snapshot by the storage manager 102. In particular, the CSI 2628 may provide a volume ID from the PVC snapshot object and possibly other parameters such as a parameter of flag that indicates that a snapshot is to be created for that volume ID.

The storage manager receives 3212 the snapshot creation instruction from the CSI 2628 and evaluates 3214 whether any volume group definitions of the application definition include the volume ID from the instruction. If the volume ID belongs to a volume group, then the storage manager creates 3216 snapshots substantially simultaneously for all storage volumes with storage volume IDs of that volume group. In particular, "substantially simultaneously" may mean that snapshots are created such that no write operations are executed during a time window during which the snapshots for all of the storage volumes of the group are created. "Substantially simultaneously" may mean that snapshots are created such that no write operations are executed or issued to the storage volumes (other objects with storage volume mounted to them are quiesced prior to creating snapshots) during a time window during which the snapshots for all of the storage volumes of the group are created.

Where storage volumes are created and managed by the storage manager 102 according to the methods described above with respect to some or all of FIGS. 2 through 12, creating 3216 snapshots may be performed as described above with respect to FIG. 2.

Where storage volumes are defined according to a different storage scheme, the storage manager 102 may invoke creation of snapshots as defined for that storage scheme. Accordingly, the manner in which snapshots are created 3216 may be according to any approach known in the art. In particular, creating a snapshot may include creating a record of when the snapshot was created such that data written to the storage volume prior to creation of the snapshot is associated with the snapshot and is not overwritten or deleted in response to subsequent write operations to the storage volume, even if the write operation references an address that was written to prior to creation of the snapshot.

The storage manager 102 may further include adding 3218 data describing the snapshot volumes to the application snapshot, e.g., augmenting the object state information and application topology from step 3114. In particular, the data added 3218 may indicate that a particular snapshot ID of a particular storage volume ID created at step 3216 belongs to the application snapshot, i.e. associated with an application snapshot ID.

The snapshot application following execution of the methods 3100 and 3200 may include the following information:

The application definition 2700 as of creation of the application snapshot, e.g. at some point after receiving the snapshot instruction and prior to restarting 3118 the application. In some embodiments, the application definition 2700 may be reviewed and updated per the method 2900 as part of creating a snapshot to identify objects that were added since the application definition 2700 was last updated. This updated application definition 2700 may then be part of the application snapshot.

The volume snapshot data from step 3218.

Figure 33:
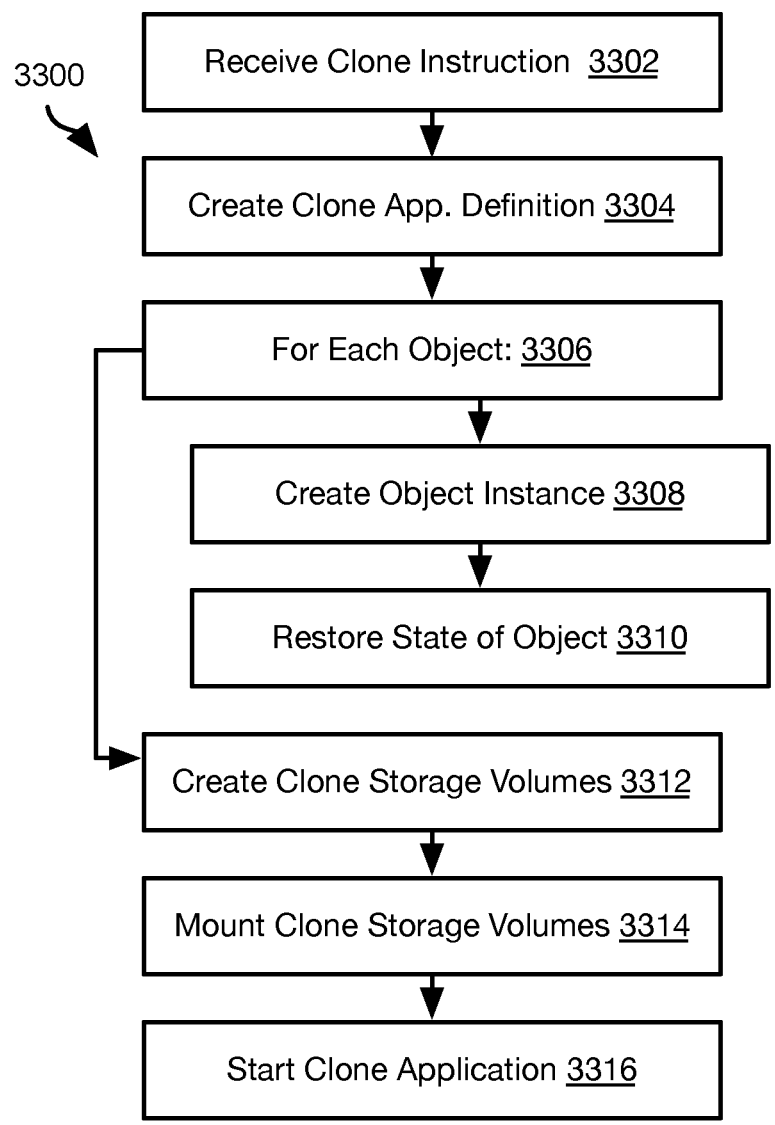
FIG. 33 is a process flow diagram of a method for cloning a multi-role application using an application definition in accordance with an embodiment of the present invention.

FIG. 33 illustrates a method 3300 for creating a clone of a heterogeneously-orchestrated multi-role application for which an application snapshot has been created, such as according to the method 3100. The method 3300 may be executed by a computer system in the network environment 100 or 2500, such as a computer system executing the orchestration layer 1300.

The method 3300 may include receiving 3302 an instruction to clone an application. The instruction may reference an identifier associated with an application definition 2700 or a snapshot application created according to the method 3100. Some or all of the remaining steps of the method 3300 may be performed in response to receiving 3302 the clone instruction.

The method 3300 may include creating 3304 a clone application definition. As noted above, an application snapshot may include a copy of the application definition. The clone application definition may be created as a transformation of this application definition. For example:

Object names may be changed to a clone object names, such as by adding or modifying a suffix or prefix to an object name.

A clone namespace may be created and substituted for an original namespace in the application definition such that names in the original namespace are mapped to clone names in the clone namespace.

Network addresses may be changed to new network addresses acquired for objects of the clone application.

Volume IDs may be substituted with new volume IDs of volumes to be created as part of the clone application. A mapping between the new volume ID and the snapshot ID and volume ID of which it is a clone may also be added to the clone application definition.

The clone application definition may be assigned an identifier and all objects of the clone application may be labeled with this identifier.

The method 3300 may further include processing 3306 each object ("the subject object"), excluding storage volumes, referenced in the clone application definition according to steps 3308 and 3310.

The method 3300 may include creating 3308 an instance of the subject object as indicated in the clone application definition, e.g. being an instance of an executable, application, role, or other source data identified in the clone application definition. This instance may be assigned the clone object identifier as created at step 3304 for the subject object.

The method 3300 may include restoring 3310 a state of the subject object from state data of the clone application definition, i.e. the state data of the object identifier in the application snapshot used to create the clone application definition and of which the object identifier of the subject identifier is a transformation per step 3304.

Restoring 3110 the state may include performing transformations as part of this step. In particular, references to other objects may be translated to the corresponding transformed object identifiers from step 3304. Network addresses, names from namespaces, and other data that was transformed at step 3304 may be replaced with the transformed version of this data.

The method 3300 may further include creating 3312 clone storage volumes. The clone storage volumes may be thick clones (data from snapshot of storage volume copied to clone storage volume on creation) or thin clones (data from snapshot of storage volume copied to clone storage volume on demand). The clone storage volume may also be a deferred thick clone. The manner in which thin, thick, or deferred thick clones are implemented may be as described above with respect to some or all of FIGS. 18A to 22.

The clone storage volumes may then be mounted 3314 to the object instances created at step 3308 according to the clone application definition. In particular, the clone volume ID may be mapped to clone object IDs to which it is to be mounted in the clone application definition. The manner in which clone storage volumes are created 3312 and mounted be performed according to the approach described below with respect to FIG. 34.

The clone application may then be started 3316, e.g. the clone storage volumes may be started (process for processing IOPs referencing them started) followed by starting execution of the objects created at step 3308 and 3310.

Figure 34:
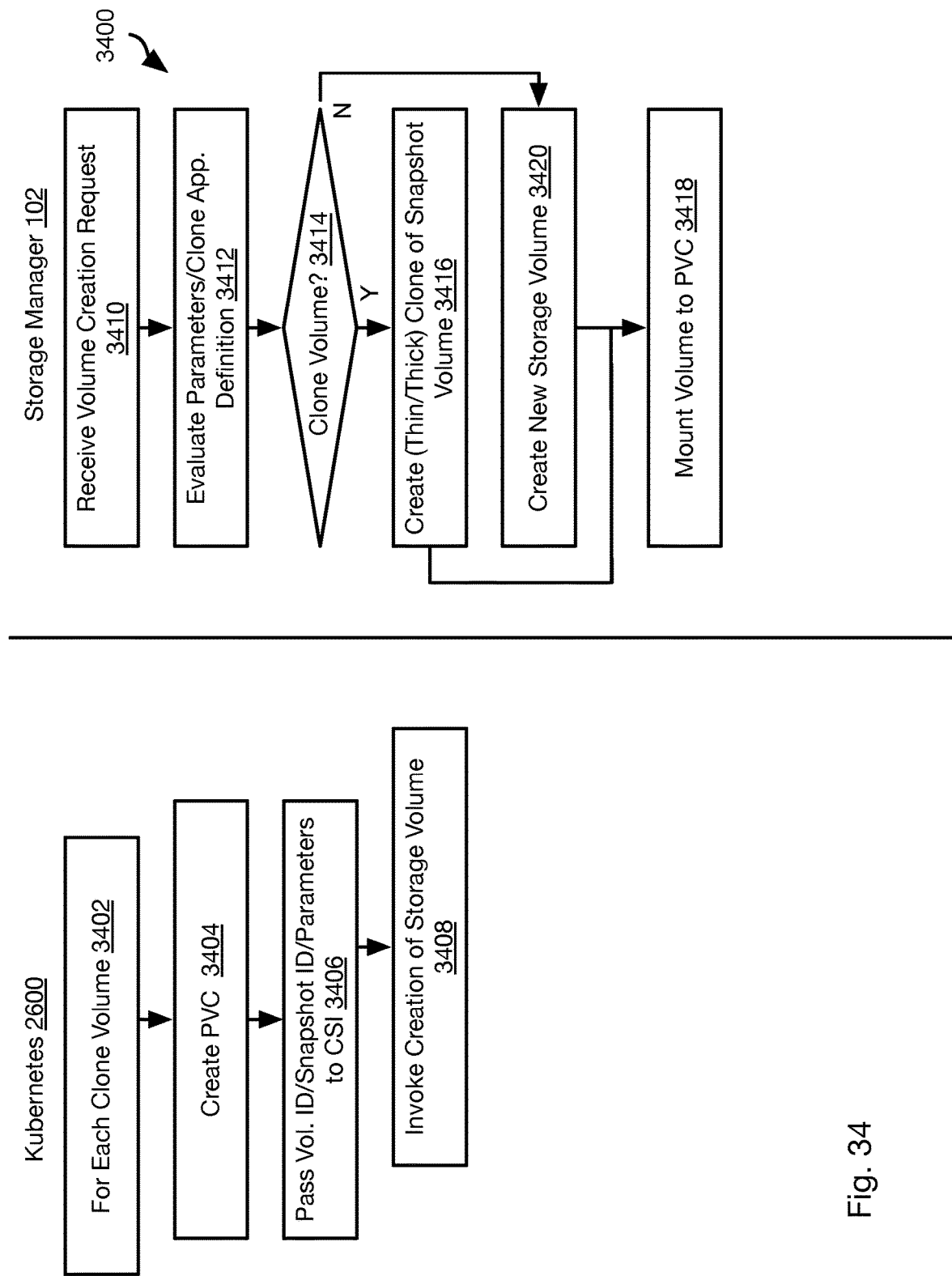
FIG. 34 is a process flow diagram of a method for creating clone volumes in accordance with an embodiment of the present invention.

FIG. 34 illustrates a method 3400 for creating clone storage volumes. In particular, the method 3400 may be used to create clone storage volumes to be mounted to PVCs 2626 of a Kubernetes installation 2600. Clone storage volumes for roles 1322 of a bundled application 1302 may be created directly by the orchestration layer 1300 as described below with respect to some or all of FIGS. 1 through 22.

The method 3400 may include performing 3402, for each clone storage volume in the clone application definition to be mounted to a PVC 2626, creating 3404 the PVC 2628 in the pod 2616 to which the clone storage volume is to be mounted if this step has not already been performed. The clone volume ID and other parameters such as a volume ID and snapshot ID of the storage volume of which the clone volume is a clone may also be passed 3406 to the CSI 2628. Other information may include an identifier of the clone application. A size of the logical storage volume may be included or may be inferred to be a size of the storage volume corresponding to the volume ID of the storage volume of which the clone volume is a clone.

The CSI 2628 may then instruct 3408 the storage manager 102 to create a clone storage volume according to the parameters passed at step 3406.

The storage manager 102 receives 3410 the volume creation instruction and evaluates 3412 the parameters and the clone application definition included in the parameters or corresponding to the parameters to determine 3414 whether the storage volume to be created is a clone volume. In particular, the clone application definition may indicate that the volume ID of the clone volume is a clone volume and further indicate the volume ID and snapshot ID from which the clone volume is to be created.

In response to determining 3414 that the volume to be created is a clone volume, the storage volume creates 3416 a clone of the snapshot volume corresponding to the volume ID and snapshot ID indicated in the clone application definition or the passed parameters. The clone volume may be a thin, thick, or deferred thick clone as described above with respect to FIGS. 18A to 22. The type of clone volume may be specified in the clone application definition, such as according to a predefined default preference or explicit type specified for the clone volume or according to usage of the original storage volume (e.g., usage above a threshold will result in thick or deferred thick otherwise a thin clone).

The clone volume created at step 3416 may then be mounted 3418 to the PVC 2626 that issued the instruction at steps 3406 and 3408.

If an instruction to create a storage volume is found 3414 not to be a request to create a clone storage volume, a new storage volume is created 3420, such as described below with respect to some or all of FIGS. 1-12 and the new storage volume is mounted 3418 to the PVC that created it.

Figure 35:
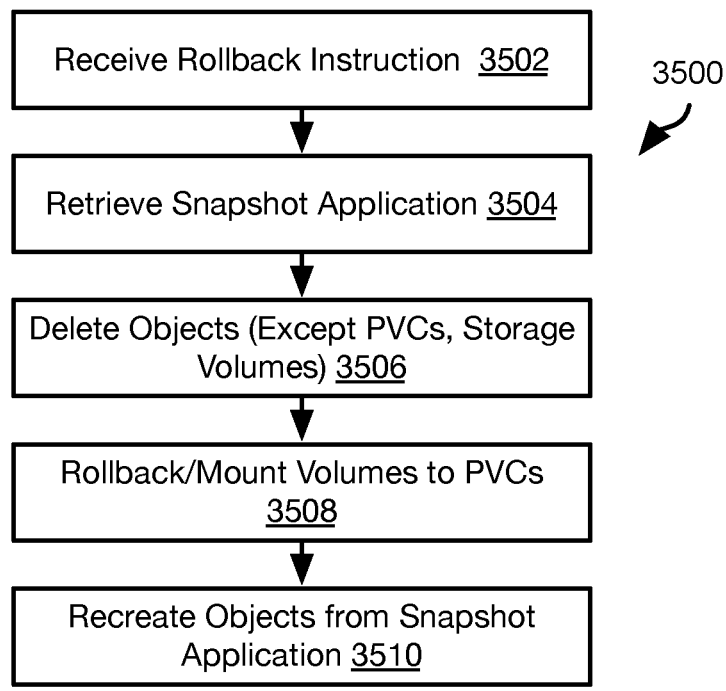
FIG. 35 is a process flow diagram of a method for rolling back a multi-role application according to a snapshot of an application definition in accordance with an embodiment of the present invention.

FIG. 35 illustrates a method 3500 for rolling back a heterogeneously-orchestrated multi-role application for which an application snapshot has been created, such as according to the method 3100. The method 3500 may be executed by a computer system in the network environment 100 or 2500, such as a computer system executing the orchestration layer 1300.

The method 3500 may include receiving 3502 an instruction to rollback an application to a snapshot application. The instruction may reference an identifier associated with a snapshot application created according to the method 3100. Some or all of the remaining steps of the method 3500 may be performed in response to receiving 3502 the clone instruction.

The method 3500 may include retrieving 3504 the snapshot application referenced by the instruction, such as from archival storage or other storage location where it is located. The method 3500 may further include stopping and deleting 3506 all objects (other than PVCs and storage volumes).

The storage volumes of the application may be rolled 3508 back to the snapshots created upon creation of the application snapshot and included in the application snapshot. The rolled back storage volumes may also be mounted to the PVCs or containers 1320 as indicated in the snapshot application. Rolling back may be performed according to any approach known in the art for rolling back to a snapshot, such as the approaches described herein below.

The method 3500 may further include recreating 3510 the objects referenced in the snapshot application. This may include instantiating all of the objects identified in the snapshot application, with the exception of PVCs and storage volumes. The states of execution of the objects instantiated at step 3508 may also be restored from the states for these objects saved in the application snapshot. These objects may then be restarted such that the rolled back application may begin to execute.

Figure 36:
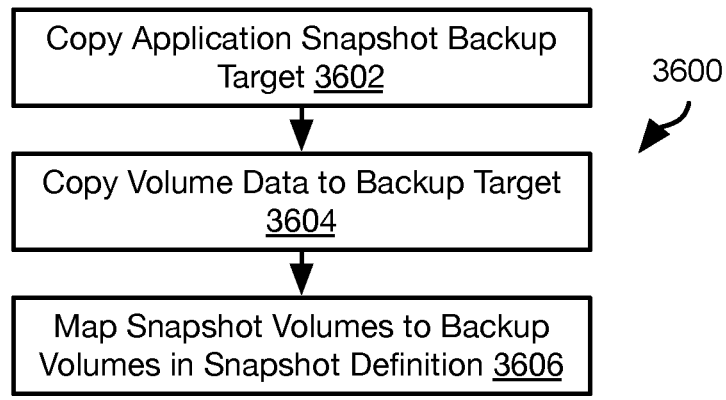
FIG. 36 is a process flow diagram of a method for creating a backup of a multi-role application according to an application definition in accordance with an embodiment of the present invention.

FIG. 36 illustrates a method 3600 for creating a backup copy of a heterogeneously-orchestrated multi-role application for which an application snapshot has been created, such as according to the method 3100. The method 3600 may be executed by a computer system in the network environment 100 or 2500, such as a computer system executing the orchestration layer 1300.

The method 3600 may include copying 3602 an application snapshot according to the method 3100 to a backup target and copying 3604 snapshots of storage volumes referenced by the application snapshot to the application target. The backup target may be one or more storage devices 108 of premise equipment, cloud storage resources 2506. In particular, object storage 2508 of a cloud computing platform 2502 may be a suitable backup target.

The method 3600 may further include mapping 3606, on the backup target, each copy of a snapshot of a storage volume on the backup target to the volume IDs and snapshot ID of which the copy is a copy. For example, a mapping may indicate that copy storage volume $V_N$ is a copy of snapshot $S_M$ of storage volume $V_Q$. Alternatively, references to a first volume ID and snapshot ID in the application snapshot may be replaced with a reference to a second volume ID of the copy of that snapshot of the first volume ID on the backup target.

Figure 37:
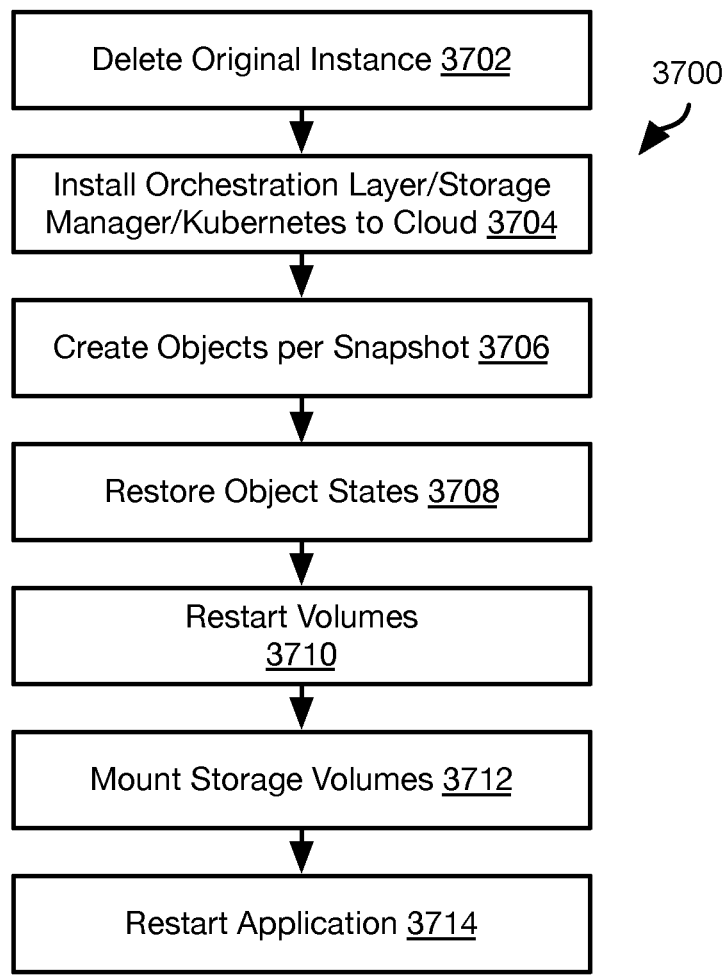
FIG. 37 is a process flow diagram of a method for migrating a multi-role application according to a snapshot application definition in accordance with an embodiment of the present invention.

FIG. 37 illustrates a method 3700 for migrating a heterogeneously-orchestrated multi-role application for which an application snapshot has been created, such as according to the method 3100 and for which a backup copy has been created according to the method 3600. In particular, the method 3700 may be used to make a backup copy the current executing copy on the backup target to the replacement of the original instance of the multi-role application. The method 3700 may be executed by a computer system in the network environment 100 or 2500, such as a computer system executing the orchestration layer 1300. Migration may be performed from premise computing equipment to a cloud computing platform 2502 or between different cloud computing platforms 2502.

The method 3700 may include deleting 3702 the original instance of the multi-role application. This may include deleting all objects other than storage volumes or including storage volumes referenced in the application snapshot. Note that the methods 3600 and 3700 may be performed after creating a snapshot for a multi-role application but before the multi-role application is restarted. Accordingly, further disruption of the application does not result from the deletion 3702.

The method 3700 may further include installing 3704 orchestration software on the backup target if not already installed. This may include installing software such as an orchestration layer 1300, storage manager 102, Kubernetes master 2600, one or more Kubernetes nodes 2612, or other orchestration software.

The method 3700 may further include creating 3706 instances of objects referenced in the application snapshot, such as objects other than storage volumes, on the backup target and restoring 3708 the states of these objects according to the states thereof stored in the application snapshot. Restoring 3708 the states may include performing translation to refer to resources on the backup target, e.g., network addresses of resources (which may be virtual in a cloud computing platform 2502) allocated to execute the objects in the place of resources on which objects were executing in the original installation of the multi-tier application.

The method 3700 may further include restarting 3712 and mounting 3710 storage volumes as defined in the application snapshot. As noted with respect to FIG. 36, copies of the snapshots of storage volumes of the application snapshot may already be copied to the backup target such that step 3712 includes mounting these copies to PVCs 2626 as indicated in the application snapshot, i.e. a given volume ID is mounted to a PVC 2626 having an ID with which it is associated in the application snapshot.

In other embodiments, the copies of snapshots of the storage volumes of the application snapshot are either (a) stored in archival storage (e.g., object storage 2508 or other type of storage that cannot be mounted directly) or (b) not present on the backup target. For example, where an application snapshot is copied to a backup target for the intent of migrating or cloning the application snapshot, copying snapshots of storage volumes to the backup target or to a mountable type of storage on the backup target may be omitted with the intent of implementing thin clones on the new instance of the multi-role application on the backup target. Accordingly, in such embodiments, steps 3710 and 3712 may be replaced with executing the method 3800 of FIG. 38, described below.

In either case, the application may then be restarted 3714 in the same manner as for other embodiments disclosed herein, i.e. execution of the objects of the new instance of the multi-role application on the backup target may be initiated, except for the storage volumes which may have already been restarted.

Figure 38:
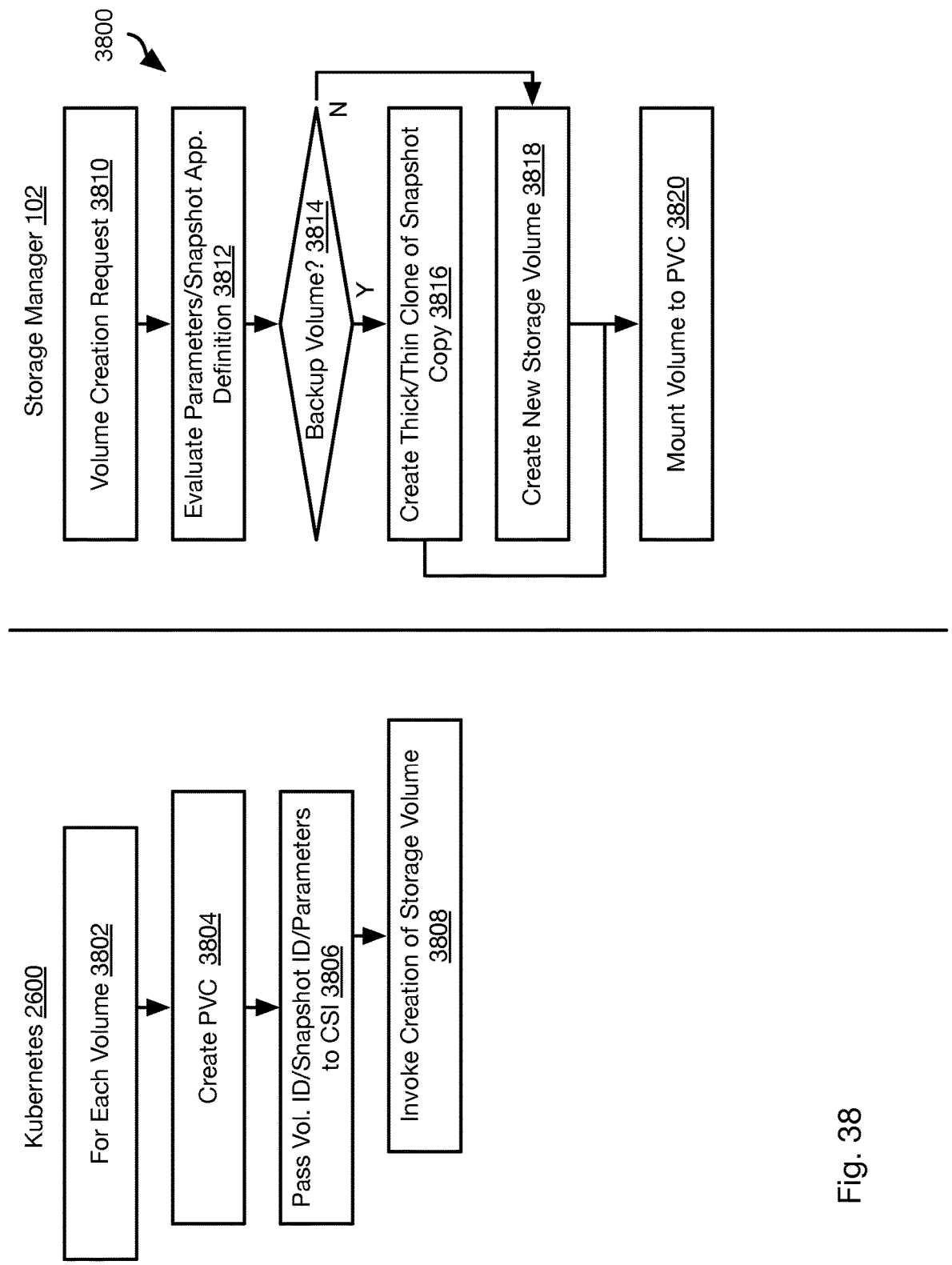
FIG. 38 is a process flow diagram of a method for migrating volumes of a multi-role application using a snapshot application definition in accordance with an embodiment of the present invention.

FIG. 38 illustrates a method 3800 for migrating storage volumes to a backup (e.g., migration) target. In particular, the method 3800 may be used to create clones (thin, thick, deferred thick) of storage volumes to be mounted to PVCs 2626 of a Kubernetes installation 2600 that are part of a migrated instance of a heterogeneously-orchestrated multi-role application. Copies of storage volumes for roles 1322 of a bundled application 1302 implemented by the orchestration layer 1300 may be created directly as thin, thick, or deferred thick clones as described below with respect to some or all of FIGS. 1 through 22. The method 3800 may be executed on the backup target, such as by an orchestration layer 1300 and/or storage manager 102 executing on the backup target.

The method 3800 may include performing 3802, for each clone storage volume in the application snapshot to be mounted to a PVC 2628, creating 3804 the PVC 2628 in the pod 2616 to which the clone of the storage volume is to be mounted if this step has not already been performed. The clone volume ID and other parameters such as a volume ID and snapshot ID of the storage volume of which the clone volume is a clone may also be passed 3806 to the CSI 2628 of the PVC 2628. Other information may include an identifier of the clone application, i.e., the identifier of the new instance of the multi-role application being instantiated on the backup target. A size of the logical storage volume may be included or may be inferred to be a size of the storage volume corresponding to the volume ID of the storage volume of which the clone volume is a clone.

The CSI 2628 may then instruct 3608 the storage manager 102 to create a clone storage volume according to the parameters passed at step 3806.

The storage manager 102 receives 3810 the volume creation instruction and evaluates 3812 the parameters and the clone application definition included in the parameters or corresponding to the parameters to determine 3814 whether the storage volume to be created is a clone volume. In particular, the clone application definition may indicate that the volume ID of the clone volume is a clone volume and further indicate the volume ID and snapshot ID from which the clone volume is to be created.

In response to determining 3814 that the volume to be created is a clone volume, the storage volume creates 3816 a clone of the snapshot corresponding to the volume ID and snapshot ID indicated in the clone application definition or the passed parameters. The clone volume may be a thin, thick, or deferred thick clone as described above with respect to FIGS. 18A to 22. The type of clone volume may be specified in the clone application definition, such as according to a predefined default preference or explicit type specified for the clone volume or according to usage of the original storage volume (e.g., usage above a threshold will result in thick or deferred thick otherwise a thin clone).

Note that in the case of migrating a multi-role application to a new computing platform, a thin, thick, or deferred thick clone may be a clone of a storage volume stored on the new computing platform, such as in object storage 2508 of the computing platform. Accordingly, the copy of the snapshot application on the backup target may be modified to map a volume ID and snapshot ID to an object or collection of objects in the object storage 2508. For example, segment for a volume ID and snapshot ID may be objects in the object storage 2508. Accordingly, the thin, thick, or deferred thick clone may reference these objects and retrieve them from object storage as needed or in the process of populating a thick or deferred thick clone according to the approach described above with respect to FIGS. 18A to 22.s The clone volume created at step 3816 may then be mounted 3818 to the PVC that issued the instruction at steps 3806 and 3808.

If an instruction to create a storage volume is found 3814 not to be a request to create a clone storage volume, a new storage volume is created 3820, such as described below with respect to some or all of FIGS. 1-12 and the new storage volume is mounted 3818 to the PVC that created it.

Figure 39:
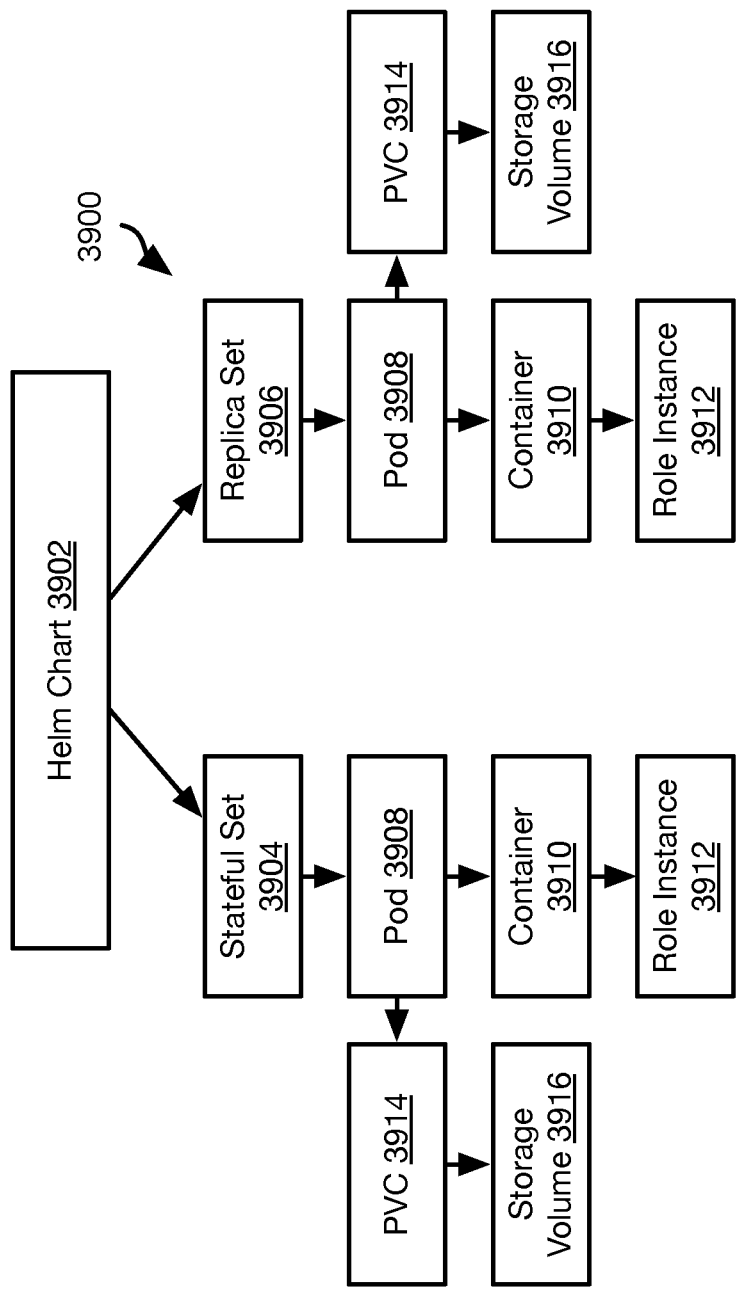
FIG. 39 is a schematic block diagram of an application implemented according to a helm chart.

Referring to FIG. 39, a KUBERNETES application 3900 may be defined by a Helm chart 3902 that is interpreted by a KUBERNETES master in order to instantiate and configure objects of the KUBERNETES application. For example, the Helm chart 3902 may define one or more stateful sets 3904 or replica sets. Each of these may include specifications for one or more pods 3906, one or more containers 3910 to be implemented by each pod 3908, and role instances 3912 that are to execute within each container, i.e. instances of executables to execute within each container 3910.

The Helm chart 3902 may further define such objects as services, service accounts, secrets, config maps, and other objects that may be used to define a stateful set 3904 and replica set 3906 as known in the art.

The Helm chart 3902 may further include specifications for PVCs 3912 that are associated with one of the PODs 3908. The specification for each PVC 3912 may identify a storage volume 3912 that is mounted to that PVC 3912 or otherwise associated with that PVC. The storage volumes 3912 may be storage volumes implemented by a storage manager 102 as described hereinabove. Accordingly, the specification for a PVC 3912 may include an identifier of the storage volume 3912 associated with it and may further include a snapshot identifier of that storage volume 3912.

Figure 40:
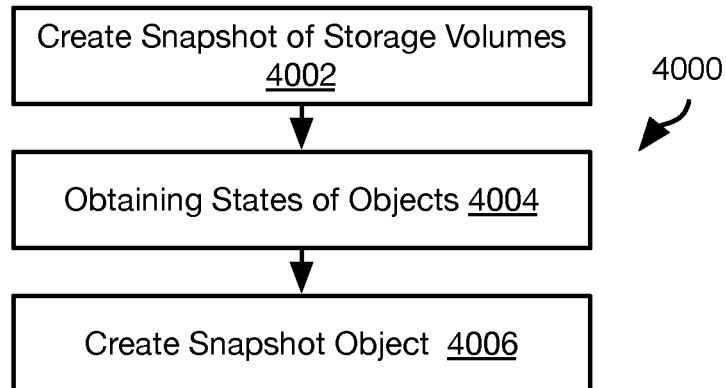
FIG. 40 is a process flow diagram of a method for creating a snapshot of an application implemented according to a helm chart in accordance with an embodiment of the present invention.

FIG. 40 is a process flow diagram of a method 4000 for creating a snapshot of an application 3900 implemented according to a Helm chart 3902. The method 4000 may be executed by the orchestration layer 1300, i.e. a computing device executing the orchestration layer 1300, or some other module that may be executing on a different computing device.

The method 4000 may include creating 4002 a snapshot of the storage volumes 3912 of the application 3900. This may include creating snapshots according to the approaches described above with respect to some or all of FIGS. 2 through 12.

The method 4000 may include obtaining 4004 the states of all objects of the application 3900. This may include acquiring information describing some or all of the objects 3904-3914 of the application 3900. This may include, for each object, information such as the type (stateful set, replica set, pod, container, secret, config map, service, service account, etc.) of the object, an identifier of the object, configuration information for the object (identifiers of pods of a stateful or replica set, identifiers of containers managed by a pod, type of a container, identifier of an application instance executed by a container, an identifier of a computing node (e.g. a node 106, 110) hosting the object, or other information).

The method 4000 may further include creating a snapshot object 4006 including the state information from step 4004 as well as identifiers of the storage volumes and snapshots of storage volumes created at step 4002. For example, the snapshot object may be a JavaScript Object Notation (JSON) object storing this information. The snapshot object may be stored for later use, such as locally on a storage node 106, one a remote storage device, or cloud storage system as a backup.

Figure 41:
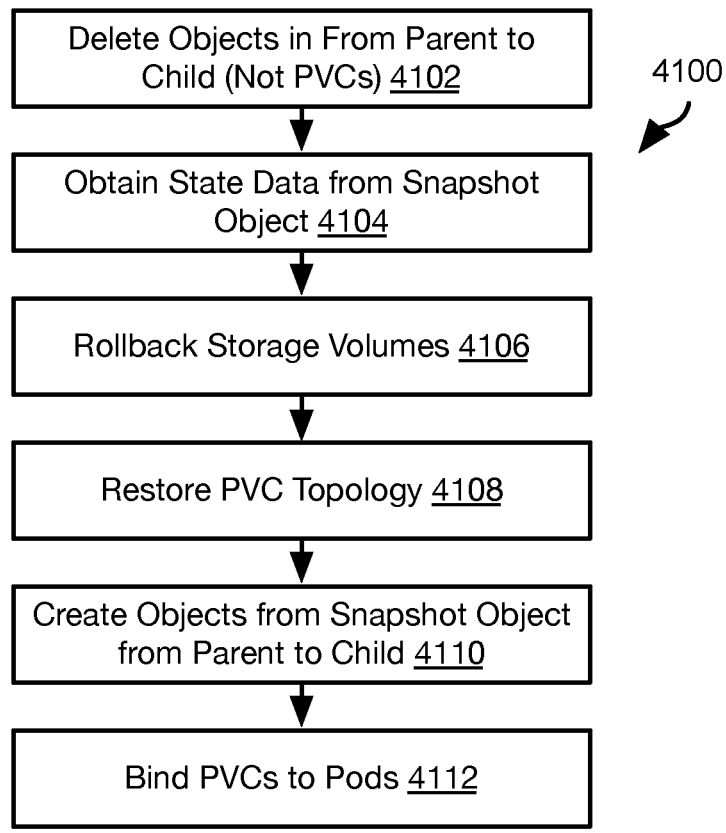
FIG. 41 is a process flow diagram of a method for rolling back an application using a snapshot with special handling of storage volumes in accordance with an embodiment of the present invention.

FIG. 41 illustrates a method 4100 that may be executed in order to rollback an application 3900 to a snapshot created according to the method 4000. The method 4100 may be executed by the orchestration layer 1300, i.e. a computing device executing the orchestration layer 1300, or some other module that may be executing on a different computing device.

The method 4100 may include deleting 4102 objects of the application with the deleting being from parent object to child object and excluding PVCs 3914 and storage volumes 3916. Deleting 4102 from parent to child may be understood with respect to FIG. 39: the arrows of FIG. 39 may be interpreted as pointing from a parent object to a child object. Accordingly, a stateful set 3904 may be deleted before deleting a pod 3908 defined by the stateful set 3904. A pod 3908 may deleted before deleting a container 3910 managed by that pod 3908. In this manner, deleting of a pod 3908, for example, will not trigger the stateful set 3904 to attempt to recreate the pod 3908 since the stateful set 3904 will have already been deleted.

The method 4100 may then include obtaining 4104 state data from the snapshot object. For example, the method 4100 may be invoked by a user specifying that the application is to be rolled back to a snapshot object specified by the user, such as by means of inputting an identifier (e.g., file name) of the snapshot object or selecting a representation of the snapshot object in a graphical user interface.

The method 4100 may include rolling back 4106 the storage volumes of the application 3900 to the snapshots of the volumes referenced in the snapshot object. Rolling back 4106 may of the storage volumes may be performed by the storage manager 102 as described above with respect to FIGS. 2 through 12.

The method 4108 may further include restoring 4108 the topology of PVCs 3914 of the application 3900 as constituted at the time of creation of the snapshot object. In particular, if a PVC was deleted following creation of the snapshot object, a replacement PVC may be instantiated and be assigned the identifier of the PVC that was deleted. If a new PVC was created after creation of the snapshot object, the new PVC may be deleted. Those PVCs that existed at the time of creation of the snapshot object and still exist remain undeleted and the rolled back versions of the storage volumes that were previously mounted to those PVCs may be mounted to them at step 4108. If a new PVC was created at step 4108 the rolled back storage volume corresponding to that PVC may be mounted to it at step 4108.

For example, the snapshot object may record an identifier for each PVC and an identifier of a storage volume mounted to that PVC and an identifier of the snapshot of the storage volume mounted to that PVC. Accordingly, for each PVC the storage volume having the identifier mapped to that PVC may be rolled back to the snapshot identified in the snapshot object and the rolled back version may be mounted to that PVC.

Once the PVC topology is restored according to step 4108, the method 4100 may include creating 4110 other objects identified in the snapshot object: stateful sets, replica sets, pods, containers, role instances, secrets, config maps, services, service accounts, and the like. The objects may be created using the information stored in the snapshot object, i.e. each object may be configured and have a state recorded for that object in the snapshot object.

Note also that objects may be created at step 4110 in order from parent to child. For example, referring again to FIG. 39, a stateful set 3904 may be created. The stateful set 3904 may then invoke creation of one or more pods 3908, the one or more pods 3908 may then invoke creation of containers 3910 and loading of role instances 3912 into those containers.

The method 4100 may further include binding 4112 the PVCs as restored at step 4108 to the pods 3908 as created at step 4110. For example, the snapshot object may be generated such that it includes an identifier of each PVC to an identifier of a pod 3908 to which it was bound at the time of creation of the snapshot object. Accordingly, each PVC may be bound to the pod 3908 having the pod identifier to which the identifier of the PVC is mapped in the snapshot object.

Figure 42:
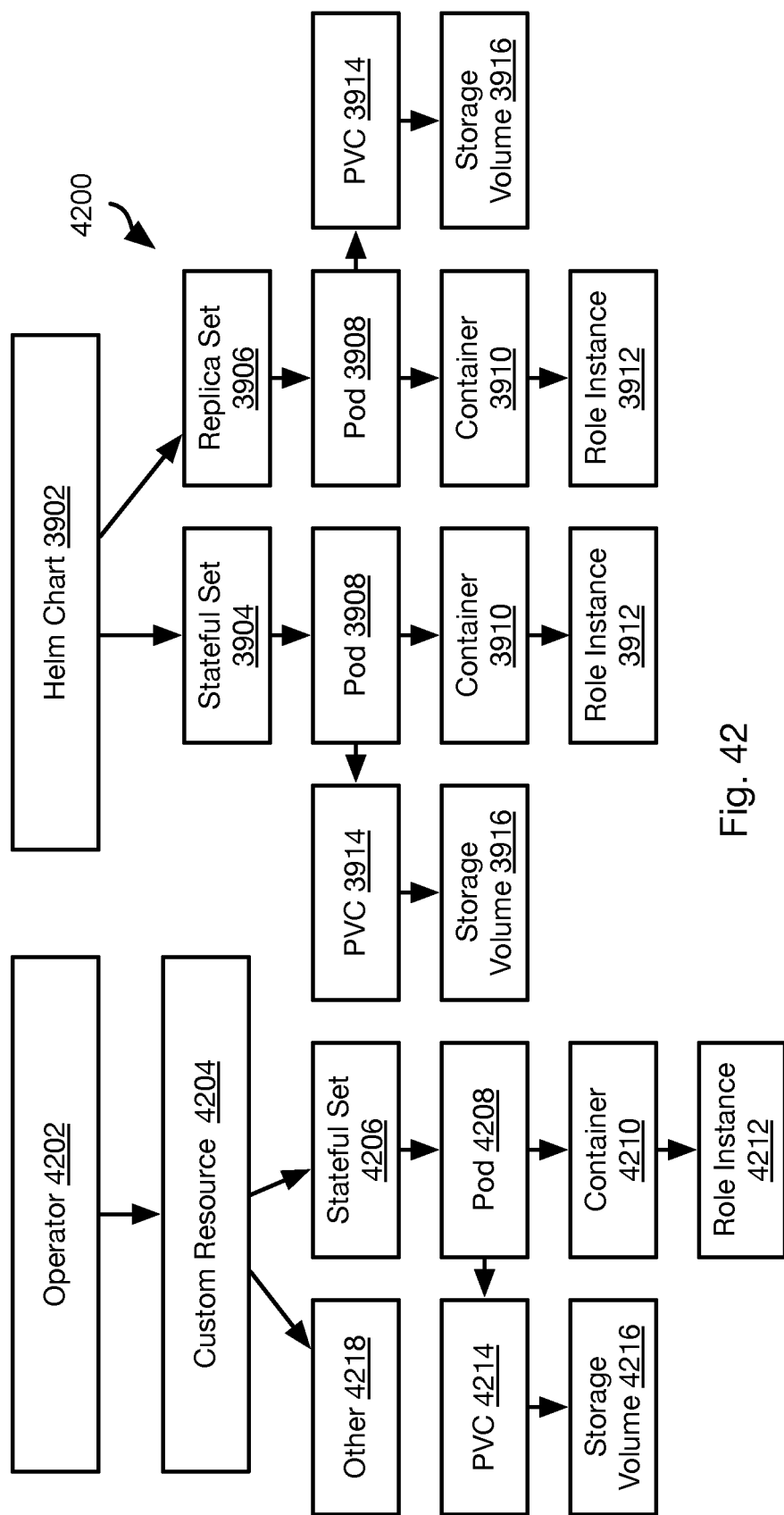
FIG. 42 is a schematic block diagram of an application implemented according to a helm chart and one or more custom resources.

Referring to FIG. 42, in some embodiments, an application 4200 may include objects 3904-3914 implemented according to a helm chart, such as some or all of the objects described above with respect to the application 3900. The application 4200 may further include additional objects, including a custom resource 4204 and one or more objects instantiated as defined by the customer resource. The custom resource 4204 may be the COUCHBASE autonomous operator, PERCONA operator, or other type of operator.

For example, the custom resource 4204 may be created by a KUBERNETES operator 4202 that instructs a KUBERNETES master to create an object that is the custom resource 4204. The custom resource 4204 is an executable that then invokes the creation of one or more other objects. For example, the custom resource 4204 may invoke APIs of the KUBERNETES master to invoke instantiation of a stateful set 4206 including one or more pods 4208 and one or more containers 42010 managed by the pods 4208. The custom resource 4204 may further instruct the KUBERNETES master to create a PVC 4214 and mount a storage volume 4216 thereto, which may be a storage volume implemented by the storage manager 102 according to the methods disclosed herein.

The custom resource 42044204 may further invoke the instantiation of one or more other objects 4218 such as services, replica sets, and deployments, each of which may also be the parent of other objects such as pods, containers, and role instances. The custom resource may also invoke creation of service accounts for the service. Note that the Helm chart 3902 may additionally invoke the creation of services and deployments in addition to the stateful set 3904 and replica set 3906 shown in FIG. 42.

Note that the custom resource 4204 may be an executing application that monitors the status of objects instantiated at its instruction by way of the operator 4202. Accordingly, the custom resource 4204 may instruct the KUBERNETES master to recreate objects that are detected as having failed. Alternatively, the operator object 4202 may manage the monitoring and re-instantiating of objects created by the custom resource 4204 that have failed.

Referring to FIG. 43, the illustrated method 4300 may be used to rollback an application 4200 that includes objects implemented according to a custom resource 4204. The method 4200 may be executed for objects created by a custom resource 4204 referenced in a snapshot object whereas the method 4100 is executed for objects generated according to a helm chart 3902. Where an application includes objects created by an orchestration layer 1300 as described above, these objects may be rolled back according to the approach described with respect to FIG. 17.

The method 4300 may be preceded by executing the method 4000 to create a snapshot object of the application 4200. In particular, the method 4000 may include creating a snapshot object that includes information describing the configuration and state of the operator 4202, custom resource 4204, and objects 4206-4218 created in response to instructions from the custom resource 4204 and references to storage volumes 4216 mounted to the PVCs 4214 as described above. Note in particular that for each service of a custom resource 4204, the information in the snapshot object may include network (i.e., internet protocol) addresses of the service and may further include port numbers associated with the service, i.e. that the service listens to or transmits over. There may be multiple custom resources 4204 that are included in the snapshot object along with their objects 4206-4218 in the same manner.

The method 4300 may be executed by the orchestration layer 1300, i.e. a computing device executing the orchestration layer 1300, or some other module that may be executing on a different computing device. As for the method 4100, the method 4300 may be preceded by an instruction to rollback the application 4200 to a previously-created snapshot object of the application 4200.

In response to a user invoking rolling back of the application 4200 to a snapshot object, the method 4300 may include identifying 4302 objects represented in the snapshot object, including custom resources, PVCs, storage volumes, and services. The method 4300 may include creating 4304 copies of services represented in the snapshot. This may include creating copies that are configured to use the same IP address and port number as the services represented in the snapshot object.

The method 4300 may include registering 4306 an intent with the storage manager to rollback one or more storage volumes represented in the snapshot object. Intent may be registered with respect to only the storage volumes 4216 mounted to PVCs 4214 in response to instructions of the custom resource 4204 or may be additionally registered with respect to one or more storage volumes 3916 mounted to PVCs 3914 created based on processing of the Helm chart 3902. As discussed below, some storage volumes 3916 may be assigned to groups that require consistency such that all volumes of the group should be rolled back substantially simultaneously, i.e. a rolled back storage volume cannot be mounted and accessible for read and write IOPs at the same time as a non-rolled back storage volume from the group. Accordingly, the intent to rollback a storage volume may be registered with respect to all of the storage volumes of the group. The registering of the intent may further indicate any consistency requirement, i.e. may include an association between volumes of a consistency group in the form of a common group identifier associated with the rollback intent registered for each storage volume of the consistency group or by including a listing of the identifiers of the storage volumes of a group in the registered intent.

The method 4300 may then include deleting 4308 the objects of the application 4200. In some embodiments, step 4308 includes deleting any custom resources 4202 of the application 4200 before deleting other objects created by the custom resource 4204 and deleting other objects only after the deleting of the custom resources 4202 is complete. In some implementations, deleting a custom resource 4204 will inherently result in deletion of the PVCs 4214 and services that it created. That is, the KUBERNTES master will delete the objects created in response to operators form the custom resource 4204. In either case, PVCs 4214 and services may be deleted at step 4308.

In some embodiments, PVCs 4214 created by the custom resource 4204 are deleted whereas PVCs 3914 created as defined in the Helm chart 3902 are not. Deleting of step 4308 may include deleting pods and containers as described above with respect to the method 4100. Deleting 4308 of objects may likewise be performed from parent to child as described above with respect to the method 4100. The deleting of step 4308 may further include deleting the operator 4202, such as prior to deleting the custom resource object 4204.

The method 4300 may further include creating 4310 the custom resource 4204 of the application 4200, i.e. instantiate the operator object 4202, which instantiates the custom resource 4204 and restores the custom resource to the configuration and state recorded in the snapshot object to which the application 4200 is being rolled back.

The method 4300 may further include creating 4312 the PVCs of the custom resource 4204, i.e. that were associated with objects created by the custom resource 4204 at the time of creation of the snapshot object. This may be performed by the custom resource 4204 generating calls to the KUBERNETES maser to create the PVCs or by the orchestrator 1300 creating the PVCs.

The method 4300 may further include generating 4314 a call to the storage manager 102 to mount storage volumes 4216 to the PVCs 4214. The call may be generated by CSIs executing within the PVCs 4214. As described above with respect to FIGS. 28 and 29, the CSIs may be executed by PVCs 2626 and may be an executable invoked by the PVC 4214 after instantiation. In this case, the CSI may be programmed to coordinate with the storage manager 102 by issuing the call to the storage manager to mount the storage volume to the PVC 4214 executing the CSI.

For example, the call for each PVC 4214 may include the identifier of the PVC 4214 to which the storage volume is to be mounted, an identifier of the storage volume, and an identifier of the snapshot of the storage volume. Note that in a typical implementation there may be multiple PVCs 4214, the storage volumes 4216 of which may belong to a consistency group as discussed above. The calls to the storage manager 102 may then be processed, resulting in the storage volumes being mounted to the PVCs. The manner in which the storage manager 102 processes the calls may be as described below with respect to FIG. 44.

After the custom resource 4204 is created, the PVCs 4214 created, and the storage volumes 4216 mounted thereto, the method 4300 may include recreating 4316 services and recreating 4318 other objects of the custom resource 4204. Recreating 4316 the services may include both instantiating the services as defined in the snapshot object but also restoring identity information in the snapshot object, such as network address and port to which the service is bound. Step 4316 may be performed using the copy services from step 4304. In some embodiments, a custom resource created at step 4310 may create a service that lacks the proper configuration as recorded in the snapshot object. Accordingly, this service may be deleted and replaced with a service created based on the snapshot object or other copy of the service.

Objects recreated at step 4318 may include containers 4210, which are instantiated and configured as defined in the snapshot object, which may include loading a role instance 4212 into the container 4210 as defined in the snapshot object.

In some instances, step 4318 is performed by the custom resource 4204 inasmuch as this is its programmed function. However, in the event that an object referenced in the snapshot object is not recreated by the custom resource 4204, the orchestration layer 1300 or other module executing the method 4300 may recreate it. Note further that the custom resource 4204 may likewise programmed to create the services. However, in order to ensure that the network address and/or port are the same, recreating of the services may be performed by the module executing the method 4300 rather than by the custom resource 4204. This may likewise true for the PVCs, which could be created at step 4312 by the custom resource 4204 but are instead created by the module executing the method 4300 in order to implement the method 4400 described below.

Referring to FIG. 44, the illustrated method 4400 may be executed by the storage manager 102 in response to a call to it generated at step 4314. The method 4400 may also be performed in response to requests to roll back storage volumes generated at step 4106 of the method 4100. Likewise step 2508 of the method 3500 may be implemented according to the method 4400 to account for consistency groups.

The method 4400 includes receiving 4402 the call to mount a storage volume. As noted above, this may include identifiers of the PVC to which the storage volume is to be mounted, an identifier of the storage volume, and an identifier of the snapshot of the storage volume.

The method 4400 may include evaluating 4404 whether an intent to rollback that storage volume identifier was previously received. If not, then snapshot of the storage volume as identified in the call is mounted 4406 to the PVC referenced in the call.

If an intent to rollback is found 4404 to have been registered for the storage volume referenced in the call, the method 4400 may include rolling back 4408 that storage volume to the snapshot referenced in the call.

The method 4400 may further include waiting to mount 4412 the rolled back storage volume until all other storage volumes in the consistency group of the rolled back storage volume are found 4410 to also have been rolled back. Once all storage volumes of a consistency group are found 4410 to have been rolled back, they may then be mounted 4412 to the PVCs, e.g., each storage volume mounted to the PVC referenced in the call including the identifier of that storage volume.

As noted above, the consistency group may be defined in the registered intent by including a same group identifier in the registered intent for each storage volume of the group or having the registered intent include a listing of storage volume identifiers of the group. In yet another alternative, groups are predefined independent of the registered intent or call, such as in an application manifest 1304 or other file. Accordingly, the storage manager 102 may evaluate this group definition at step 4410 to determine whether all storage volumes in a consistency group have been rolled back.

Figure 45:
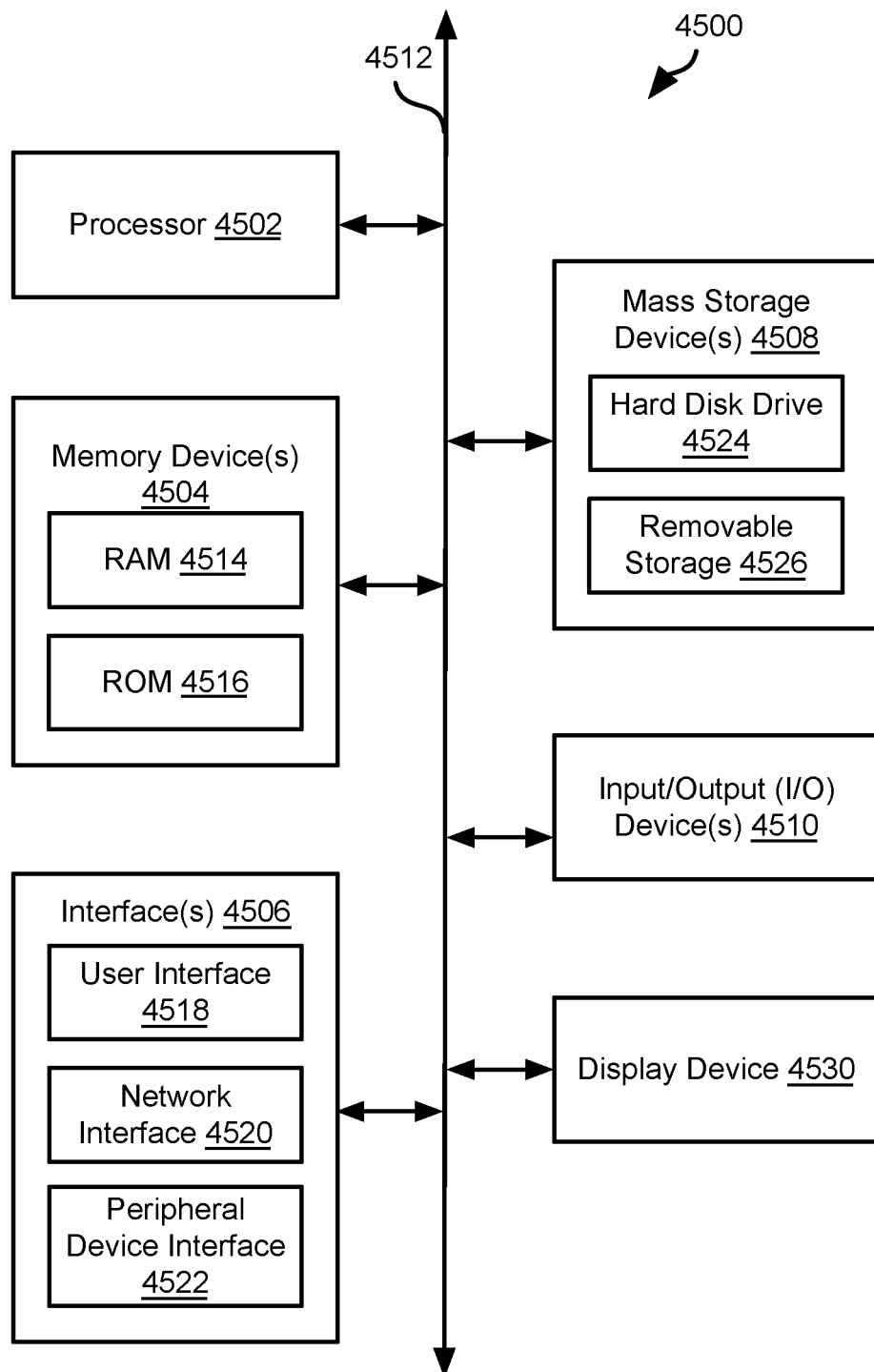
FIG. 45 is a schematic block diagram of an example computing device suitable for implementing methods in accordance with embodiments of the invention.

FIG. 45 is a block diagram illustrating an example computing device 4500. Computing device 4500 may be used to perform various procedures, such as those discussed herein. The storage manager 102, storage nodes 106, compute nodes 110, and hybrid nodes, may have some or all of the attributes of the computing device 4500.

Computing device 4500 includes one or more processor(s) 4502, one or more memory device(s) 4504, one or more interface(s) 4506, one or more mass storage device(s) 4508, one or more Input/output (I/O) device(s) 4510, and a display device 4530 all of which are coupled to a bus 4512. Processor(s) 4502 include one or more processors or controllers that execute instructions stored in memory device(s) 4504 and/or mass storage device(s) 4508. Processor(s) 4502 may also include various types of computer-readable media, such as cache memory.

Memory device(s) 4504 include various computer-readable media, such as volatile memory (e.g., random access memory (RAM) 4514) and/or nonvolatile memory (e.g., read-only memory (ROM) 4516). Memory device(s) 4504 may also include rewritable ROM, such as Flash memory.

Mass storage device(s) 4508 include various computer readable media, such as magnetic tapes, magnetic disks, optical disks, solid-state memory (e.g., Flash memory), and so forth. As shown in FIG. 45, a particular mass storage device is a hard disk drive 4524. Various drives may also be included in mass storage device(s) 4508 to enable reading from and/or writing to the various computer readable media. Mass storage device(s) 4508 include removable media 4526 and/or non-removable media.

I/O device(s) 4510 include various devices that allow data and/or other information to be input to or retrieved from computing device 4500. Example I/O device(s) 4510 include cursor control devices, keyboards, keypads, microphones, monitors or other display devices, speakers, printers, network interface cards, modems, lenses, CCDs or other image capture devices, and the like.

Display device 4530 includes any type of device capable of displaying information to one or more users of computing device 4500. Examples of display device 4530 include a monitor, display terminal, video projection device, and the like.

Interface(s) 4506 include various interfaces that allow computing device 4500 to interact with other systems, devices, or computing environments. Example interface(s) 4506 include any number of different network interfaces 4520, such as interfaces to local area networks (LANs), wide area networks (WANs), wireless networks, and the Internet. Other interface(s) include user interface 4518 and peripheral device interface 4522. The interface(s) 4506 may also include one or more peripheral interfaces such as interfaces for printers, pointing devices (mice, track pad, etc.), keyboards, and the like.

Bus 4512 allows processor(s) 4502, memory device(s) 4504, interface(s) 4506, mass storage device(s) 4508, I/O device(s) 4510, and display device 4530 to communicate with one another, as well as other devices or components coupled to bus 4512. Bus 4512 represents one or more of several types of bus structures, such as a system bus, PCI bus, IEEE 1394 bus, USB bus, and so forth.

For purposes of illustration, programs and other executable program components are shown herein as discrete blocks, although it is understood that such programs and components may reside at various times in different storage components of computing device 4500, and are executed by processor(s) 4502. Alternatively, the systems and procedures described herein can be implemented in hardware, or a combination of hardware, software, and/or firmware. For example, one or more application specific integrated circuits (ASICs) can be programmed to carry out one or more of the systems and procedures described herein.

In the above disclosure, reference has been made to the accompanying drawings, which form a part hereof, and in which is shown by way of illustration specific implementations in which the disclosure may be practiced. It is understood that other implementations may be utilized and structural changes may be made without departing from the scope of the present disclosure. References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

Implementations of the systems, devices, and methods disclosed herein may comprise or utilize a special purpose or general-purpose computer including computer hardware, such as, for example, one or more processors and system memory, as discussed herein. Implementations within the scope of the present disclosure may also include physical and other computer-readable media for carrying or storing computer-executable instructions and/or data structures. Such computer-readable media can be any available media that can be accessed by a general purpose or special purpose computer system. Computer-readable media that store computer-executable instructions are computer storage media (devices). Computer-readable media that carry computer-executable instructions are transmission media. Thus, by way of example, and not limitation, implementations of the disclosure can comprise at least two distinctly different kinds of computer-readable media: computer storage media (devices) and transmission media.

Computer storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

An implementation of the devices, systems, and methods disclosed herein may communicate over a computer network. A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links, which can be used to carry desired program code means in the form of computer-executable instructions or data structures and which can be accessed by a general purpose or special purpose computer. Combinations of the above should also be included within the scope of computer-readable media.

Computer-executable instructions comprise, for example, instructions and data which, when executed at a processor, cause a general purpose computer, special purpose computer, or special purpose processing device to perform a certain function or group of functions. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the disclosure may be practiced in network computing environments with many types of computer system configurations, including, an in-dash vehicle computer, personal computers, desktop computers, laptop computers, message processors, handheld devices, multi-processor systems, microprocessor-based or programmable consumer electronics, network PCs, minicomputers, mainframe computers, mobile telephones, PDAs, tablets, pagers, routers, switches, various storage devices, and the like. The disclosure may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Further, where appropriate, functions described herein can be performed in one or more of: hardware, software, firmware, digital components, or analog components. For example, one or more application specific integrated circuits (ASICs) can be programmed to carry out one or more of the systems and procedures described herein. Certain terms are used throughout the description and claims to refer to particular system components. As one skilled in the art will appreciate, components may be referred to by different names. This document does not intend to distinguish between components that differ in name, but not function.

It should be noted that the sensor embodiments discussed above may comprise computer hardware, software, firmware, or any combination thereof to perform at least a portion of their functions. For example, a sensor may include computer code configured to be executed in one or more processors, and may include hardware logic/electrical circuitry controlled by the computer code. These example devices are provided herein purposes of illustration, and are not intended to be limiting. Embodiments of the present disclosure may be implemented in further types of devices, as would be known to persons skilled in the relevant art(s).

At least some embodiments of the disclosure have been directed to computer program products comprising such logic (e.g., in the form of software) stored on any computer useable medium. Such software, when executed in one or more data processing devices, causes a device to operate as described herein.

While various embodiments of the present disclosure have been described above, it should be understood that they have been presented by way of example only, and not limitation. It will be apparent to persons skilled in the relevant art that various changes in form and detail can be made therein without departing from the spirit and scope of the disclosure. Thus, the breadth and scope of the present disclosure should not be limited by any of the above-described exemplary embodiments, but should be defined only in accordance with the following claims and their equivalents. The foregoing description has been presented for the purposes of illustration and description. It is not intended to be exhaustive or to limit the disclosure to the precise form disclosed. Many modifications and variations are possible in light of the above teaching. Further, it should be noted that any or all of the aforementioned alternate implementations may be used in any combination desired to form additional hybrid implementations of the disclosure.

The invention claimed is:

1. A method comprising:
   creating, by a first orchestrator, a first application including a plurality of first objects in a network computing environment, the plurality of first objects including a first portion and a second portion;
   mounting, by a storage manager, one or more storage volumes to the first portion of the plurality of first objects;
   creating, by a second orchestrator, an application snapshot of the plurality of first objects;
   creating, by the storage manager, one or more storage volume snapshots of the one or more storage volumes;
   receiving, by the second orchestrator, an instruction to rollback the first application to the application snapshot; and
   in response to the instruction, performing, by the second orchestrator:
      (a) deleting the second portion of the plurality of first objects but not the first portion of the plurality of first objects;
      (b) following performing (a), instructing the storage manager to rollback the one or more storage volumes to the one or more storage volume snapshots and mount the one or more storage volumes following rolling back to the first portion of the plurality of first objects; and
      (c) following performing (b), instructing the first orchestrator to recreate the second portion of the plurality of first objects according to the application snapshot.

2. The method of claim 1, wherein the first portion of the plurality of first objects are persistent volume claim (PVC) objects.

3. The method of claim 1, wherein the second portion of the plurality of first objects includes containers.

4. The method of claim 3, wherein the second portion of the plurality of first objects includes a pod.

5. The method of claim 4, wherein the second portion of the plurality of first objects includes at least one of a config map, secret, stateful set, replica set, service, and service account.

6. The method of claim 1, wherein the plurality of first objects includes a hierarchy defining parent-child relationships; wherein performing (a) comprises deleting the second portion of the plurality of first objects such that a parent of each object of the second portion of the plurality of first objects is deleted before deleting the each object.

7. The method of claim 6, wherein performing (c) comprises recreating the second portion of the plurality of first objects according to the application snapshot such that for each object of the second portion of the plurality of first objects, a parent of the each object is recreated before the each object.

8. The method of claim 1, wherein (b) further comprises deleting a third portion of the plurality of first objects that were created after creating the application snapshot, the third portion of the plurality of first objects having one or more second storage volumes mounted thereto.

9. The method of claim 1, wherein the first orchestrator is a KUBERNETES orchestrator.

10. The method of claim 1, wherein the storage manager implements virtualized storage volumes.

11. A system comprising:
    a network computing environment including a plurality of computing nodes;
    a first orchestrator executing in the network computing environment;
    a second orchestrator executing in the network computing environment;
    a storage manager executing in the network computing environment;
    wherein the first orchestrator, second orchestrator, and storage manager are programmed to:
       create, by a first orchestrator, a first application including a plurality of first objects in a network computing environment, the plurality of first objects including a first portion and a second portion;
       mount, by a storage manager, one or more storage volumes to the first portion of the plurality of first objects;
       create, by a second orchestrator, an application snapshot of the plurality of first objects;
       create, by the storage manager, one or more storage volume snapshots of the one or more storage volumes;
       receive, by the second orchestrator, an instruction to rollback the first application to the application snapshot; and
       in response to the instruction, perform, by the second orchestrator:

(a) deleting the second portion of the plurality of first objects but not the first portion of the plurality of first objects;
(b) following performing (a), instructing the storage manager to rollback the one or more storage volumes to the one or more storage volume snapshots and mount the one or more storage volumes following rolling back to the first portion of the plurality of first objects; and
(c) following performing (b), instructing the first orchestrator to recreate the second portion of the plurality of first objects according to the application snapshot.

12. The system of claim 11, wherein the first portion of the plurality of first objects are persistent volume claim (PVC) objects.

13. The system of claim 11, wherein the second portion of the plurality of first objects includes containers.

14. The system of claim 13, wherein the second portion of the plurality of first objects includes a pod.

15. The system of claim 14, wherein the second portion of the plurality of first objects includes at least one of a config map, secret, stateful set, replica set, service, and service account.

16. The system of claim 11, wherein the plurality of first objects includes a hierarchy defining parent-child relationships; wherein performing (a) comprises deleting the second portion of the plurality of first objects such that a parent of each object of the second portion of the plurality of first objects is deleted before deleting the each object.

17. The system of claim 16, wherein performing (c) comprises recreating the second portion of the plurality of first objects according to the application snapshot such that for each object of the second portion of the plurality of first objects, a parent of the each object is recreated before the each object.

18. The system of claim 11, wherein (b) further comprises deleting a third portion of the plurality of first objects that were created after creating the application snapshot, the third portion of the plurality of first objects having one or more second storage volumes mounted thereto.

19. The system of claim 11, wherein the first orchestrator is a KUBERNETES orchestrator.

20. The system of claim 11, wherein the storage manager is programmed to implement virtualized storage volumes.

* * * * *